(12) United States Patent
Grandeza et al.

(10) Patent No.: US 7,938,531 B2
(45) Date of Patent: May 10, 2011

(54) METHODS AND APPARATUS FOR HANDHELD PRINTING WITH OPTICAL POSITIONING

(75) Inventors: Michelin de la Peña Grandeza, Cebu (PH); Vincent Peter Crisostomo Valentus, Quezon (PH); William Henry Reed, Lexington, KY (US)

(73) Assignee: Lexmark International, Inc., Lexington, KY (US)

( * ) Notice: Subject to any disclaimer, the term of this patent is extended or adjusted under 35 U.S.C. 154(b) by 1174 days.

(21) Appl. No.: 11/612,383

(22) Filed: Dec. 18, 2006

(65) Prior Publication Data

US 2008/0231682 A1 Sep. 25, 2008

Related U.S. Application Data

(60) Provisional application No. 60/827,117, filed on Sep. 27, 2006.

(51) Int. Cl.
*B41J 3/36* (2006.01)
(52) U.S. Cl. ........................................ 347/109
(58) Field of Classification Search ............... None
See application file for complete search history.

(56) References Cited

U.S. PATENT DOCUMENTS

| | | |
|---|---|---|
| 4,675,700 A | 6/1987 | Nagira et al. |
| 4,758,106 A | 7/1988 | Yasui et al. |
| 4,758,849 A | 7/1988 | Piatt et al. |
| 4,915,027 A | 4/1990 | Ishibashi et al. |
| 4,933,867 A | 6/1990 | Ishigaki |
| 4,947,262 A | 8/1990 | Yajima et al. |
| 4,949,391 A | 8/1990 | Faulkerson et al. |
| RE33,425 E | 11/1990 | Nihei |
| 4,999,016 A | 3/1991 | Suzuki et al. |
| 5,013,895 A | 5/1991 | Iggulden et al. |
| 5,024,541 A | 6/1991 | Tsukada et al. |
| 5,028,934 A | 7/1991 | Kasai et al. |
| 5,052,832 A | 10/1991 | Akiyama et al. |
| 5,063,451 A | 11/1991 | Yanagisawa et al. |
| 5,093,675 A | 3/1992 | Koumura et al. |
| 5,110,226 A | 5/1992 | Sherman et al. |
| 5,111,216 A | 5/1992 | Richardson et al. |
| 5,149,980 A | 9/1992 | Ertel et al. |
| 5,152,624 A | 10/1992 | Buschmann et al. |
| 5,160,943 A | 11/1992 | Pettigrew et al. |
| 5,181,521 A | 1/1993 | Lemelson |
| 5,181,523 A | 1/1993 | Wendelborn |

(Continued)

FOREIGN PATENT DOCUMENTS

FR 2561992 4/1984

(Continued)

*Primary Examiner* — Stephen D Meier
*Assistant Examiner* — Alexander C Witkowski

(57) ABSTRACT

Methods and apparatus include a handheld printer manipulated by an operator to print an image on a media. A controller correlates a location of a printhead to the image and causes printing or not. A position sensor provides input to the controller. Its signal typifies pixels in a matrix frame indicating a current position frame and, over time, a previous position frame. The controller compares the two frames to find a presence of the previous in the current. To improve computational efficiency, the controller reduces a relative size of both frames before comparing. Specific reduction techniques contemplate converting a matrix frame of pixels indicative of previous and current locations into smaller matrices, including one-dimensional forms. Possible search areas within the current frame to look for the previous frame utilize knowledge about the movement history of the printer. Position sensor signal validity and controller architectures are other noteworthy features.

18 Claims, 42 Drawing Sheets

U.S. PATENT DOCUMENTS

| | | | |
|---|---|---|---|
| 5,184,907 A | 2/1993 | Hamada et al. | |
| 5,186,558 A | 2/1993 | Sherman et al. | |
| 5,188,464 A | 2/1993 | Aaron | |
| 5,236,265 A | 8/1993 | Saito et al. | |
| 5,240,334 A | 8/1993 | Epstein et al. | |
| 5,262,804 A | 11/1993 | Petigrew et al. | |
| 5,267,800 A | 12/1993 | Petteruti et al. | |
| 5,308,173 A | 5/1994 | Amano et al. | |
| 5,311,208 A | 5/1994 | Burger et al. | |
| 5,312,196 A | 5/1994 | Hock et al. | |
| 5,344,248 A | 9/1994 | Schoon et al. | |
| 5,355,146 A | 10/1994 | Chiu et al. | |
| 5,446,559 A | 8/1995 | Birk | |
| 5,449,238 A | 9/1995 | Pham et al. | |
| 5,462,375 A | 10/1995 | Isobe et al. | |
| 5,475,403 A | 12/1995 | Havlovick et al. | |
| 5,503,483 A | 4/1996 | Petteruti et al. | |
| 5,520,470 A | 5/1996 | Willett | |
| 5,578,813 A | 11/1996 | Allen et al. | |
| 5,593,236 A | 1/1997 | Bobry | |
| 5,634,730 A | 6/1997 | Bobry | |
| 5,644,139 A | 7/1997 | Allen et al. | |
| 5,650,820 A | 7/1997 | Sekine et al. | |
| 5,685,651 A | 11/1997 | Hayman et al. | |
| 5,686,720 A | 11/1997 | Tullis | |
| 5,729,008 A | 3/1998 | Blalock et al. | |
| 5,786,804 A | 7/1998 | Gordon | |
| 5,806,993 A | 9/1998 | Petterutti et al. | |
| 5,816,718 A | 10/1998 | Poole | |
| 5,825,044 A | 10/1998 | Allen et al. | |
| 5,829,893 A | 11/1998 | Kinoshita et al. | |
| 5,842,793 A | 12/1998 | Katayama et al. | |
| 5,848,849 A | 12/1998 | Kishi et al. | |
| 5,850,243 A | 12/1998 | Kinoshita et al. | |
| 5,853,251 A | 12/1998 | Imai | |
| 5,862,753 A | 1/1999 | Dolan et al. | |
| 5,887,992 A | 3/1999 | Yamanashi | |
| 5,892,523 A | 4/1999 | Tanaka et al. | |
| 5,927,872 A | 7/1999 | Yamada | |
| 5,953,497 A | 9/1999 | Kokubo et al. | |
| 5,984,455 A | 11/1999 | Anderson | |
| 5,988,900 A | 11/1999 | Bobry | |
| 5,997,193 A | 12/1999 | Petterutti et al. | |
| 6,004,053 A | 12/1999 | Petteruti et al. | |
| 6,005,681 A | 12/1999 | Pollard | |
| 6,010,257 A | 1/2000 | Petteruti et al. | |
| 6,017,112 A | 1/2000 | Anderson et al. | |
| 6,062,686 A | 5/2000 | Kinoshita et al. | |
| 6,076,910 A | 6/2000 | Anderson | |
| 6,092,941 A | 7/2000 | Imai | |
| 6,147,777 A | 11/2000 | Jung | |
| 6,158,907 A | 12/2000 | Silverbrook et al. | |
| 6,164,853 A | 12/2000 | Foote | |
| 6,195,475 B1 | 2/2001 | Beausoleil, Jr. et al. | |
| 6,203,221 B1 | 3/2001 | Tomasik et al. | |
| 6,246,423 B1 | 6/2001 | Suzuki et al. | |
| 6,249,360 B1 | 6/2001 | Pollard et al. | |
| 6,259,826 B1 | 7/2001 | Pollard et al. | |
| 6,261,011 B1 | 7/2001 | Day et al. | |
| 6,270,187 B1 | 8/2001 | Murcia et al. | |
| 6,270,271 B1 | 8/2001 | Fujiwara | |
| 6,338,555 B1 | 1/2002 | Hirose | |
| 6,347,897 B2 | 2/2002 | Huggins et al. | |
| 6,357,939 B1 * | 3/2002 | Baron | 400/88 |
| 6,367,993 B2 | 4/2002 | Day et al. | |
| 6,373,995 B1 | 4/2002 | Moore | |
| 6,379,058 B1 | 4/2002 | Petteruti et al. | |
| 6,394,674 B2 | 5/2002 | Huggins et al. | |
| 6,398,432 B1 | 6/2002 | Day et al. | |
| 6,409,401 B1 | 6/2002 | Petteruti et al. | |
| 6,433,780 B1 | 8/2002 | Gordon et al. | |
| 6,481,905 B2 | 11/2002 | Day et al. | |
| 6,499,840 B2 | 12/2002 | Day et al. | |
| 6,503,005 B1 | 1/2003 | Cockerill et al. | |
| 6,533,476 B2 | 3/2003 | Hamisch, Jr. et al. | |
| 6,553,459 B1 | 4/2003 | Silverbrook et al. | |
| 6,568,777 B1 | 5/2003 | Anderson et al. | |
| 6,572,290 B2 | 6/2003 | McCleave et al. | |
| 6,583,895 B1 | 6/2003 | Kuwahara et al. | |
| 6,604,874 B2 | 8/2003 | Carriere et al. | |
| 6,607,316 B1 | 8/2003 | Petteruti et al. | |
| 6,609,844 B1 | 8/2003 | Petteruti et al. | |
| 6,623,191 B2 | 9/2003 | Huggins et al. | |
| 6,626,597 B2 | 9/2003 | Fujiwara | |
| 6,641,313 B2 | 11/2003 | Bobry | |
| 6,648,528 B2 | 11/2003 | Hardisty et al. | |
| 6,652,090 B2 | 11/2003 | Silverbrook | |
| 6,674,543 B2 | 1/2004 | Day et al. | |
| 6,688,739 B2 | 2/2004 | Murray | |
| 6,736,502 B2 | 5/2004 | Deguchi | |
| 6,742,887 B2 | 6/2004 | Ando | |
| 2001/0019349 A1 | 9/2001 | Kawakami | |
| 2001/0022914 A1 | 9/2001 | Iura et al. | |
| 2001/0024586 A1 | 9/2001 | Day et al. | |
| 2002/0033871 A1 | 3/2002 | Kaiser | |
| 2002/0090241 A1 | 7/2002 | Fujiwara | |
| 2002/0127041 A1 | 9/2002 | Huggins et al. | |
| 2002/0154186 A1 | 10/2002 | Matsumoto | |
| 2002/0186293 A1 | 12/2002 | Ando | |
| 2003/0007023 A1 * | 1/2003 | Barclay et al. | 347/8 |
| 2003/0031494 A1 | 2/2003 | Cockerill et al. | |
| 2003/0063938 A1 | 4/2003 | Hardisty et al. | |
| 2003/0117456 A1 | 6/2003 | Silverbrook et al. | |
| 2004/0009024 A1 | 1/2004 | Hardisty et al. | |
| 2004/0018035 A1 | 1/2004 | Petteruti et al. | |
| 2004/0061727 A1 | 4/2004 | Kang et al. | |
| 2006/0012660 A1 * | 1/2006 | Dagborn | 347/109 |

FOREIGN PATENT DOCUMENTS

| | | |
|---|---|---|
| JP | 57041981 | 8/1980 |
| JP | 62083158 | 10/1985 |
| JP | 01244875 | 3/1988 |

* cited by examiner

FIG. 8B

|    | 1    | 2    | 3    | 4    | 5    | 6    | 7    | 8    | 9    | 10   | 11   |
| -- | ---- | ---- | ---- | ---- | ---- | ---- | ---- | ---- | ---- | ---- | ---- |
| 0  | 1553 | 1593 | 1622 | 1641 | 1659 | 1668 | 1668 | 1660 | 1647 | 1631 | 1612 |
| 1  | 1563 | =SUM | 1632 | 1651 | 1669 | 1678 | 1678 | 1670 | 1657 | 1641 | 1622 |
| 2  | 1542 | 1581 | 1614 | 1639 | 1660 | 1676 | 1682 | 1680 | 1664 | 1650 | 1633 |
| 3  | 1550 | 1585 | 1611 | 1632 | 1653 | 1666 | 1669 | 1668 | 1660 | 1649 | 1636 |
| 4  | 1554 | 1591 | 1619 | 1637 | 1646 | 1652 | 1652 | 1650 | 1650 | 1645 | 1635 |
| 5  | 1567 | 1607 | 1644 | 1663 | 1669 | 1672 | 1672 | 1672 | 1670 | 1666 | 1660 |
| 6  | 1583 | 1613 | 1647 | 1670 | 1684 | 1690 | 1689 | 1686 | 1683 | 1680 | 1681 |
| 7  | 1601 | 1627 | 1648 | 1667 | 1681 | 1690 | 1689 | 1683 | 1677 | 1677 | 1684 |
| 8  | 1587 | 1612 | 1631 | 1649 | 1665 | 1674 | 1679 | 1676 | 1676 | 1688 | 1700 |
| 9  | 1577 | 1598 | 1621 | 1643 | 1659 | 1670 | 1677 | 1684 | 1695 | 1713 | 1727 |
| 10 | 1588 | 1615 | 1639 | 1667 | 1684 | 1693 | 1701 | 1716 | 1737 | 1751 | 1764 |
| 11 | 1588 | 1608 | 1629 | 1659 | 1688 | 1703 | 1716 | 1731 | 1751 | 1764 | 1774 |
| 12 | 1578 | 1603 | 1633 | 1659 | 1690 | 1709 | 1724 | 1735 | 1752 | 1762 | 1766 |
| 13 | 1559 | 1592 | 1630 | 1664 | 1697 | 1721 | 1744 | 1764 | 1784 | 1791 | 1791 |
| 14 | 1558 | 1594 | 1633 | 1672 | 1708 | 1735 | 1756 | 1773 | 1793 | 1803 | 1801 |
| 15 | 1550 | 1582 | 1620 | 1658 | 1695 | 1725 | 1749 | 1773 | 1794 | 1804 | 1802 |
| 16 | 1537 | 1568 | 1600 | 1634 | 1671 | 1707 | 1735 | 1761 | 1786 | 1796 | 1794 |
| 17 | 1531 | 1562 | 1591 | 1617 | 1651 | 1686 | 1719 | 1749 | 1772 | 1778 | 1779 |
| 18 | 1510 | 1543 | 1577 | 1605 | 1638 | 1674 | 1707 | 1732 | 1752 | 1754 | 1751 |
| 19 | 1486 | 1525 | 1566 | 1596 | 1629 | 1659 | 1687 | 1711 | 1736 | 1744 | 1743 |

| | 1 |
|---|---|
| 0 | 1686 |
| 1 | 1688 |
| 2 | 1680 |
| 3 | 1674 |
| 4 | 1697 |
| 5 | 1720 |
| 6 | 1723 |
| 7 | 1747 |
| 8 | 1757 |
| 9 | 1751 |

87

91

| 1553 | 1593 | 1622 | 1641 | 1659 | 1668 | 1668 | 1660 | 1647 | 1631 | 1612 |
|------|------|------|------|------|------|------|------|------|------|------|
| 1563 | 1603 | 1632 | 1651 | 1669 | 1678 | 1678 | 1670 | 1657 | 1641 | 1622 |
| 1542 | 1581 | 1614 | 1639 | 1660 | 1676 | 1682 | 1680 | 1664 | 1650 | 1633 |
| 1550 | 1585 | 1611 | 1632 | 1653 | 1666 | 1669 | 1668 | 1660 | 1649 | 1636 |
| 1554 | 1591 | 1619 | 1637 | 1646 | 1652 | 1652 | 1650 | 1650 | 1645 | 1635 |
| 1567 | 1607 | 1644 | 1663 | 1669 | 1672 | 1672 | 1672 | 1670 | 1666 | 1660 |
| 1583 | 1613 | 1647 | 1670 | 1684 | 1690 | 1689 | 1686 | 1683 | 1680 | 1681 |
| 1601 | 1627 | 1648 | 1667 | 1681 | 1690 | 1689 | 1683 | 1677 | 1677 | 1684 |
| 1587 | 1612 | 1631 | 1649 | 1665 | 1674 | 1679 | 1676 | 1676 | 1688 | 1700 |
| 1577 | 1598 | 1621 | 1643 | 1659 | 1670 | 1677 | 1684 | 1695 | 1713 | 1727 |
| 1588 | 1615 | 1639 | 1667 | 1684 | 1693 | 1701 | 1716 | 1737 | 1751 | 1764 |
| 1588 | 1608 | 1629 | 1659 | 1688 | 1703 | 1716 | 1731 | 1751 | 1764 | 1774 |
| 1578 | 1603 | 1633 | 1659 | 1690 | 1709 | 1724 | 1735 | 1752 | 1762 | 1766 |
| 1559 | 1592 | 1630 | 1664 | 1697 | 1721 | 1744 | 1764 | 1784 | 1791 | 1791 |
| 1558 | 1594 | 1633 | 1672 | 1708 | 1735 | 1756 | 1773 | 1793 | 1803 | 1801 |
| 1550 | 1582 | 1620 | 1658 | 1695 | 1725 | 1749 | 1773 | 1794 | 1804 | 1802 |
| 1537 | 1568 | 1600 | 1634 | 1671 | 1707 | 1735 | 1761 | 1786 | 1796 | 1794 |
| 1531 | 1562 | 1591 | 1617 | 1651 | 1686 | 1719 | 1749 | 1772 | 1778 | 1779 |
| 1510 | 1543 | 1577 | 1605 | 1638 | 1674 | 1707 | 1732 | 1752 | 1754 | 1751 |
| 1486 | 1525 | 1566 | 1596 | 1629 | 1659 | 1687 | 1711 | 1736 | 1744 | 1743 |

| 1686 |
|------|
| 1688 |
| 1680 |
| 1674 |
| 1697 |
| 1720 |
| 1723 |
| 1747 |
| 1757 |
| 1751 |

87

98

91

1 column

| 1553 | 1593 | 1622 | 1641 | 1659 | 1668 | 1668 | 1660 | 1647 | 1631 | 1612 |
|------|------|------|------|------|------|------|------|------|------|------|
| 1563 | 1603 | 1632 | 1651 | 1669 | 1678 | 1678 | 1670 | 1657 | 1641 | 1622 |
| 1542 | 1581 | 1614 | 1639 | 1660 | 1676 | 1682 | 1680 | 1664 | 1650 | 1633 |
| 1550 | 1585 | 1611 | 1632 | 1653 | 1666 | 1669 | 1668 | 1660 | 1649 | 1636 |
| 1554 | 1591 | 1619 | 1637 | 1646 | 1652 | 1652 | 1650 | 1650 | 1645 | 1635 |
| 1567 | 1607 | 1644 | 1663 | 1669 | 1672 | 1672 | 1672 | 1670 | 1666 | 1660 |
| 1583 | 1613 | 1647 | 1670 | 1684 | 1690 | 1689 | 1686 | 1683 | 1680 | 1681 |
| 1601 | 1627 | 1648 | 1667 | 1681 | 1690 | 1689 | 1683 | 1677 | 1677 | 1684 |
| 1587 | 1612 | 1631 | 1649 | 1665 | 1674 | 1679 | 1676 | 1676 | 1688 | 1700 |
| 1577 | 1598 | 1621 | 1643 | 1659 | 1670 | 1677 | 1684 | 1695 | 1713 | 1727 |
| 1588 | 1615 | 1639 | 1667 | 1684 | 1693 | 1701 | 1716 | 1737 | 1751 | 1764 |
| 1588 | 1609 | 1629 | 1659 | 1688 | 1703 | 1716 | 1731 | 1751 | 1764 | 1774 |
| 1578 | 1603 | 1633 | 1659 | 1690 | 1709 | 1724 | 1735 | 1752 | 1762 | 1766 |
| 1559 | 1592 | 1630 | 1664 | 1697 | 1721 | 1744 | 1764 | 1784 | 1791 | 1791 |
| 1558 | 1594 | 1633 | 1672 | 1708 | 1735 | 1756 | 1773 | 1793 | 1803 | 1801 |
| 1550 | 1582 | 1620 | 1658 | 1695 | 1725 | 1749 | 1773 | 1794 | 1804 | 1802 |
| 1537 | 1568 | 1600 | 1634 | 1671 | 1707 | 1735 | 1761 | 1786 | 1796 | 1794 |
| 1531 | 1562 | 1591 | 1617 | 1651 | 1686 | 1719 | 1749 | 1772 | 1778 | 1779 |
| 1510 | 1543 | 1577 | 1605 | 1638 | 1674 | 1707 | 1732 | 1752 | 1754 | 1751 |
| 1486 | 1525 | 1566 | 1596 | 1629 | 1659 | 1687 | 1711 | 1736 | 1744 | 1743 |

FIG. 11B

| | | | | | | | | | |
|---|---|---|---|---|---|---|---|---|---|
| 1686 | | | | | | | | | |
| 1688 | | | | | | | | | |
| 1680 | | | | | | | | | |
| 1674 | | | | | | | | | |
| 1697 | | | | | | | | | |
| 1720 | | | | | | | | | |
| 1723 | | | | | | | | | |
| 1747 | | | | | | | | | |
| 1757 | | | | | | | | | |
| 1751 | | | | | | | | | |

87

91

98

| 1553 | 1593 | 1622 | 1641 | 1659 | 1668 | 1668 | 1660 | 1647 | 1631 | 1612 |
|---|---|---|---|---|---|---|---|---|---|---|
| 1563 | 1603 | 1632 | 1651 | 1669 | 1678 | 1678 | 1670 | 1657 | 1641 | 1622 |
| 1542 | 1581 | 1614 | 1639 | 1660 | 1676 | 1682 | 1680 | 1664 | 1650 | 1633 |
| 1550 | 1585 | 1611 | 1632 | 1653 | 1666 | 1669 | 1668 | 1660 | 1649 | 1636 |
| 1554 | 1591 | 1619 | 1637 | 1646 | 1652 | 1652 | 1650 | 1650 | 1645 | 1635 |
| 1567 | 1607 | 1644 | 1663 | 1669 | 1672 | 1672 | 1672 | 1670 | 1666 | 1660 |
| 1583 | 1613 | 1647 | 1670 | 1684 | 1690 | 1689 | 1686 | 1683 | 1680 | 1681 |
| 1601 | 1627 | 1648 | 1667 | 1681 | 1690 | 1689 | 1683 | 1677 | 1677 | 1684 |
| 1587 | 1612 | 1631 | 1649 | 1665 | 1674 | 1679 | 1676 | 1676 | 1688 | 1700 |
| 1577 | 1598 | 1621 | 1643 | 1659 | 1670 | 1677 | 1684 | 1695 | 1713 | 1727 |
| 1588 | 1615 | 1639 | 1667 | 1684 | 1693 | 1701 | 1716 | 1737 | 1751 | 1764 |
| 1588 | 1608 | 1629 | 1659 | 1688 | 1703 | 1716 | 1731 | 1751 | 1764 | 1774 |
| 1578 | 1603 | 1633 | 1659 | 1690 | 1709 | 1724 | 1735 | 1752 | 1762 | 1766 |
| 1559 | 1592 | 1630 | 1664 | 1697 | 1721 | 1744 | 1764 | 1784 | 1791 | 1791 |
| 1558 | 1594 | 1633 | 1672 | 1708 | 1735 | 1756 | 1773 | 1793 | 1803 | 1801 |
| 1550 | 1582 | 1620 | 1658 | 1695 | 1725 | 1749 | 1773 | 1794 | 1804 | 1802 |
| 1537 | 1568 | 1600 | 1634 | 1671 | 1707 | 1735 | 1761 | 1786 | 1796 | 1794 |
| 1531 | 1562 | 1591 | 1617 | 1651 | 1686 | 1719 | 1749 | 1772 | 1778 | 1779 |
| 1510 | 1543 | 1577 | 1605 | 1638 | 1674 | 1707 | 1732 | 1752 | 1754 | 1751 |
| 1486 | 1525 | 1566 | 1596 | 1629 | 1659 | 1687 | 1711 | 1736 | 1744 | 1743 |

| 1686 |
|------|
| 1688 |
| 1680 |
| 1674 |
| 1697 |
| 1720 |
| 1723 |
| 1747 |
| 1757 |
| 1751 |

91

1 row

98

| 1553 | 1593 | 1622 | 1641 | 1659 | 1668 | 1668 | 1660 | 1647 | 1631 | 1612 |
|------|------|------|------|------|------|------|------|------|------|------|
| 1563 | 1603 | 1632 | 1651 | 1669 | 1678 | 1678 | 1670 | 1657 | 1641 | 1622 |
| 1542 | 1581 | 1614 | 1639 | 1660 | 1676 | 1682 | 1680 | 1664 | 1650 | 1633 |
| 1550 | 1585 | 1611 | 1632 | 1653 | 1666 | 1669 | 1668 | 1660 | 1649 | 1636 |
| 1554 | 1591 | 1619 | 1637 | 1646 | 1652 | 1652 | 1650 | 1650 | 1645 | 1635 |
| 1567 | 1607 | 1644 | 1663 | 1669 | 1672 | 1672 | 1672 | 1670 | 1666 | 1660 |
| 1583 | 1613 | 1647 | 1670 | 1684 | 1690 | 1689 | 1686 | 1683 | 1680 | 1681 |
| 1601 | 1627 | 1648 | 1667 | 1681 | 1690 | 1689 | 1683 | 1677 | 1677 | 1684 |
| 1587 | 1612 | 1631 | 1649 | 1665 | 1674 | 1679 | 1676 | 1676 | 1688 | 1700 |
| 1577 | 1598 | 1621 | 1643 | 1659 | 1670 | 1677 | 1684 | 1695 | 1713 | 1727 |
| 1588 | 1615 | 1639 | 1667 | 1684 | 1693 | 1701 | 1716 | 1737 | 1751 | 1764 |
| 1588 | 1608 | 1629 | 1659 | 1688 | 1703 | 1716 | 1731 | 1751 | 1764 | 1774 |
| 1578 | 1603 | 1633 | 1659 | 1690 | 1709 | 1724 | 1735 | 1752 | 1762 | 1766 |
| 1559 | 1592 | 1630 | 1664 | 1697 | 1721 | 1744 | 1764 | 1784 | 1791 | 1791 |
| 1558 | 1594 | 1633 | 1672 | 1708 | 1735 | 1756 | 1773 | 1793 | 1803 | 1801 |
| 1550 | 1582 | 1620 | 1658 | 1695 | 1725 | 1749 | 1773 | 1794 | 1804 | 1802 |
| 1537 | 1568 | 1600 | 1634 | 1671 | 1707 | 1735 | 1761 | 1786 | 1796 | 1794 |
| 1531 | 1562 | 1591 | 1617 | 1651 | 1686 | 1719 | 1749 | 1772 | 1778 | 1779 |
| 1510 | 1543 | 1577 | 1605 | 1638 | 1674 | 1707 | 1732 | 1752 | 1754 | 1751 |
| 1486 | 1525 | 1566 | 1596 | 1629 | 1659 | 1687 | 1711 | 1736 | 1744 | 1743 |

|   | 0 | 1 | 2 | 3 | 4 | 5 | 6 | 7 | 8 | 9 | 10 |
|---|---|---|---|---|---|---|---|---|---|---|---|
| 0 | 0.891 | 0.754 | 0.564 | 0.542 | 0.459 | 0.376 | 0.429 | 0.546 | 0.797 | 0.883 | 0.919 |
| 1 | 0.778 | 0.585 | 0.375 | 0.444 | 0.502 | 0.515 | 0.631 | 0.72 | 0.803 | 0.894 | 0.932 |
| 2 | 0.692 | 0.469 | 0.165 | 0.33 | 0.541 | 0.614 | 0.714 | 0.786 | 0.852 | 0.913 | 0.939 |
| 3 | 0.437 | 0.156 | -0.089 | 0.157 | 0.511 | 0.636 | 0.763 | 0.843 | 0.895 | 0.931 | 0.93 |
| 4 | -0.139 | -0.423 | -0.408 | 0.041 | 0.551 | 0.693 | 0.801 | 0.867 | 0.912 | 0.931 | 0.909 |
| 5 | -0.6 | -0.693 | -0.398 | 0.301 | 0.798 | 0.876 | 0.927 | 0.961 | 0.97 | 0.953 | 0.916 |
| 6 | -0.796 | -0.718 | -0.352 | 0.4 | 0.897 | 0.979 | 0.998 | 0.985 | 0.957 | 0.923 | 0.879 |
| 7 | -0.881 | -0.817 | -0.556 | -0.079 | 0.533 | 0.827 | 0.892 | 0.88 | 0.841 | 0.816 | 0.76 |
| 8 | -0.977 | -0.936 | -0.744 | -0.464 | -0.049 | 0.419 | 0.645 | 0.727 | 0.716 | 0.697 | 0.641 |
| 9 | -0.931 | -0.907 | -0.846 | -0.721 | -0.518 | -0.107 | 0.257 | 0.452 | 0.486 | 0.42 | 0.305 |
| 10 | -0.885 | -0.908 | -0.935 | -0.91 | -0.858 | -0.671 | -0.399 | -0.171 | -0.105 | -0.205 | -0.372 |

Best match

FIG. 12

| n\m | 0 | 1 | 2 | 3 | 4 | 5 | 6 | 7 | 8 | 9 | 10 | 11 | 12 | 13 | 14 | 15 | 16 | 17 | 18 | 19 |
|---|---|---|---|---|---|---|---|---|---|---|---|---|---|---|---|---|---|---|---|---|
| 0 | 136 | 137 | 142 | 144 | 152 | 158 | 163 | 167 | 174 | 180 | 176 | 166 | 161 | 162 | 161 | 158 | 155 | 154 | 158 | 161 |
| 1 | 137 | 137 | 143 | 145 | 153 | 159 | 164 | 168 | 175 | 181 | 177 | 167 | 162 | 163 | 162 | 159 | 156 | 155 | 159 | 162 |
| 2 | 136 | 138 | 142 | 147 | 149 | 155 | 156 | 166 | 174 | 180 | 175 | 170 | 167 | 168 | 165 | 161 | 154 | 150 | 160 | 163 |
| 3 | 140 | 137 | 142 | 148 | 154 | 158 | 158 | 163 | 169 | 177 | 175 | 167 | 163 | 169 | 167 | 161 | 157 | 155 | 158 | 164 |
| 4 | 141 | 141 | 145 | 151 | 158 | 160 | 158 | 160 | 166 | 173 | 178 | 170 | 163 | 160 | 164 | 160 | 156 | 160 | 161 | 163 |
| 5 | 139 | 142 | 147 | 154 | 161 | 163 | 161 | 164 | 165 | 173 | 179 | 177 | 166 | 160 | 165 | 163 | 161 | 162 | 161 | 167 |
| 6 | 144 | 140 | 148 | 152 | 159 | 166 | 166 | 167 | 166 | 170 | 174 | 179 | 171 | 166 | 167 | 165 | 163 | 164 | 163 | 171 |
| 7 | 147 | 145 | 150 | 154 | 158 | 164 | 169 | 173 | 168 | 170 | 173 | 169 | 169 | 168 | 165 | 163 | 163 | 167 | 168 | 177 |
| 8 | 147 | 148 | 149 | 153 | 159 | 159 | 168 | 170 | 165 | 169 | 172 | 167 | 167 | 169 | 167 | 164 | 165 | 170 | 177 | 181 |
| 9 | 145 | 148 | 147 | 153 | 161 | 160 | 165 | 169 | 164 | 167 | 166 | 169 | 169 | 169 | 168 | 167 | 172 | 180 | 182 | 181 |
| 10 | 146 | 147 | 148 | 153 | 160 | 162 | 164 | 166 | 166 | 176 | 173 | 171 | 176 | 170 | 169 | 170 | 179 | 187 | 180 | 189 |
| 11 | 153 | 154 | 145 | 148 | 158 | 161 | 165 | 163 | 167 | 174 | 173 | 175 | 175 | 177 | 173 | 174 | 180 | 183 | 180 | 184 |
| 12 | 145 | 146 | 148 | 149 | 155 | 160 | 165 | 166 | 169 | 175 | 170 | 176 | 174 | 180 | 174 | 175 | 176 | 183 | 179 | 179 |
| 13 | 140 | 141 | 147 | 152 | 154 | 155 | 161 | 165 | 171 | 173 | 173 | 179 | 181 | 185 | 178 | 178 | 181 | 185 | 178 | 173 |
| 14 | 140 | 141 | 145 | 150 | 155 | 159 | 162 | 166 | 168 | 172 | 176 | 180 | 184 | 186 | 182 | 180 | 179 | 186 | 178 | 170 |
| 15 | 143 | 144 | 144 | 148 | 152 | 158 | 158 | 164 | 167 | 172 | 175 | 182 | 182 | 185 | 182 | 182 | 182 | 185 | 177 | 170 |
| 16 | 143 | 144 | 146 | 148 | 146 | 154 | 156 | 160 | 168 | 175 | 174 | 176 | 180 | 182 | 182 | 181 | 182 | 185 | 178 | 173 |
| 17 | 141 | 142 | 148 | 148 | 146 | 148 | 152 | 162 | 172 | 172 | 169 | 171 | 174 | 182 | 181 | 181 | 178 | 185 | 178 | 173 |
| 18 | 136 | 137 | 145 | 147 | 145 | 148 | 153 | 158 | 164 | 169 | 170 | 171 | 173 | 180 | 181 | 179 | 178 | 178 | 174 | 166 |
| 19 | 131 | 132 | 140 | 144 | 145 | 151 | 154 | 156 | 172 | 169 | 170 | 173 | 170 | 177 | 175 | — | 178 | 181 | 172 | 168 |

181-current

|    | 0    | 1    | 2    | 3    | 4    | 5    | 6    | 7    | 8    | 9    | 10   | 11   | 12   | 13   | 14   | 15   | 16   | 17   | 18   | 19   |
|----|------|------|------|------|------|------|------|------|------|------|------|------|------|------|------|------|------|------|------|------|
| 0  | 1412 | 1422 | 1455 | 1501 | 1564 | 1602 | 1628 | 1667 | 1686 | 1740 | 1745 | 1701 | 1658 | 1654 | 1655 | 1621 | 1602 | 1617 | 1647 | 1690 |
| 1  | 1422 | =SUM | 1461 | 1510 | 1572 | 1606 | 1629 | 1666 | 1678 | 1736 | 1742 | 1706 | 1673 | 1662 | 1663 | 1633 | 1626 | 1650 | 1669 | 1718 |
| 2  | 1438 | 1448 | 1463 | 1513 | 1577 | 1608 | 1630 | 1661 | 1670 | 1729 | 1738 | 1714 | 1686 | 1676 | 1674 | 1648 | 1650 | 1678 | 1690 | 1740 |
| 3  | 1447 | 1457 | 1469 | 1515 | 1583 | 1613 | 1639 | 1661 | 1665 | 1724 | 1733 | 1720 | 1693 | 1688 | 1683 | 1662 | 1672 | 1711 | 1709 | 1756 |
| 4  | 1447 | 1457 | 1474 | 1519 | 1583 | 1610 | 1642 | 1663 | 1667 | 1720 | 1731 | 1732 | 1711 | 1704 | 1694 | 1679 | 1696 | 1741 | 1729 | 1765 |
| 5  | 1446 | 1456 | 1474 | 1518 | 1580 | 1609 | 1646 | 1669 | 1669 | 1719 | 1729 | 1742 | 1732 | 1730 | 1712 | 1699 | 1719 | 1767 | 1746 | 1772 |
| 6  | 1450 | 1460 | 1471 | 1512 | 1571 | 1604 | 1643 | 1669 | 1671 | 1718 | 1725 | 1747 | 1748 | 1755 | 1730 | 1718 | 1740 | 1790 | 1762 | 1775 |
| 7  | 1449 | 1459 | 1469 | 1505 | 1558 | 1592 | 1633 | 1662 | 1673 | 1723 | 1725 | 1744 | 1757 | 1771 | 1747 | 1735 | 1759 | 1811 | 1777 | 1777 |
| 8  | 1443 | 1453 | 1467 | 1499 | 1546 | 1576 | 1616 | 1651 | 1677 | 1725 | 1724 | 1746 | 1762 | 1785 | 1761 | 1753 | 1778 | 1829 | 1787 | 1773 |
| 9  | 1432 | 1442 | 1463 | 1493 | 1532 | 1565 | 1601 | 1639 | 1684 | 1725 | 1721 | 1750 | 1768 | 1796 | 1774 | 1770 | 1791 | 1837 | 1784 | 1758 |
| 10 | 1418 | 1428 | 1456 | 1484 | 1516 | 1556 | 1590 | 1626 | 1684 | 1727 | 1725 | 1754 | 1769 | 1804 | 1777 | 1782 | 1797 | 1838 | 1774 | 1745 |

|   | 0 | 1 | 2 | 3 | 4 | 5 | 6 | 7 | 8 | 9 |
|---|---|---|---|---|---|---|---|---|---|---|
| 1 | 1639 | 1669 | 1670 | 1714 | 1726 | 1747 | 1754 | 1754 | 1734 | 1716 |

| 1412 | 1422 | 1455 | 1501 | 1564 | 1602 | 1628 | 1667 | 1686 | 1740 | 1745 | 1701 | 1658 | 1654 | 1655 | 1621 | 1602 | 1617 | 1647 | 1690 |
|------|------|------|------|------|------|------|------|------|------|------|------|------|------|------|------|------|------|------|------|
| 1422 | 1432 | 1461 | 1510 | 1572 | 1606 | 1629 | 1666 | 1678 | 1736 | 1742 | 1706 | 1673 | 1662 | 1663 | 1633 | 1626 | 1650 | 1669 | 1718 |
| 1438 | 1448 | 1463 | 1513 | 1577 | 1608 | 1630 | 1661 | 1670 | 1729 | 1738 | 1714 | 1686 | 1676 | 1674 | 1648 | 1650 | 1678 | 1690 | 1740 |
| 1447 | 1457 | 1469 | 1515 | 1583 | 1613 | 1639 | 1661 | 1665 | 1724 | 1733 | 1720 | 1693 | 1688 | 1683 | 1662 | 1672 | 1711 | 1709 | 1756 |
| 1447 | 1457 | 1474 | 1519 | 1583 | 1610 | 1642 | 1663 | 1667 | 1720 | 1731 | 1732 | 1711 | 1704 | 1694 | 1679 | 1696 | 1741 | 1729 | 1765 |
| 1446 | 1456 | 1474 | 1518 | 1580 | 1609 | 1646 | 1669 | 1669 | 1719 | 1729 | 1742 | 1732 | 1730 | 1712 | 1699 | 1719 | 1767 | 1746 | 1772 |
| 1450 | 1460 | 1471 | 1512 | 1571 | 1604 | 1643 | 1669 | 1671 | 1718 | 1725 | 1747 | 1748 | 1755 | 1730 | 1718 | 1740 | 1790 | 1762 | 1775 |
| 1449 | 1459 | 1469 | 1505 | 1558 | 1592 | 1633 | 1662 | 1673 | 1723 | 1725 | 1744 | 1757 | 1771 | 1747 | 1735 | 1759 | 1811 | 1777 | 1777 |
| 1443 | 1453 | 1467 | 1499 | 1546 | 1576 | 1616 | 1651 | 1677 | 1725 | 1724 | 1746 | 1762 | 1785 | 1761 | 1753 | 1778 | 1829 | 1787 | 1773 |
| 1432 | 1442 | 1463 | 1493 | 1532 | 1565 | 1601 | 1639 | 1684 | 1725 | 1721 | 1750 | 1768 | 1796 | 1774 | 1770 | 1791 | 1837 | 1784 | 1758 |
| 1418 | 1428 | 1456 | 1484 | 1516 | 1556 | 1590 | 1626 | 1684 | 1727 | 1725 | 1754 | 1769 | 1804 | 1777 | 1782 | 1797 | 1838 | 1774 | 1745 |

METHODS AND APPARATUS FOR HANDHELD PRINTING WITH OPTICAL POSITIONING

This application claims priority to and benefit of U.S. Provisional Patent Application Ser. No. 60/827,117, filed Sep. 27, 2006, entitled "Optical Navigation System using Reduced Reference and Sample Objects and Enhanced Target Tracking Method."

FIELD OF THE INVENTION

Generally, the present invention relates to handheld printers. Particularly, it relates to improving print quality in handheld printers of the type able to print in random motion patterns. In one aspect, sensors optically provide position information of the printer regardless of user movement patterns. In another, particular printer control architectures are contemplated. Still other aspects relate to computational efficiencies relative to position sensor signals. Other noteworthy features relate to assessing validity of position sensor signals.

BACKGROUND OF THE INVENTION

As is known, handheld printers afford mobile convenience to users. Unlike their immobile or stationary counterparts, users determine the navigation path of a given swath of printing. In some instances, this includes random movement over a media. In others, it includes back-and-forth movement attempting to simulate a stationary printer. Regardless, successful handheld printing dictates that image information relative to the printer location be available at all times. However, all users do not navigate in the same fashion. Nor do they navigate at the same speed or housing orientation. For at least these reasons, handheld printers rely heavily on sensor inputs, such as those from optical sensors or encoders, for printing images. Yet, sensor inputs are sometimes limited in their capabilities and print jobs are interrupted due to lost or inaccurate printer location calculations.

If the printer location ever becomes lost, the printer can either quit printing or guess at location. If printing quits, users have incomplete print jobs. If locations are guessed, print quality suffers. In either, poor results are obtained. In the event printer locations are not completely lost, but simply inaccurate, print quality suffers because of inappropriately placed ink print patterns being deposited on the media. Error accumulation also adds to the problem of ink placement.

To overcome this, certain prior art has suggested sensors that identify typographic structures on the media to determine position of the printhead relative to the paper. This has shortcomings, however, for want of positioning assistance in areas or regions of the media where no typographic structures exist.

In other art, optical sensors are employed to correlate current locations to previous locations to find a delta between the locations. Appreciating typical optical sensors have numerous data pixels, correlation becomes computationally extensive because comparisons of large amounts of pixel data to other large amounts of pixel data require large storage and processing power. Because the sensors also sample fairly rapidly, the volume of pixel data increases quickly thereby requiring correlation techniques to have relatively fast processing times.

Accordingly, there exists a need in the art for robust, multi-directional and random printing handheld printers having improved print quality. Particularly, there are needs by which handheld printers are able to ascertain position regardless of particularized media area or regions. The need further extends to processing of sensor signals with less computational complexity while still remaining fast and powerful. Naturally, any improvements should further contemplate good engineering practices, such as relative inexpensiveness, stability, flexibility, ease of manufacturing, etc.

SUMMARY OF THE INVENTION

The above-mentioned and other problems become solved by applying the principles and teachings associated with the hereinafter described handheld printing with optical positioning. Specifically, methods and apparatus contemplate handheld printers manipulated randomly or predictably over a media on which an image is printed. In this regard, a position sensor transmits and receives light from the media and an output signal thereof is provided to a controller to assist in ascertaining positioning of the printer regardless of how users maneuver the printer. Over time, the position sensor signal typifies a previous location and a current location. The controller searches the current location for a presence of the previous location and correlates same to a printhead for printing the image or not. To improve computational efficiency, the controller reduces a relative size of the signals from the position sensor before conducting the searching. In a basic sense, the previous frame of pixel data is reduced in size to a target frame, in turn, reduced to a one-dimensional matrix form. The current frame is reduced in sized to a two-dimensional form with one-dimensional portions thereof, having a same size as the one-dimensional matrix form of the previous frame, being searchable for a presence of the one-dimensional matrix form. In a correlation matrix, a highest correlation between values of the one-dimensional matrix form and the one-dimensional portion of the two-dimensional current frame indicate the presence of the previous in the current. In this manner, aspects of the invention define an optical navigation system for a handheld printer that builds upon prior art correlation approaches between past and present positioning signals, or data, for determining movement. It features the use of variations in computation of correlation and other distortion functions to minimize computation. The navigation system also employs an enhanced search algorithm to further reduce significantly the computation thereby making it fit for real-time application.

Methods and apparatus further include handheld printers manipulated back and forth by an operator during use to print an image on a media. The image is printed with various actuators of an inkjet printhead and a controller correlates the location of the printhead to the image and causes printing by the actuators or not as a user maneuvers a housing of the printer. A position sensor, preferably optical, provides input to the controller. The sensor is also representatively an off-the-shelf type sensor to facilitate manufacturing simplicity and minimize costs. Its signal typifies a plurality of pixels (representing grayscale values of light reflected from the media) in a matrix frame indicating a current position frame and, over time, a previous position frame. The controller compares the two frames to find a presence of the previous position frame in the current frame, in turn, ascertaining a location of the printer and printhead. As before, the controller reduces a relative size of both frames before the step of comparing to improve computational efficiency, especially by way of speeding-up the process of evaluation. Specific reduction techniques contemplate converting a matrix frame of pixels in m×n form indicative of a previous and current location, where m and n may equal one another, into smaller matrices, including one-dimensional and square matrix forms. Possible search areas within the current frame showing a presence of the previous frame utilize knowledge about the previous movement history of the printer to predict where-to-look locations.

Position sensor signal validity and handheld printer controller architectures are other noteworthy features. For example, position sensor signal validity contemplates an intake checker between the sensor and controller, or as part and parcel of the controller, that arranges the information of the sensor signal so that a relative distance between the housing and the media can be ascertained. It also contemplates establishment of a threshold inquiry determining whether the housing of the printer is relatively close or far away from the media and whether such is sufficient to conduct further signal processing. Validity checking also considers application per every signal received from the sensor or application randomly, on occasion or at predetermined time intervals.

In still other embodiments, architecture of the handheld printer contemplates one or more position sensors, a controller and an inkjet printhead that are coordinated to print an image. As part of the functionality of the controller, such as part of an ASIC, discrete chips, a microprocessor, software, firmware, etc., the controller includes one or more of: a transformer or reducer to reduce a relative size of the output of the position sensor, including a summation component to sum full or partial rows or columns of the matrix form of the position sensor signal to make the signals smaller; a comparator to ascertain differences between position sensor signals indicative of current and previous locations, or to find a presence of the previous location within the current location; and a navigation output calculator to track and make inferences/calculations contemplating prior movements or history of the printer housing movement when examining possible search areas within the current location for instances of the previous location. Local or remote storage for the controller is also contemplated.

These and other embodiments, aspects, advantages, and features of the present invention will be set forth in the description which follows, and in part will become apparent to those of ordinary skill in the art by reference to the following description of the invention and referenced drawings or by practice of the invention. The aspects, advantages, and features of the invention are realized and attained by means of the instrumentalities, procedures, and combinations particularly pointed out in the appended claims.

BRIEF DESCRIPTION OF THE DRAWINGS

The accompanying drawings incorporated in and forming a part of the specification, illustrate several aspects of the present invention, and together with the description serve to explain the principles of the invention. In the drawings:

FIG. 8B is a diagrammatic view in accordance with the present invention of the representative signal of the position sensor in matrix form as seen in FIG. 8 with an identified target frame therein;

FIGS. 11A-11D are diagrammatic views in accordance with the present invention showing a search for correlation between previous and current locations as one or more matrix frames, including searching of a reduced or smaller matrix frame of pixels indicative of the current location being searched for a presence of the reduced or smaller matrix frame of pixels indicative of the previous location;

FIG. 12 is a diagrammatic view in accordance with the present invention showing a correlation matrix between previous and current locations for FIGS. 10-11D;

FIG. 14 is a diagrammatic view in accordance with the present invention showing the effects of a representative signal of a position sensor in matrix form indicative of a current location of the handheld printer being reduced in relative size;

FIGS. 15A-15D are diagrammatic views in accordance with the present invention showing a search for correlation between previous and current locations as one or more matrix frames, including searching of a reduced or smaller matrix frame of pixels indicative of the current location being searched for a presence of the reduced or smaller matrix frame of pixels indicative of the previous location;

FIGS. 18A-18D are diagrammatic views illustrating the computational extensiveness which must be undertaken if an entirety of a matrix frame of pixels indicative of the previous location were searched for in an entirety of a matrix frame of pixels indicative of the current location; and FIGS. 19-30 are diagrammatic views in accordance with the present invention of possible search areas to locate a presence of a matrix frame of pixels indicative of a previous location in a matrix frame of pixels indicative of a current location.

DETAILED DESCRIPTION OF THE PREFERRED EMBODIMENTS

Figure 1:
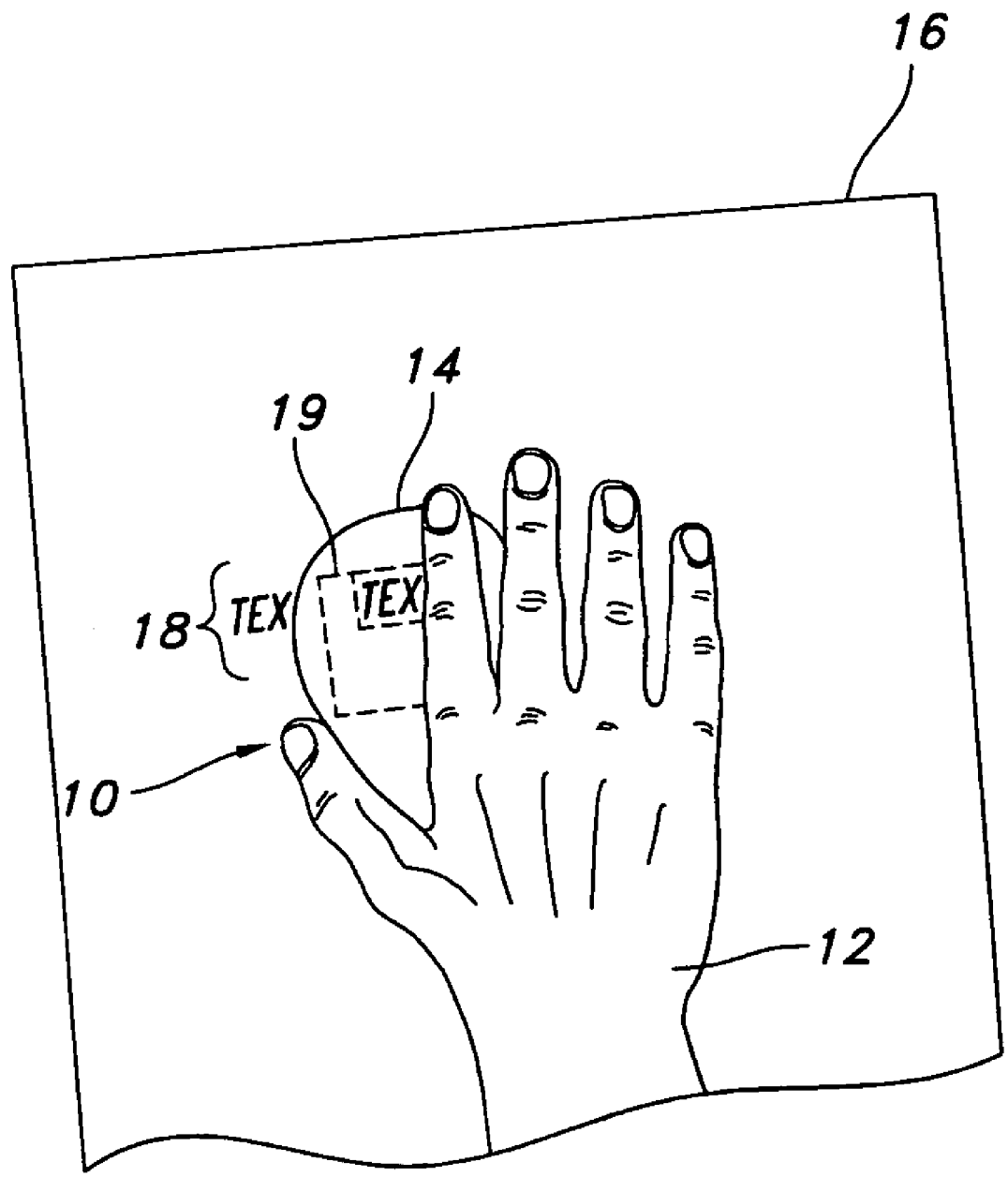
FIG. 1 is a diagrammatic view in accordance with the present invention of a handheld printer.

In the following detailed description of the preferred embodiments, reference is made to the accompanying drawings that form a part hereof, and in which is shown by way of illustration, specific embodiments in which the invention may be practiced. These embodiments are described in sufficient detail to enable those skilled in the art to practice the invention and like numerals represent like details in the various figures. Also, it is to be understood that other embodiments may be utilized and that process, mechanical, electrical, architectural, software and/or other changes may be made without departing from the scope of the present invention. In accordance with the present invention, a handheld printer for printing with optical positioning, especially by way of optical position sensors, is hereafter described.

Preliminarily, however, skilled artisans will appreciate that an iterative process occurs in evaluating signals (and attendant data) from position sensors in a handheld printer. That is, a current or present signal will over time become a previous signal, while another signal thereafter becomes another current or present signal, and so on. In other words, that which is current becomes previous, and that which is most recently obtained is current. The description, therefore, may sometimes refer to a current or present signal as a previous signal, when in the context of comparison to a later signal. Appreciating embodiments of position sensors often provide an analog output that varies over time, this concept also extends to manipulations of the position sensor signal itself and whether such exists in the confines of the sensor or in downstream processing structures and/or software, firmware, etc., such as is observed in digitized representations of an analog output. Still further, optical position sensors often render an output signal that varies over time, but the information therein may represent a two-dimensional array or matrix of pixels, each pixel with their own data. Thus, signals of position sensors, while shown hereafter as two-dimensional matrix frames of pixels of data, may also embody their analog counterpart, not shown, that is manipulated by the sensor and/or in downstream processing structures and/or software, firmware, etc.

For clarity, the terms pixels of data, arrays, matrix frames, matrix, matrix form, or the like, whether used singularly or as plurals, may be used interchangeably throughout the specification. Because a transformation or reduction of relative sizes of signals from position sensors are also taught in the specification, this further translates into a transformation or reduction of relative sizes of matrix frames, matrices, and forms thereof, and vice versa, for the signals of position sensors that are regularly described hereafter in matrix form. Also, representations of a matrix frame of pixels of data may have a certain matrix size or form and, because of a later reduction in that size or form, a representation in the specification of a smaller matrix compared to a larger matrix may be given. For example, a matrix frame may have an initial size of 20×20 pixels of data. In reduction, it may be made smaller into a 10×10 form, in turn, made smaller into a 1×10 or 10×1 form. Alternatively, a 20×20 form may be reduced in relative size to a 11×20 or 20×11 form that is searched for a presence of the 1×10 or 10×1 form. This does not mean, however, that the sizes given are limiting, unless so defined in the claims, and that any matrix size is acceptable herein. The addition of extra pixels of data may also be found in a reduced size of a matrix frame or signal and still be embraced by the invention. In other words, the notion of the instant invention is not limited by the addition of extra elements. As an example, a matrix frame of pixel data having a 20×20 matrix form that is reduced into an 11×20 matrix form, further contemplates pixels above the limit of 11×20. That is, so long as whole or parts thereof have a reduction, the concept applies. From the specification below, this will become more apparent to those of ordinary skill in the art.

With reference to FIG. 1, a handheld printer of the invention for printing with optical positioning is given generically as 10. It includes a housing 14 that an operator 12 maneuvers or manipulates back and forth over a media 16 to print an image 18. In various embodiments, the image is text, figures, combinations of text and figures or the like. They are typified in color and/or black and white and formed of ink ejected or expelled from an internal printhead. Also, the printer optionally includes a viewable display panel 19 (dashed line) to assist the operator during printing, such as by showing the image being printed or by providing housekeeping menus, calibration routines, or other user features or options.

Figure 2:
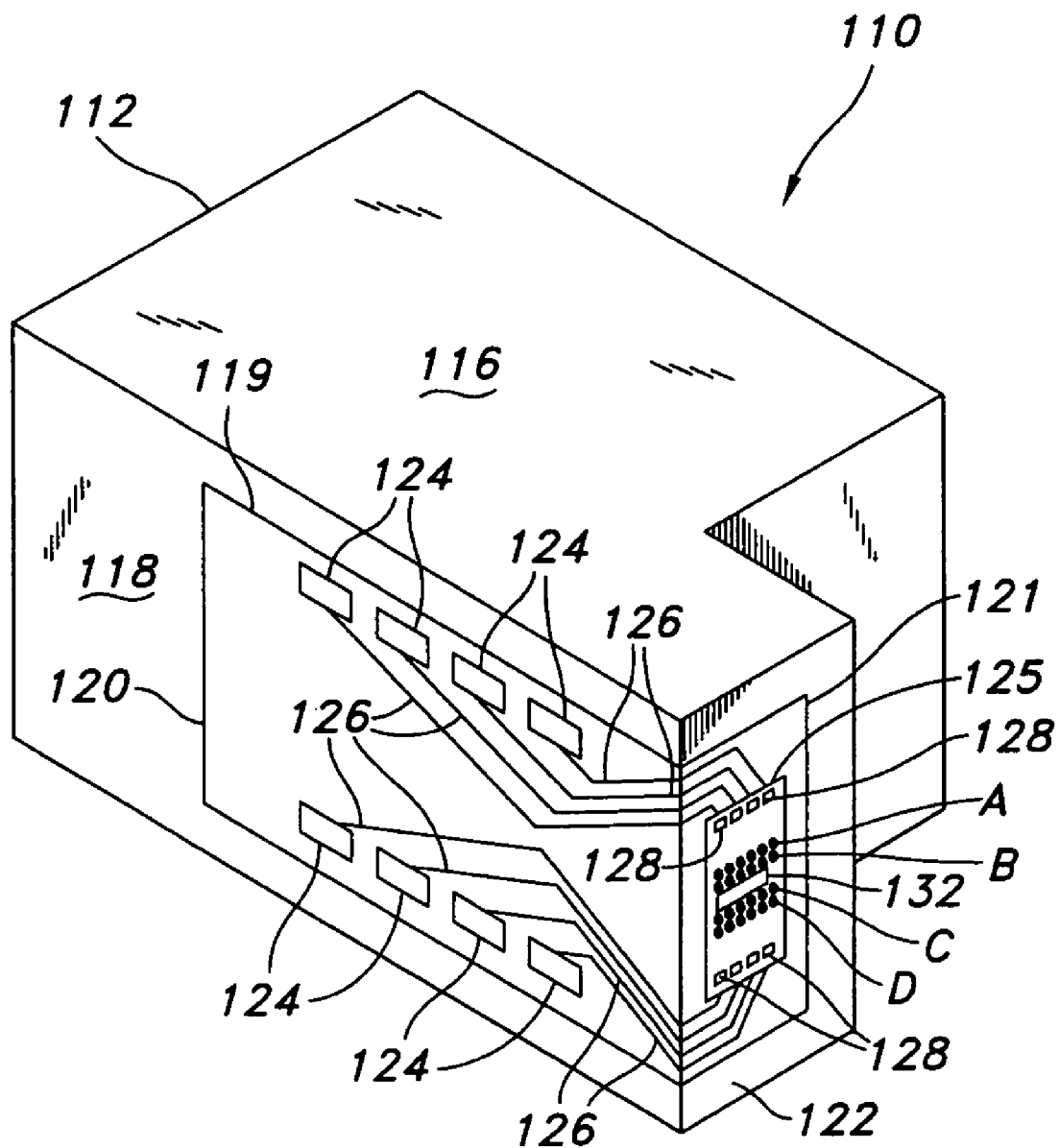
FIG. 2 is a diagrammatic view in accordance with the present invention of a representative inkjet printhead for use in the handheld printer of FIG. 1.

In FIG. 2, a representative inkjet printhead of the printer internal to the housing [14] is shown generally as 110. It includes its own housing 112 having a shape that depends upon the shape of the printer. The housing has at least one internal compartment 116 for holding an initial or refillable supply of ink. In one embodiment, the compartment contemplates a single chamber holding a supply of black, cyan, magenta or yellow ink. In other embodiments, it contemplates multiple chambers containing multiple different colored inks. In one instance, it includes supplies of cyan, magenta and yellow ink. In still other embodiments, it includes plurals of black, cyan, magenta and/or yellow ink. It also contemplates separability from the housing 112 and/or printhead 110, despite being shown locally integrated within the housing.

At one surface 118 of the housing 112 is a portion 119 of a flexible circuit, especially a tape automated bond (TAB) circuit 120. At 121, another portion 121 is adhered to surface 122. Electrically, the TAB circuit 120 supports a plurality of input/output (I/O) connectors 124 for connecting an actuator chip 125 (also known as a heater chip or transducer chip) to the handheld printer during use. Pluralities of electrical conductors 126 exist on the TAB circuit to connect and short the I/O connectors 124 to the input terminals (bond pads 128) of the actuator chip 125 and skilled artisans know various techniques for facilitating this. In an exemplary embodiment, the TAB circuit is a polyimide material and the electrical conductors and connectors are copper or aluminum-copper. For simplicity, FIG. 2 shows eight I/O connectors 124, electrical conductors 126 and bond pads 128 but present day printheads have larger quantities and any number is equally embraced herein. Also, skilled artisans will appreciate that the number of connectors, conductors and bond pads, while shown as equal to one another, may vary unequally in actual embodiments.

At 132, the actuator chip 125 contains at least one ink via that fluidly connects to the ink of the compartment 116. During printhead manufacturing, the actuator chip 125 is attached to the housing with any of a variety of adhesives, epoxies, etc., as is well known in the art. To eject ink, the actuator chip contains columns (column A-column D) of fluid firing actuators, such as thermal heaters. In other actuator chips, the fluid firing actuators embody piezoelectric elements, MEMs devices, and the like. In either, this crowded figure simplifies the actuators as four columns of six dots or darkened circles but in actual practice the actuators might number several dozen, hundred or thousand. Also, vertically adjacent ones of the actuators may or may not have a lateral spacing gap or stagger in between. In general, the actuators indeed have vertical spacing, such as about $1/300^{th}$, $1/600^{th}$, $1/1200^{th}$, or $1/2400^{th}$ of an inch along the longitudinal extent of the via. Further, the individual actuators are typically formed as a series of thin film layers made via growth, deposition, masking, patterning, photolithography and/or etching or other processing steps on a substrate, such as silicon. A nozzle member with pluralities of nozzle holes, not shown, is adhered to or fabricated as another thin film layer on the actuator chip such that the nozzle holes generally align with and are positioned above the actuators to eject ink at times pursuant to commands of a controller.

Figure 3:
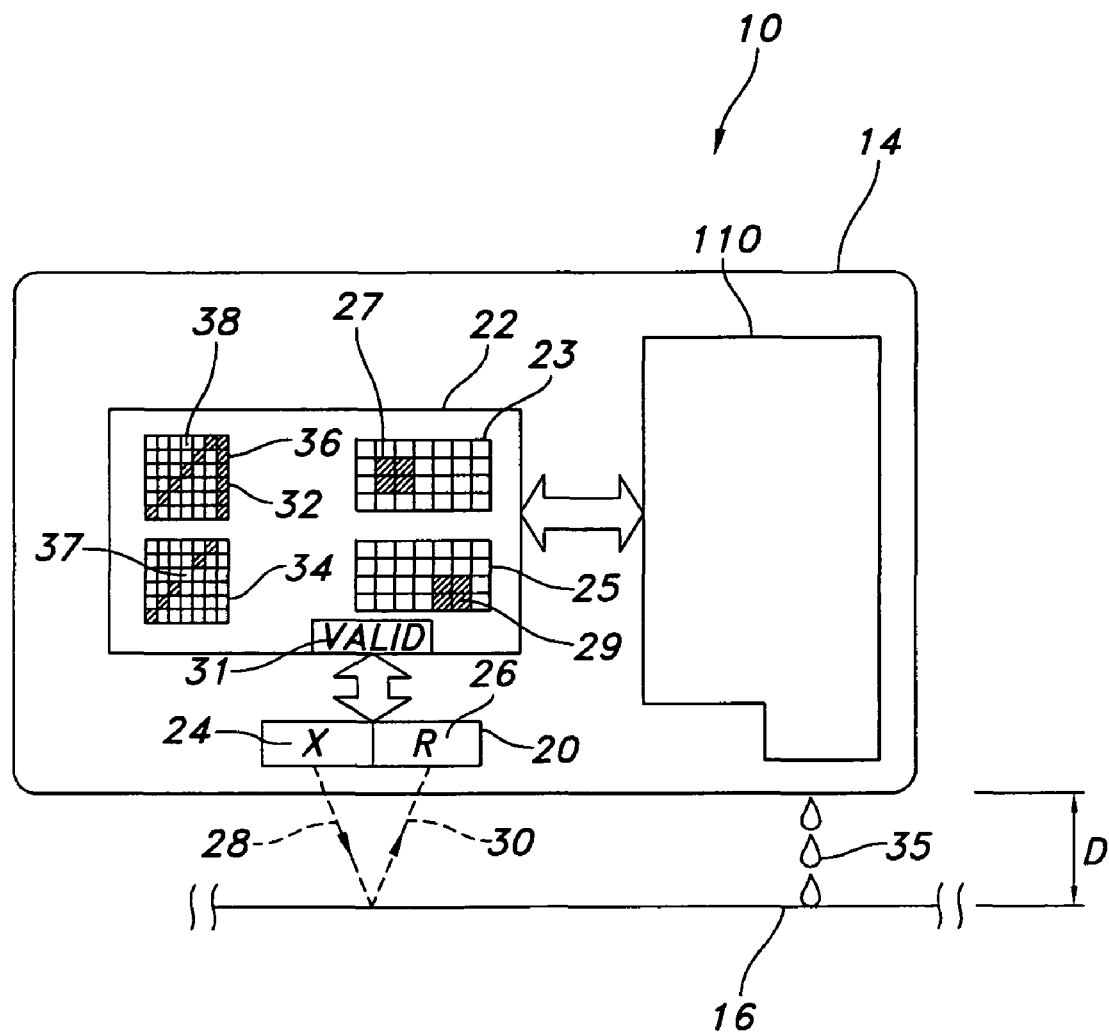
FIG. 3 is a diagrammatic view in accordance with the present invention of a representative control arrangement of a handheld printer having optical positioning.

With reference to FIG. 3, a greatly exaggerated view of the handheld printer 10 shows a position sensor 20 and a controller 22. The position sensor, preferably of the optical type, includes a transmitter 24 and a receiver 26 that together shine light 28 and capture reflections 30 from the media 16. As is known, media surfaces have random textures (on a micro scale), which then create observable and reflected shadows upon application of light. Eventually, the manipulation of the signals obtained from the sensor regarding the shadows enables understanding the position or location of the housing, especially printhead 110, and is made known at the controller regardless of random or predictable movement of the housing 14 by an operator. In a basic sense, this includes the controller 22 being able to discern content of a signal(s) output from the position sensor, and supplied as an input to the controller, and correlating it to the printhead, especially its individual fluid firing actuators to eject ink 35 to print an image. In a more detailed sense, this includes the controller being able to compare a signal of the position sensor indicative of a previous location 23, shown as a 4×7 matrix of pixels, to a signal of the position sensor indicative of a current location 25, shown as another 4×7 matrix of pixels, each having four hatched pixels translated from a first position 27 to a second, later position 29. Representatively, the four hatched pixels indicate relatively dark grayscale values on the media 16 that are observed in different orientations over time as a user or operator manipulates the housing 14 to print and image. In turn, the controller is to discern a difference between the previous and current locations and correlate same to the location of the printhead. The controller need also do this quickly and efficiently, as described below. In one instance, this means the controller will examine or search the current location for a presence, such as the four hatched pixels, of the previous location. To improve computational efficiency, it also means the controller will reduce a relative size of the signals from the position sensor before conducting the searching, as seen below.

In other aspects, the controller contemplates an intake checker 31 between the sensor and controller, or part and parcel of the controller, to assess validity of the signal(s) of the position sensor and to arrange the information thereof such that an actual or proximate relative distance D between the housing and the media can be ascertained. It also contemplates establishment of a threshold inquiry determining whether the housing of the printer is relatively close or far away from the media and whether such is sufficient to conduct further signal processing. As will be seen with reference to FIGS. 7A and 7B, operators of the handheld printer have freedom to lift the housing from the media and, if too far away from the media, the signal from the position sensor becomes fairly unusable, or invalid. On the other hand, touching the housing to the media or positioning it within a predetermined close interval renders the signal, and its attendant data, valid. Validity checking also considers application per every instance of a signal received from the sensor or application that occurs randomly, on specified occasions or at predetermined times.

In addition, the controller 22 contemplates a to-be-printed representation of an image 32, especially in bitmap form. In turn, it correlates the position of the printhead, especially individual actuators, to the image. It then prints the image with ink 35 on the media 16 according to the image pattern 36 in the pixels 38. A has-been-printed image 34 may also be stored or accessed by the controller to keep track of future printing and to determine whether the image has been printed completely or not. In structure, the controller embodies an ASIC, discrete IC chips, FPGA's, firmware, software, a microprocessor, combinations thereof or the like. Alternatively, the to-be-printed image 32 is dynamically updated to remove pixels that have been printed so that the has-been printed information 34 is merged with the to-be-printed information. In either, the controller further includes a memory to keep track of image data. The memory also includes storage and accessibility relative to position sensor signals and their manipulation to compute printer location. Memory will also find utility in general housekeeping matters, such as storage of an operating system, of sorts, display panel items, print jobs, user features, etc. In some figures, memory will be shown, as a whole or in part, with a fairly traditional cylinder symbol.

While not intuitive, the mentioning of a position sensor 20 as an optical sensor structure does not mean the positioning is limited to optics, per se. For instance, skilled artisans will appreciate that a sophisticated x-y mechanical encoder could also provide position sensor information for reasons relating to previous and current positioning information. The same is also true of structures having energy in other than a traditionally optical range. That is, optics may include infrared (IR) or radio frequency (RF) ranges and technology. For convenience, however, all of the foregoing and any and all other hereafter developed technology able to provide current location information and, over time, previous location information, fall under the heading of "optical" positioning, signals, position sensors, position data, etc.

Figure 4:
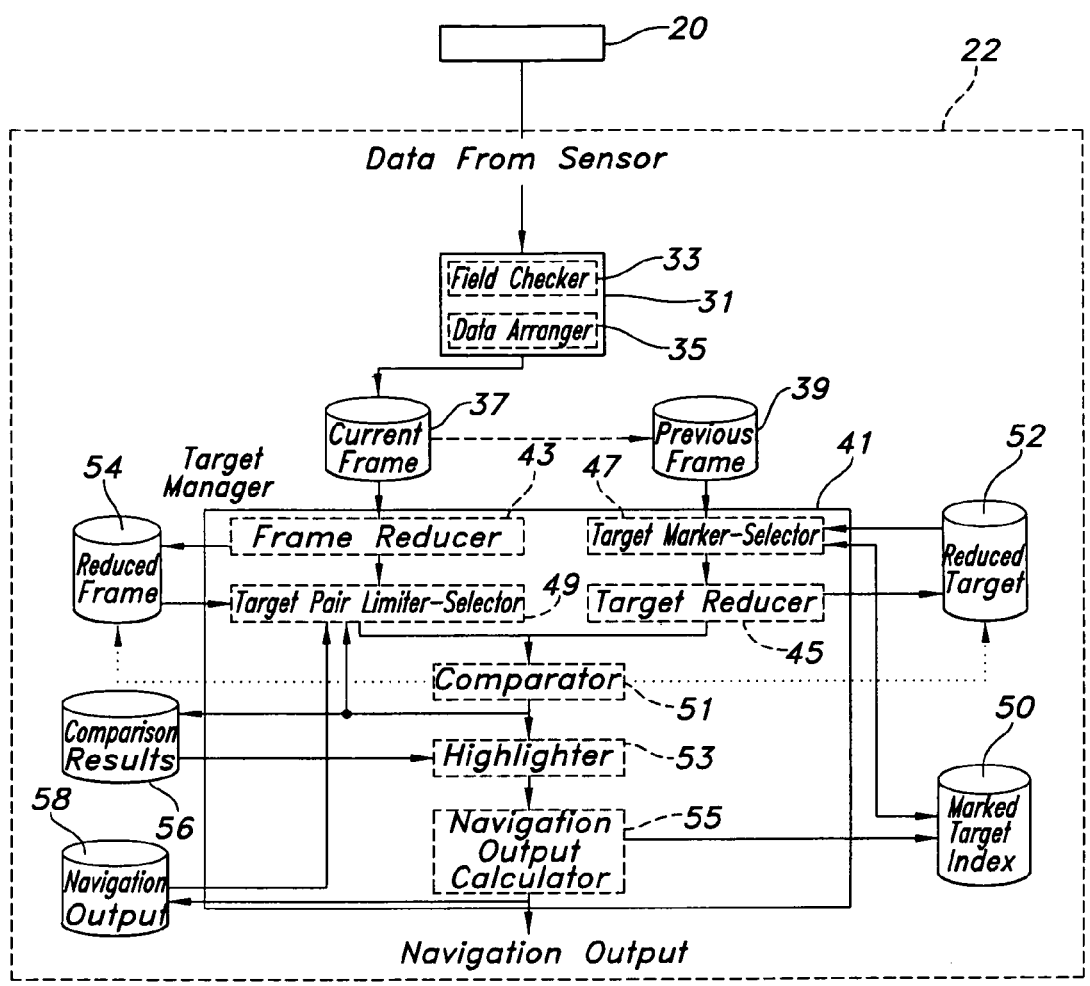
FIG. 4 is a diagrammatic view in accordance with the present invention of a more detailed version of the control arrangement of the handheld printer having optical positioning.

With reference to FIG. 4, a more detailed accounting of the architecture of the controller of the handheld printer is described. On a macro scale, a controller is effectively all functional components within the dashed boundary 22. Alternatively, it is only select components thereof. For instance, the intake checker 31 has already been mentioned as separable from the controller or part of the controller. The same is true of any of the memory cylinders shown. It is even plausible that the sensor (20) itself can be an integral part of the controller, despite being shown detached. Thus, skilled artisans will not prescribe any artificial, physical or functional boundaries to the controller, unless specifically claimed.

In arrangement, the controller includes an intake checker 31 that receives the signals from the position sensor 20. Its role, then, is twofold. First, it is to assess the validity of the signal, e.g., whether the printer housing exists close enough or too far away from the media to be effective and such is the role of the field checker component 33. Second, it is to arrange the data of the signal into current and previous frames 37, 39 and such is the role of the data arranger component 35.

Figure 8A:
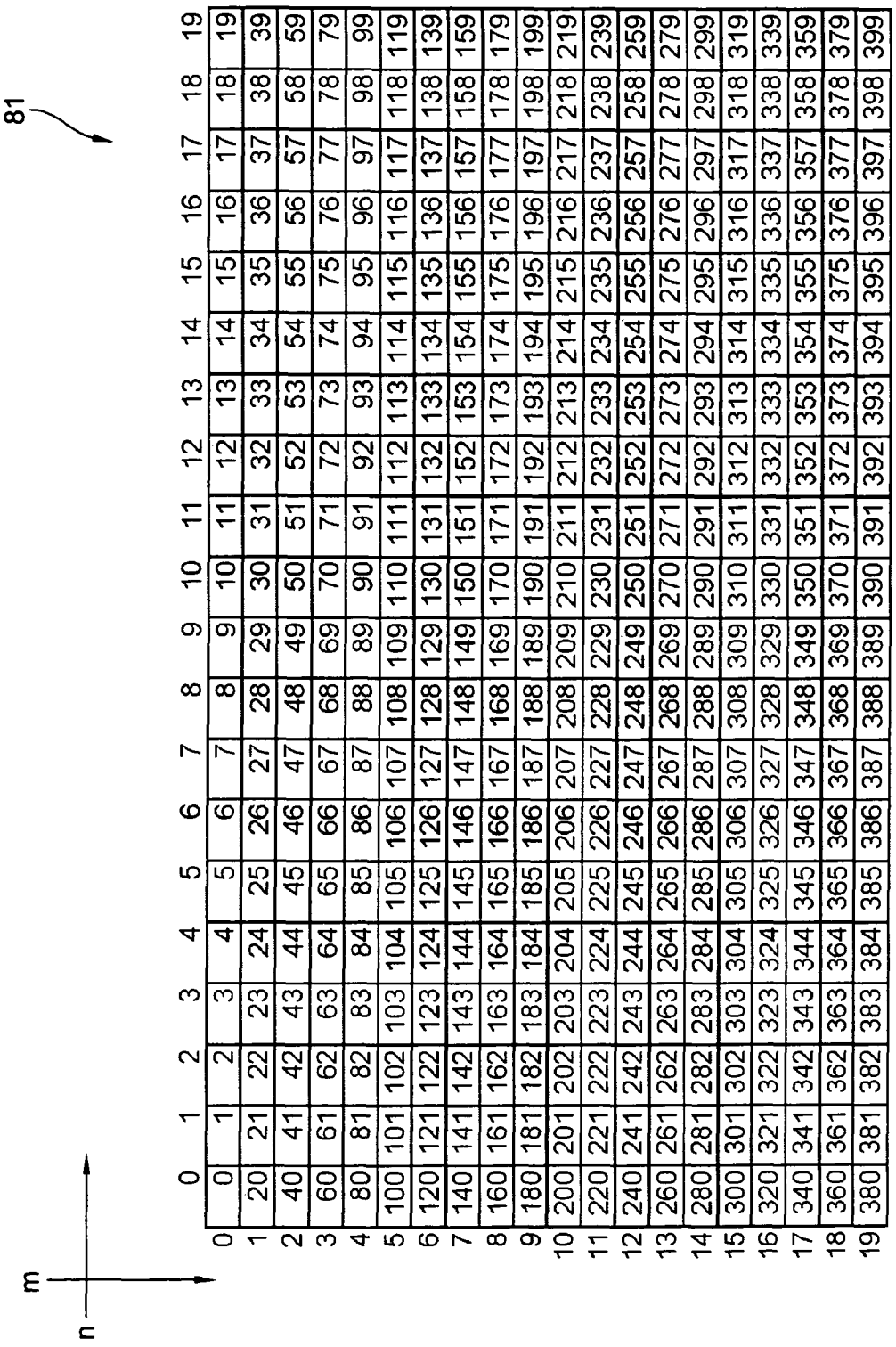
FIG. 8A is a diagrammatic view in accordance with the present invention of a representative signal of a position sensor in matrix form.

With this in mind, a typical signal from the position sensor is of an analog form that becomes converted into digital form representatively described herein as frame data, matrix data, pluralities of pixels arranged as a matrix or in matrix form, or by use of other similar language. In general, this digital form consists of a two-dimensional form of pixels having a matrix size of m×n, whereby m and n may be equal or unequal. In a representative embodiment, FIG. 8A shows a signal of a position sensor in m×n matrix form 81, whereby both m and n equal 20 (e.g. 20×20). In turn, each pixel thereof (labeled from pixel index 0 at the m×n grid location (0, 0) to pixel index 399 at the m×n grid location (19, 19)) includes a value corresponding to a grayscale value received by the sensor that represents a light intensity, of sorts, of the surface texture of the media captured at a given instance of time. As shown later, these values typically embody one of 256 grayscale values that range in value from 0 to 255, inclusive. Of course, other range values for grayscale and altogether other scales are contemplated as the data value of the matrix or any given pixel.

With reference back to FIG. 4, skilled artisans will understand that the frame data of the position sensor is a single instance of time and that over time the values in the matrix, per each pixel, change. In this regard, the intake checker then arranges information as a current frame 37 and, over time, a previous frame 39. The process also continually repeats, i.e., the current frame becomes the previous frame upon receipt of a next instance of current information in a signal from the position sensor. The previous frame, however, is discarded to avoid issues of overfilling memory, so to speak. Also, the representation borne by each of the current and the previous frame relates ultimately to a position of the housing of the printer relative to the media. As used hereafter, the current frame is then a matrix representation of the signal of the position sensor indicative of a current location of the printer, e.g., a current position frame. On the other hand, the previous frame is a matrix representation of the signal of the position sensor indicative of a previous location of the printer, e.g., a previous position frame, and was once a current frame earlier in time.

Within computational box 41 of the controller, a variety of functional components serve to determine a precise location of the printer, in turn, to correlate same to the printhead, especially the fluid firing actuators and to the image to-be-printed on the media. In general, the components consist of: both frame and target reducers 43, 45; a target market-selector 47; a target pair limiter-selector 49; a comparator 51; a highlighter 53; a navigation output calculator 55; and memories to store and retrieve certain computations. As with the controller, however, physical boundaries are shown with each component, but are not to be limited to any artificial, physical or functional boundaries unless specifically claimed.

At a high level, the components compare the current and previous frames to find a presence of the previous frame in the current frame, in turn, ascertaining a location of the printer and printhead. To improve computational efficiency, the components reduce a relative size of both frames before comparing. In this manner, the process of comparison evaluation is sped-up and storage requirements are minimized relative to the prior art, for example. To a lesser extent, computational efficiency could also be realized by a reduction of a single frame, vice two frames, and the claims support such a construction, but it is preferred to reduce both frames. Frame reduction can also occur in parallel for the current and previous frames or in series, with either reduction occurring first.

Figure 5:
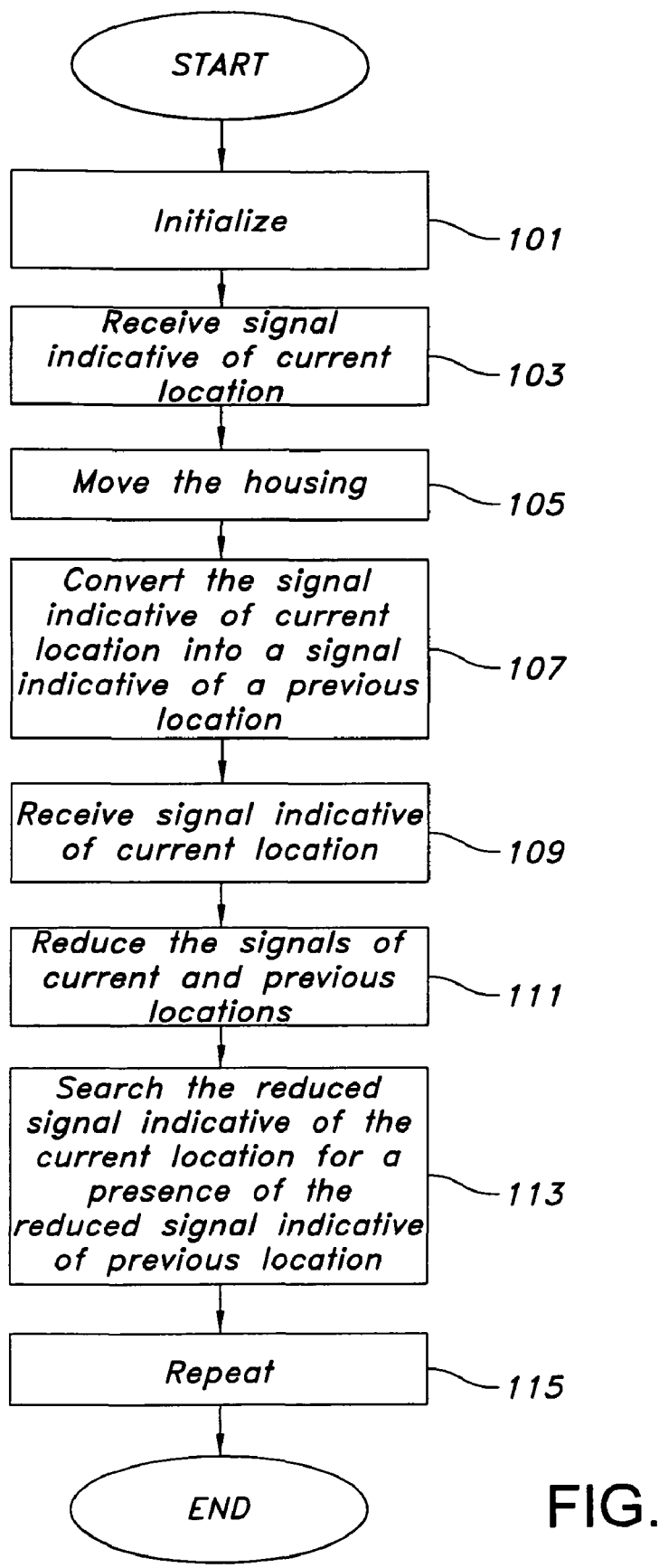
FIG. 5 is a flow chart in accordance with the present invention for representatively improving computational efficiency of a handheld printer relative to signals of a position sensor.

Remaining at a high level of discussion, FIG. 5 shows a general flow of this process. First, step 101 sets an initialization. That is, before processing can begin, structural or functional components of the printer may be calibrated, undergo power-up or maintenance routines, for example. Thereafter, step 103 illustrates the reception of a signal from the position sensor indicative of a current location of the printer. At step 105, the housing is sometime thereafter manipulated by an operator and is moved relative to the media upon which printing occurs. (At this point, skilled artisans should appreciate that a handheld printer is not limited to printing on traditional media, such as paper or transparencies. Rather, the printer can be located anywhere, because of its mobility, and therefore print directly on a surface of an item, such as a desk, a wall, a floor, an automobile, carpet, wood, steel, and the list goes on indefinitely. The term media, therefore, embraces all surfaces on which the printer can cause an image to appear. Images also need not be formed with ink, as might be more prevalent in the marketplace. For example, inkjet printheads might be filled with any of a variety of substances, such as paint, frosting, toner, or other to form pictures, cake decorations or the like.)

At steps 107 and 109, a new signal (or continuation of the previous signal separated in time from earlier, appreciating that the position sensor might provide its output as a contiguous analog stream of data (and/or noise) that varies over time) is received from the position sensor, such that the signal indicative of the current location at step 103 has now become a signal indicative of a previous location of the printer and the new signal is now the signal indicative of the current location of the printer. At step 111, the controller reduces the relative size of the signals, both the current and previous, to search the reduced signal indicative of the current location of the printer for a presence of the reduced signal indicative of the previous location of the printer, step 113. In that a prior signal (either embodied as a previous or current signal) was given in matrix form as m×n, where m and n equaled one another at size 20×20, the controller will reduce the 20×20 form into something less, such as 1×20, 20×1, 20×11, etc., and the searching will examine the 20×11 form for a presence of the 1×10 form, for example, including or not intermediate reductions of size of one or more of the matrices.

Once the comparison or searching of frames reveals the presence of the earlier in the latter, e.g., the previous in the current, the controller will use this information to correlate the printer to the printhead and to the image for printing. It will also keep track of this data in the sense that operators of printers often traverse the housing in a given direction of movement, such that a history of prior movement can be used to help minimize search areas in the current frame for a presence of the previous frame. That is, if a movement trend is established by an operator, the presence of the earlier data can be first examined in a certain area of the current data, to save search time. This notion, however, will be addressed in greater detail later. Returning to the flow chart, repeat processing of steps 103 through 113 occurs over and over again, for as many times necessary, to continually know position or navigate the printer.

Figure 6:
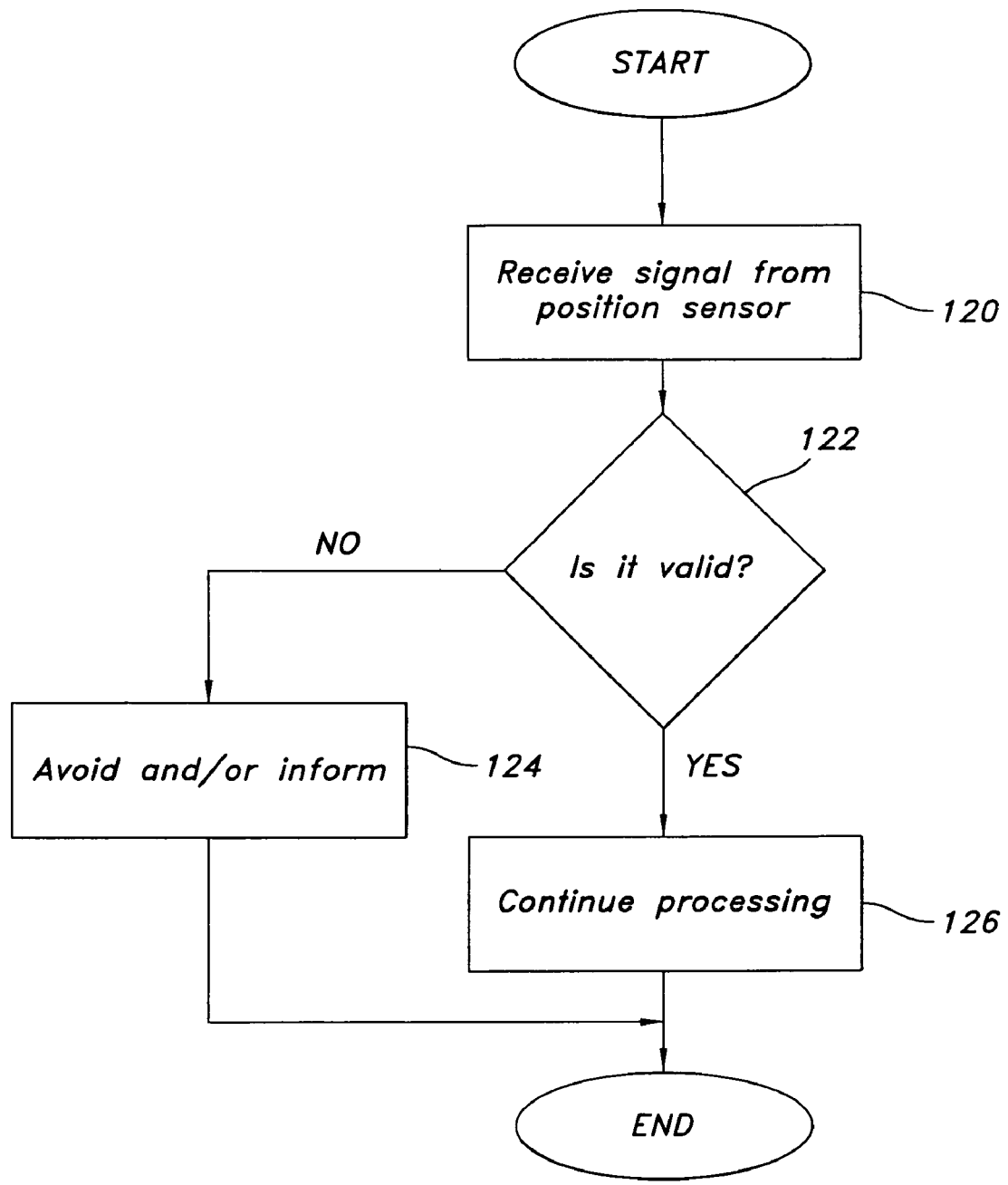
FIG. 6 is a flow chart in accordance with the present invention for representatively assessing validity of signals from a position sensor.

With reference to FIG. 6, and also at a high level of functionality, the process of the intake checking by way of checker 31 (FIG. 4) is that of receiving a signal from the position sensor, step 120. In the event the signal is valid, step 122, the process of evaluating current and previous frames continues at step 126. On the other hand, if the signal is invalid, its later use is avoided, step 124. Optionally, a logging function may also keep track of validity versus invalidity, such that information can be learned from the log. Informing certain components of the controller or the user of the avoiding or invalidity of the signal, step 124, may also have utility, such as by way of the viewable display informing the user that the position sensor needs replacing.

Figure 7A:
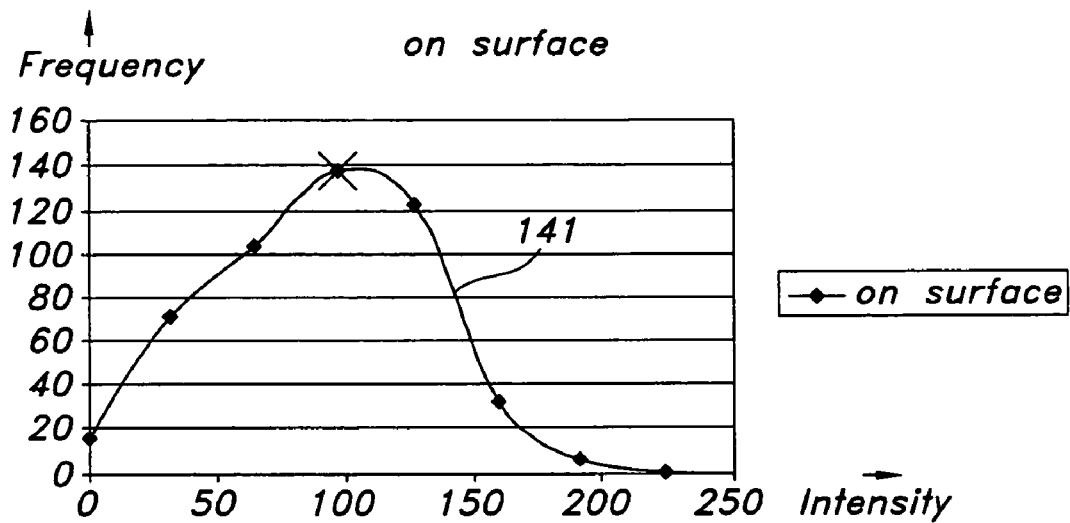
FIGS. 7A and 7B are graphs in accordance with the present invention derived from signals from a position sensor that are evaluated for validity.
Figure 7B:
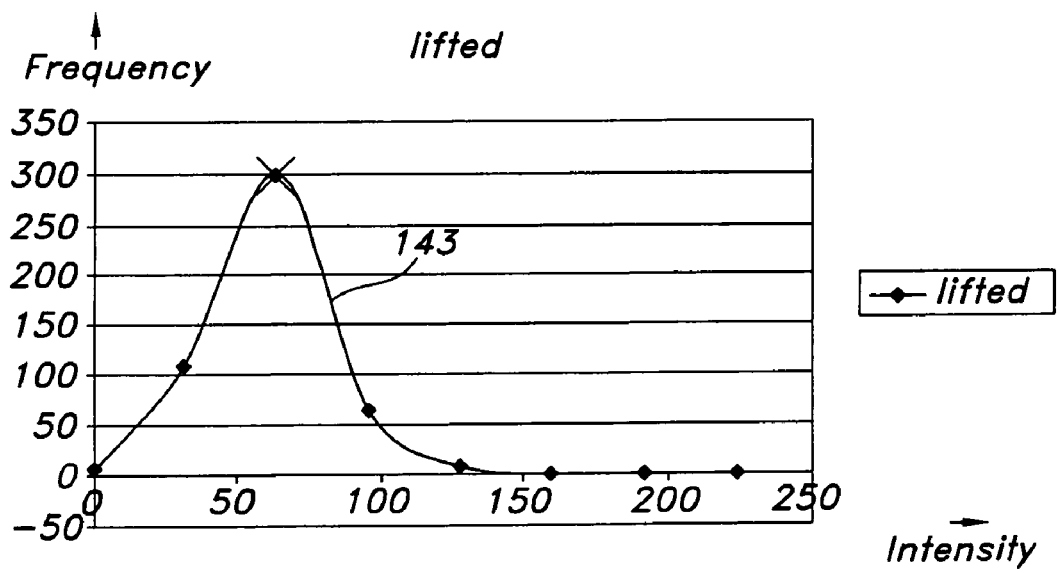

With reference to FIGS. 7A and 7B, more detail about the validity assessment of the position sensor is given. Reference will also be taken simultaneously to the components of FIGS. 3 and 4 (as it will for functionality hereafter described for other figures). The continual cite back to these other figures, however, will often be avoided to better facilitate the discussion of the features of the invention.

Particularly, each of FIGS. 7A and 7B show a plot 141, 143 of data points observed by a prototype intake checker of handheld printer, especially field checker 33, that correspond to data arranged as frequency versus intensity. Intensity, on the one hand, corresponds to the grayscale values of the pixels arranged in a matrix, e.g., FIG. 8A, in a range from 0-255. Frequency, on the other hand, is in contrast an appreciation of the number of actual pixels of the matrix having a given intensity. For instance, plot 141 at position X shows about 140 pixels (of 400 pixels, e.g., a 20×20 matrix) having a grayscale value intensity of about 87, while plot 143 at position X shows about 300 pixels (of 400 pixels, e.g., a 20×20 matrix) having a grayscale value intensity of about 75. Because of the vast difference between the number of pixels having grayscale values within a certain range, it can be concluded that the printer is either lifted too far away from the media to be a valid sensor signal, e.g., plot 143, or on the surface of the media or within a predetermined close distance D to be effective, e.g., plot 141. What is also observed is that plot 141 shows a relatively high number of pixels having a sufficiently high level of saturation, e.g., intensity, to be considered a valid signal, whereas the pixels of plot 143 do not. Skilled artisans will understand that the former creates a situation whereby a position sensor near a media translates into a light source transmitter near the media and brighter reflections are captured by the receiver of the sensor. In the latter, the transmitter and receiver are so far away from the media that minimal differences exist between gray scale values of adjacent pixels prevent having a signal that is worthy of processing. To the extent the count, or frequency, reaches a pre-selected threshold, the data of the sensor can be considered invalid. Of course, skilled artisans will be able to set their own levels of acceptability when determining signal validity. For example, various frequency ranges could be established whereby minimum and maximum frequencies are observed as to whether they have too many or too few counts or data points therein. This approach is provided for well when it is appreciated that the normal distribution of the grayscale values of pixels creates a Gaussian-like curve when graphed. Then, when the sensor is too near (e.g. when the device is moved on an uneven surface) or too far (e.g. when the device is lifted) from the surface, it causes the curve to concentrate its peak in either the smaller or bigger magnitude of the distribution. Naturally, skilled artisans may also scrap the frequency versus intensity for some other metric of acceptability and all such embodiments are embraced herein.

Regardless of how assessed, once the signal is deemed valid, the data arranger 35 takes the pixels of data and converts them into current and previous matrix frames. In the latter, a target (a subset) will be established that is looked for in a subset of the former. Also, the looking-for or searching of the latter in the former, is a searching of sorts for matching grayscale values of the pixels. Skilled artisans will appreciate that because surface imperfections in a media will yield a high level of light saturation for a certain portion of a media's surface and a low level of light saturation for another portion, if the high level of light saturation can be found in a first signal and then again in a later, second signal, a delta between the two signals can be known. From the delta, an amount of movement can be ascertained. For example, consider a particularly raised surface imperfection in a media that yields a grayscale value of high saturation, such as a 250 value, and such is found at a grid location of (8, 8) in an m×n matrix indicative of a signal of a position sensor showing a previous frame, while all other surrounding pixels yield low grayscale saturations at a value of 10. Over time, if an m×n matrix indicative of a signal of a position sensor showing a current frame revealed a grayscale value of 250 surrounded on all sides by grayscale values of 10, and the grid location of the 250 grayscale value was found at a grid location of (10, 10), it can be fairly inferred that a grid movement in the pixels equals 2 over and 2 down, or (10-8, 10-8). In turn, this can be directly correlated to the movement of the printhead and its fluid firing actuators relative to a to-be-printed image. But looking for this unique grayscale value in pixel data relative to a particularly raised surface imperfection in a media can be computationally intensive if one has to scour the entire current frame (e.g., 20×20) for the presence of the entire previous frame (e.g., 20×20). Thus, the foregoing implicates an advantageous notion that convenience can be realized if somehow the latter could be solely examined just for that particular grayscale nuance associated with the raised surface imperfection. Convenience could also be found by avoiding searching an entire current frame and just focusing on a particular area, if somehow a past movement history of the printer could be known.

With this in mind, and appreciating that modern position sensors will have fairly high sample rates, a target of the previous frame to be searched for in a later or current frame is well situated by looking for a movement of a relative center in the previous frame in the current frame. Of course, there is no requirement that the center be the location of the target. It is a complication, however, if a target were established at an extreme boundary of a previous matrix frame and a user manipulated the printer such that no grayscale values had commonality in the latter frame. For at least this reason, a relative center is established as a target to be looked for. In functionality, it is the target marker-selector, component 41 (FIG. 4) that determines which is a good target to track, how big or small it should be, and what other characteristics it should possess. Storage and accessibility of same is also provided for in relation to a marked target index memory 50.

With reference back to FIG. 8A, a matrix frame 81 is shown indicative of an arrangement of pixels of data from the position sensor that will have the same form regardless of being a current or previous frame. M×n is also its size and m corresponds to the rows of the matrix while n corresponds to the columns. M and n may also equal or not. For illustration only, m and n equal hereafter. Pixel locations are also described as being of a grid location (row, column) or as an index, e.g., numbered from 0 to 399 in a row-by-row fashion in the matrix. Over time, all signals of the position sensor will look like this figure, but will be manipulated variously. The values per any of the pixel locations will also change, but may be described herein with the same values, for convenience.

Figure 8B:
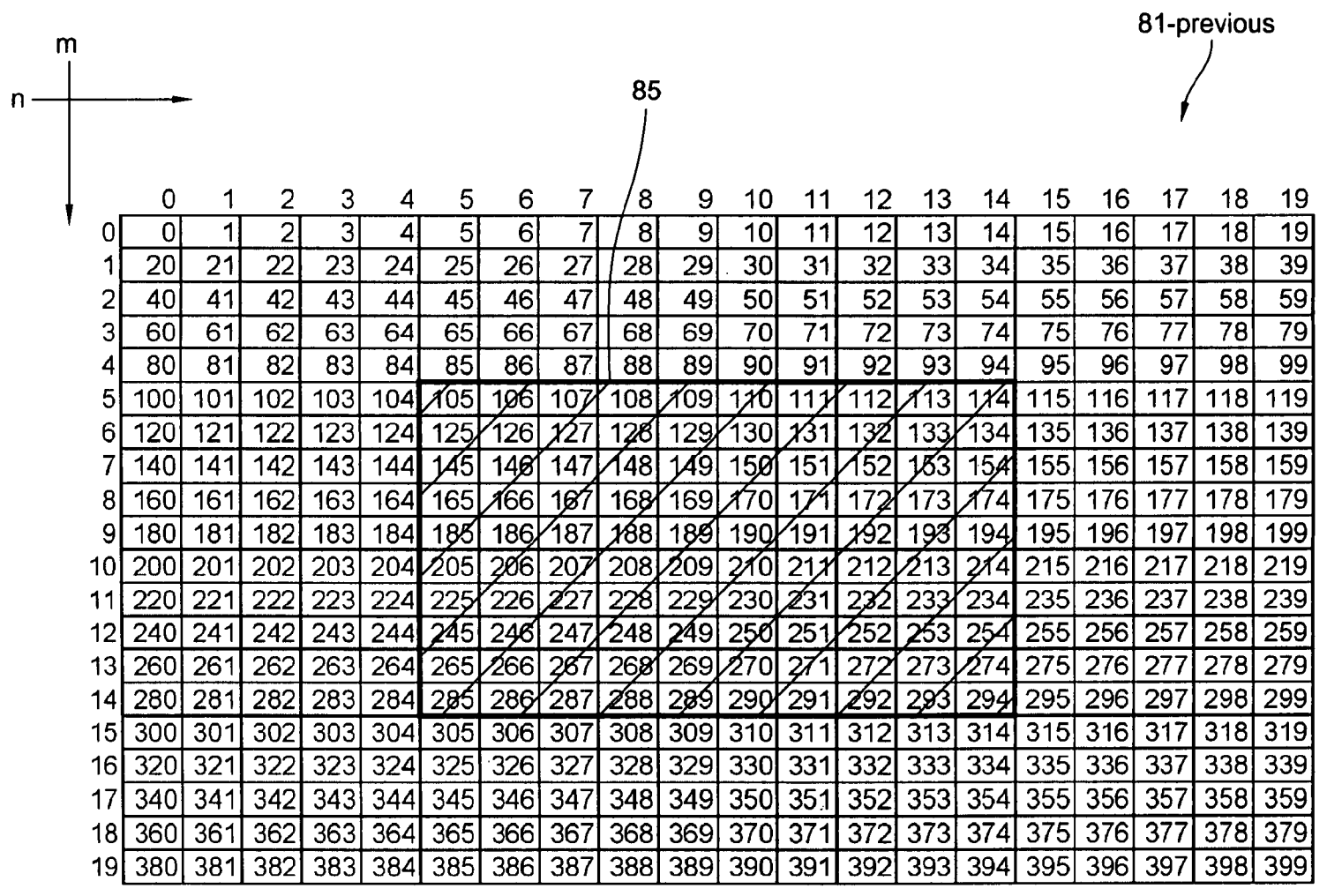

With reference to FIG. 8B, a matrix frame 81-previous now corresponds to a particular signal of the position sensor that indicates a previous location of the printer. A center 85, a subset matrix frame, is then deemed a "target" or target frame to-be-looked-for in a later or current frame, not yet shown. In this example, the center has been made a 10×10 matrix having pixels identified by bounding pixels 105 (found at the m×n grid location (5, 5)), 114 (found at the m×n grid location (5, 14)), 285 (found at the m×n grid location (14, 5)), and 294 (found at the m×n grid location (14, 14)). The center, however, can be made smaller or larger as necessary, so long as it has a size smaller than the original m×n matrix size of the signal obtained from the sensor.

Figure 9:
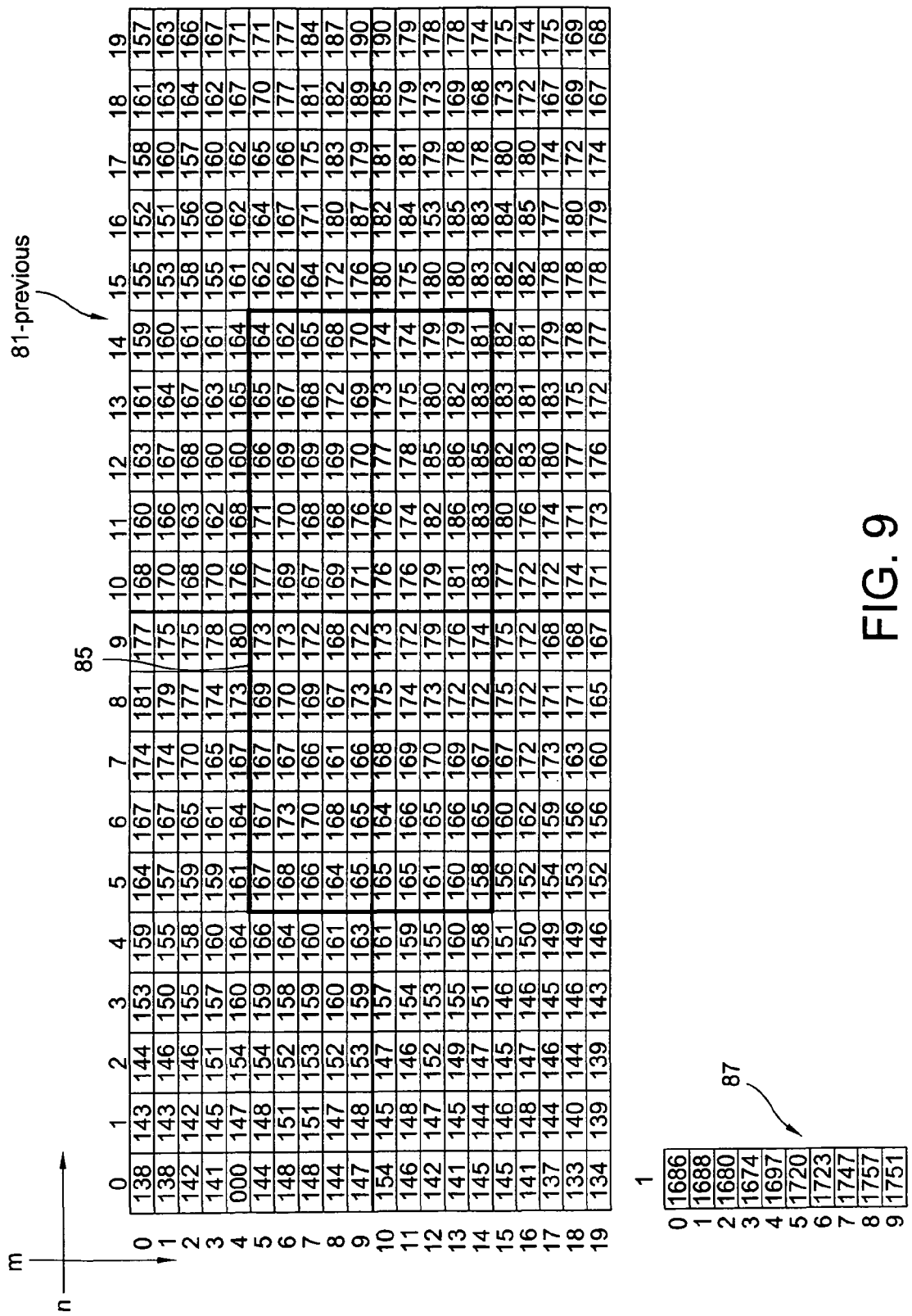
FIG. 9 is a diagrammatic view in accordance with the present invention showing the effects of a summation component acting upon a representative signal of a position sensor in matrix form indicative of a previous location of the handheld printer, the summation acting upon a row.

In FIG. 9, the matrix frame 81-previous is now illustrated with actual grayscale values in each of the pixels of the m×n (e.g., 20×20) grid locations, as opposed to simply labeling one of 400 pixel numbers from 0 to 399 as in FIGS. 8A and 8B. For instance, the pixel at grid location (0, 0) is now labeled with a grayscale value of 138, whereas the pixel at grid location (19, 19) is now labeled with a grayscale value of 168. In turn, the grayscale values are obtained from the intensities observed by the position sensor from reflections from the media, during use. Also, the center 85 or target has its pixels shown with actual grayscale values therein. In row 5, for instance, the grayscale values of the pixels include: 167, 167, 167, 169, 173, 177, 171, 166, 165 and 164, as the columns are traversed in order from 5 to 14. In row 14, as another example, the grayscale values include 158, 165, 167, 172, 174, 183, 183, 185, 183 and 181, as the columns are similarly traversed in order from 5 to 14.

From here, the two-dimensions of the target are reduced into a one-dimensional form. Namely, the matrix form 87, having a single 10×1 form, is the result of reducing the target. To accomplish this, a variety of techniques can be used. For instance, the target may be reduced by way of a summation component that sums either an entirety of the rows or the columns of the target (or a partiality of the rows or columns of the overall 81-previous frame). In this example, it is the rows that are summed to arrive at the matrix form 87. Particularly, the summation value at grid location (0, 1) of matrix form 87 is 1686. It is obtained by summing each of the individual grayscale values of the pixels in row 5 of the target. Thus, 1686=167+167+167+169+173+177+171+166+165+164. As another example, the summation value at grid location (9, 1) of matrix form 87 is 1751 and is obtained by summing each of the individual grayscale values of the pixels in row 14 of the target. Thus, 1751=158+165+167+172+174+183+183+185+ 183+181. In turn, the other summation values at grid locations (1, 1), (2, 1), (3, 1), (4, 1), (5, 1), (6, 1), (7, 1) and (8, 1) are obtained by summing the grayscale values of each of rows 6, 7, 8, 9, 10, 11, 12 and 13 of the target, respectively. From here, it is this smaller one-dimensional matrix form 87 that a presence thereof will be searched for in a later or current frame to indicate movement of the printer. It is also where certain computational advantage over the prior art is achieved.

Before then, however, skilled artisans will observe that two reductions of the matrix frame 81-previous have now occurred. That is, identifying a target, e.g., center 85, transformed the original matrix frame of pixels of data into a smaller or reduced target by half. Namely, the original matrix frame had a two-dimensional size of 20×20, whereas the target only possessed a size of 10×10, e.g., the first reduction. From there, the target itself was reduced into a one-dimensional form of 10×1, e.g., the second reduction. The invention, however, is not limited as to requiring both reductions or requiring one reduction in favor of another. Thus, a 20×20 matrix form could have been reduced to a single dimension 20×1 in the same fashion as the target was reduced, for example. Conversely, the skipping of the second reduction into a one-dimensional form would facilitate a searching of a smaller or reduced matrix form, e.g., 10×10, in a second or current matrix form that achieves computational advantage over scouring a 20×20 matrix form for a previous frame in a 20×20 matrix form for a current frame. Also, a reduction to a single dimension is not limited to just rows. Alternatively, it could include a reduction in form of columns such that a 1×10 matrix form results from a larger 10×10 target, as will be shown in greater detail relative to later FIGS. 13-16.

In functionality of the controller of the printer, it is the target reducer, component 45 (FIG. 4) that accomplishes this reduction of the matrix frame 81-previous. Storage and accessibility of same is also provided for in relation to a reduced target memory 52.

Figure 10A:
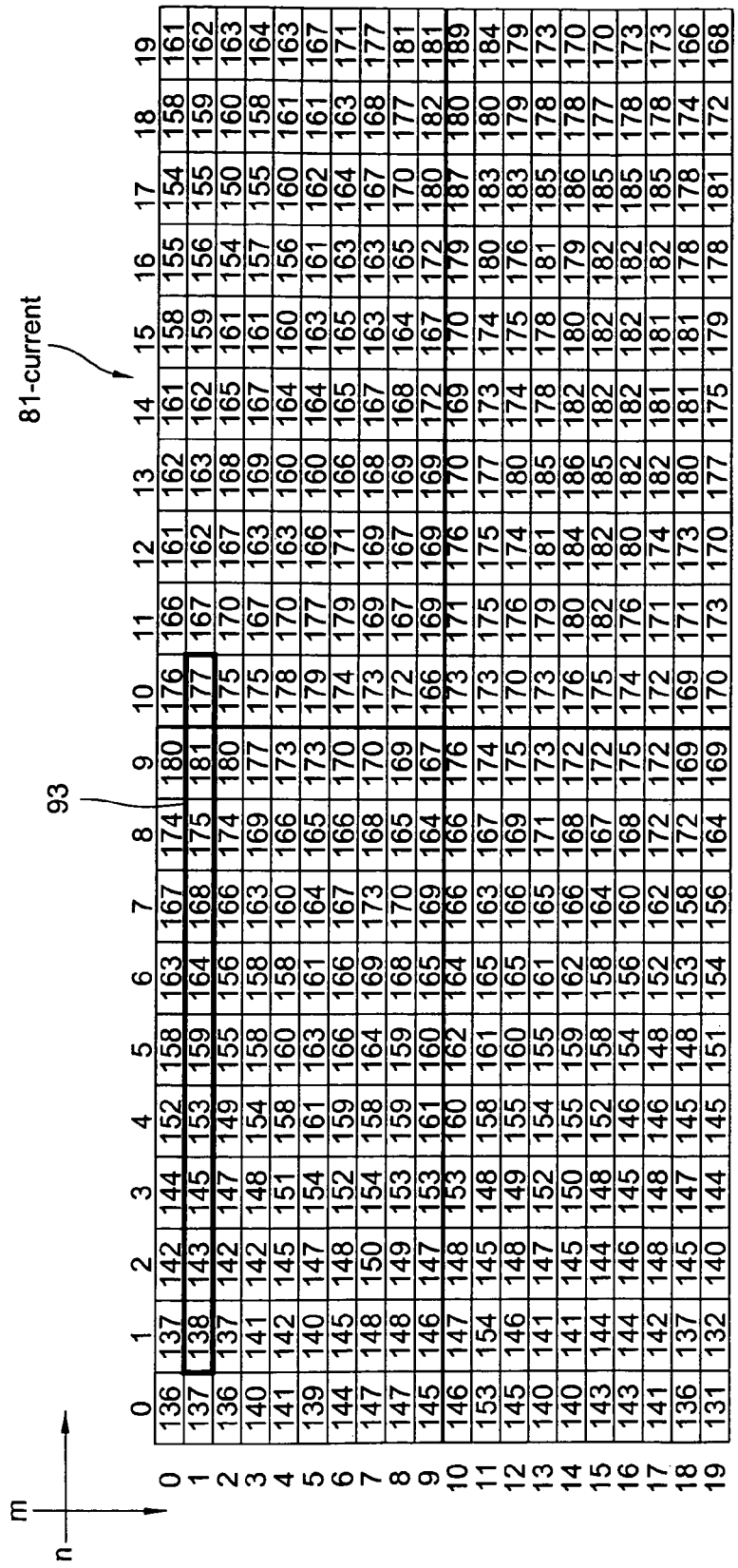
FIG. 10 is a diagrammatic view in accordance with the present invention showing the effects of a representative signal of a position sensor in matrix form indicative of a current location of the handheld printer being reduced in relative size.

With reference to FIG. 10, a matrix frame 81-current now corresponds to a particular signal of the position sensor that indicates a current location of the printer received later in time than the signal embodying the matrix frame 81-previous. The matrix frame 81-current is likewise illustrated with actual grayscale values in each of the pixels of the m×n (e.g., 20×20) grid locations, as opposed to simply labeling one of 400 pixel numbers from indices 0 to 399 as in FIGS. 8A and 8B. For instance, the pixel at grid location (0, 0) is now labeled with a grayscale value of 136, whereas the pixel at grid location (19, 19) remains labeled with a grayscale value of 168. In turn, the grayscale values are obtained, as before, from the intensities observed by the position sensor from reflections from the media, during use. To now find a presence of the previous frame in the current frame, a first preferred step includes transforming or reducing the form of the matrix frame 81-current into a reduced matrix form 91 to facilitate computation. For this, an m×n matrix of 20×20 form is converted into a 20×11 form. Of course, other size reductions are embraced herein.

To actually arrive at the reduced matrix form 91, another plurality of summation functions occur. That is, a portion 93 of row 1 of matrix frame 81-current ranges in grayscale values from column 1 to column 10 of 138, 143, 145, 153, 159, 164, 168, 175, 181, and 177. By adding theses, a summation value of 1603 is obtained and is placed in the 20×11 reduced matrix form 91 at grid location (1, 2) where the word SUM is located (in later FIGS. 11A-11D, the actual 1603 summation value is shown). To arrive at the other summation values, more examples are given so that skilled artisans will understand the process and, thus, the incremental nature of the reduction.

For instance, to get the summation value of 1563 at the one left grid location (1, 1) of reduced matrix form 91, the grayscale values of row 1 are summed, but this time only from column 0 to column 9 of the matrix frame 81-current. Specifically, the adding of grayscale values 137, 138, 143, 145, 153, 159, 164, 168, 175, and 181 corresponds to a summation value of 1563. Similarly, a one right grid location (1, 3) of reduced matrix form 91 corresponds to a summation value of 1632 and is arrived at by adding the grayscale values of row 1 of the matrix frame 81-current, but only from columns 2 through 11. Specifically, the adding of grayscale values 143, 145, 153, 159, 164, 168, 175, 181, 177, and 167 corresponds to a summation value of 1632. Similarly still, a two right grid location (1, 4) of reduced matrix form 91 corresponds to a summation value of 1651 and is arrived at by adding the grayscale values of row 1 of the matrix frame 81-current, but only from columns 3 through 12. Specifically, the adding of grayscale values 145, 153, 159, 164, 168, 175, 181, 177, 167 and 162 corresponds to a summation value of 1651. This process is then similarly repeated and skilled artisans can see the pattern to produce the summation values of the reduced matrix form 91 for all of row 1. The same is then done for each of the other nineteen rows of the twenty row matrix form, 81-current.

In functionality of the controller of the printer, it is the frame reducer, component 43 (FIG. 4) that accomplishes this reduction of the matrix frame 81-current. Storage and accessibility of same is also provided for in relation to a reduced frame memory 54.

With reference to FIGS. 11A-11D, the searching of the previous frame in the current frame then consists of finding the one-dimensional reduced matrix form 87 in the reduced matrix form 91. In that the one-dimensional reduced matrix form embodies a 10×1 form, a box 98 of the same dimensions or size is illustratively maneuvered through the reduced matrix form 91 until a match, or closest best option, with the reduced matrix form 87 is found. In practice, the box 98 begins at the left hand, upper corner of the reduced matrix form 91 and progresses one column to the right at a time (FIG. 11B) until the end, or upper right hand corner of the matrix is reached (FIG. 11C). It then begins again at the left side of the matrix, but one row down or incremented from before (FIG. 11D) and progresses iteratively in this fashion to the end, e.g., the bottom right hand corner, box 98' in dashed line format. Of course, other traversing or maneuvering patterns are possible and skilled artisans will readily recognize them. Also, a box 98 itself is not actually formed or moved through the matrix form, but is shown to illustrate the concept of a controller performing calculations between the reduced matrix form and the values within the box 98.

For actual comparison calculations between the grayscale values of the one-dimensional reduced matrix form 87 and those of the box 98 in the reduced matrix form 97, skilled artisans will observe the grayscale values in box 98 in FIG. 11A correspond to 1553, 1563, 1542, 1550, 1554, 1567, 1583, 1601, 1587 and 1577 (in its 10×1 form), while those in box 98 in FIG. 11B correspond to 1593, 1603, 1581, 1585, 1591, 1607 1613, 1627, 1612 and 1598. In comparison to the grayscale values in the reduced matrix form 87 at the same grid locations of the 10×1 form, the box 98 will either give a better comparison or match result relative to FIG. 11A or FIG. 11B.

With reference to FIG. 12, a correlation matrix 97 then results for which version of grayscale values in box 98 has the exact or closest best match to the grayscale values of the reduced matrix form 87 and a highest number means the best match. In that traversing box 98 through the reduced matrix form 91 in the fashion described yields 121 possible calculations or comparisons, the form of the correlation matrix is then of an 11×11 form. By way of one or more distortion criteria or matching functions, such as cross correlation, mean absolute difference, mean squared difference, pixel difference classification, and integral proportions, seen below, actual values are populated in the correlation matrix. Representative equations for same include, but are not limited to the following:

Cross correlation $$P_{(A,B)} = 1 - \frac{\frac{1}{N-1}\sum_{i=1}^{n}(x_{i_A} - u_A)*(x_{i_B} - u_B)}{\left(\sqrt{\frac{1}{N-1}\left(\sum_{i_A=1}^{n}x_i^2 - \frac{1}{N}\left(\sum_{i_A=1}^{n}x_i\right)^2\right)}\right)*\left(\sqrt{\frac{1}{N-1}\left(\sum_{i_B=1}^{n}x_i^2 - \frac{1}{N}\left(\sum_{i_B=1}^{n}x_i\right)^2\right)}\right)}$$

Mean Absolute Difference (Mean Absolute Error)

$$1/(mn)\sum_{p=1}^{m}\sum_{q=1}^{n}|A[p,q] - B[p,q]|$$

Mean Squared Difference (Mean Squared Error)

$$1/(mn)\sum_{p=1}^{m}\sum_{q=1}^{n}|A[p,q] - B[p,q]|^{\wedge}2$$

Pixel Difference Classification $$1/(mn)\sum_{p=1}^{m}\sum_{q=1}^{n}|\text{compare}(A[p,q] - B[p,q]) \le t|$$

Obtained t (threshold that determines if it is a 1 or a 0) by getting the average difference between corresponding frame values of both frames.

Integral Projection $$\sum_{p=1}^{m}\left\{\sum_{q=1}^{n}A[p,q] - \sum_{q=1}^{n}|B[p,q]|\right\} + \sum_{q=1}^{n}\left|\left\{\sum_{p=1}^{m}A[p,q] - \sum_{p=1}^{m}|B[p,q]|\right\}\right|$$

In practice then: at grid location (0, 0) of the correlation matrix 97 corresponding to the searching of FIG. 11A, for example, a correlation value of 0.891 is obtained; at grid location (0, 1) corresponding to the searching of FIG. 11B, a correlation value of 0.754 is obtained; at grid location (0, 10) corresponding to the searching of FIG. 11C, a correlation value of 0.919 is obtained; and at grid location (1, 0) corresponding to the searching of FIG. 11D, a correlation value of 0.778 is obtained. Thus, the correlation value at grid location (0, 0) for FIG. 11A represents a better match of the grayscale values in box 98 to the reduced matrix form 87 than does the correlation value at grid location (0, 1) for FIG. 11B. However, the entire correlation matrix 97 is populated and the best match possible is seen as correlation value 0.998 located at grid location (6, 6). As expected, it is highly unlikely that an exact match, having a correlation value of 1.0, will be found. It is also possible that two or more grid locations may have close values such that one needs to be picked or selected over the other. With this in mind, skilled artisans can use knowledge of the past to help predict the future.

That is, the original target to be searched-for in a subsequent matrix, was first selected as a relative center, e.g., grid location (5, 5) of the correlation matrix, and has now moved to grid location (6, 6). Thus, a movement of 1 column over and 1 row down has been observed and may provide a clue for the future movement of the printer. If the pattern holds true, the next search between current and previous frames would reveal a best match at grid location (7, 7) of the correlation matrix, and then at (8, 8) and so on. Based on this, knowledge of the past can then be used to discriminate ties between two or more correlation values and also help establish a possible search area, described further below in detail, to save computational time by avoiding looking at the entire current frame for a presence of the previous frame.

In functionality of the controller of the printer, it is the target pair limiter-selector, component 49 (FIG. 4) that accomplishes this "where to look" functionality for finding the one-dimensional reduced matrix form 87 in the reduced matrix form 91. Also, it is the comparator, component 51 (FIG. 4) that accomplishes the actual searching and finding, or not, of the previous frame in the current frame, such as by examination of the correlation matrix. Storage and accessibility of same is also provided for in relation to a comparison results memory 56.

With reference to FIGS. 13, 14, 15A-15D and 16, a process of finding a presence of a previous frame in a current frame to ascertain printer movement is similar to that of 9, 10, 11A-11D and 12, respectively. The primary difference, however, lies in the notion that the former figures arrange the previous frame as a reduced version in a one-dimensional form in a single row form, vice column, while the current frame is reduced, such as from a 20×20 form to an 11×20 form, by summing grayscale values in columns, vice rows. Searching the reduced current frame for a presence of the reduced previous frame then proceeds by way of rows, vice columns. In all other regards, the process is the same. It also provides representative examples of how skilled artisans will be able to further take advantage of the notions of the invention without needing to describe the nearly endless varieties of computations.

Figure 13:
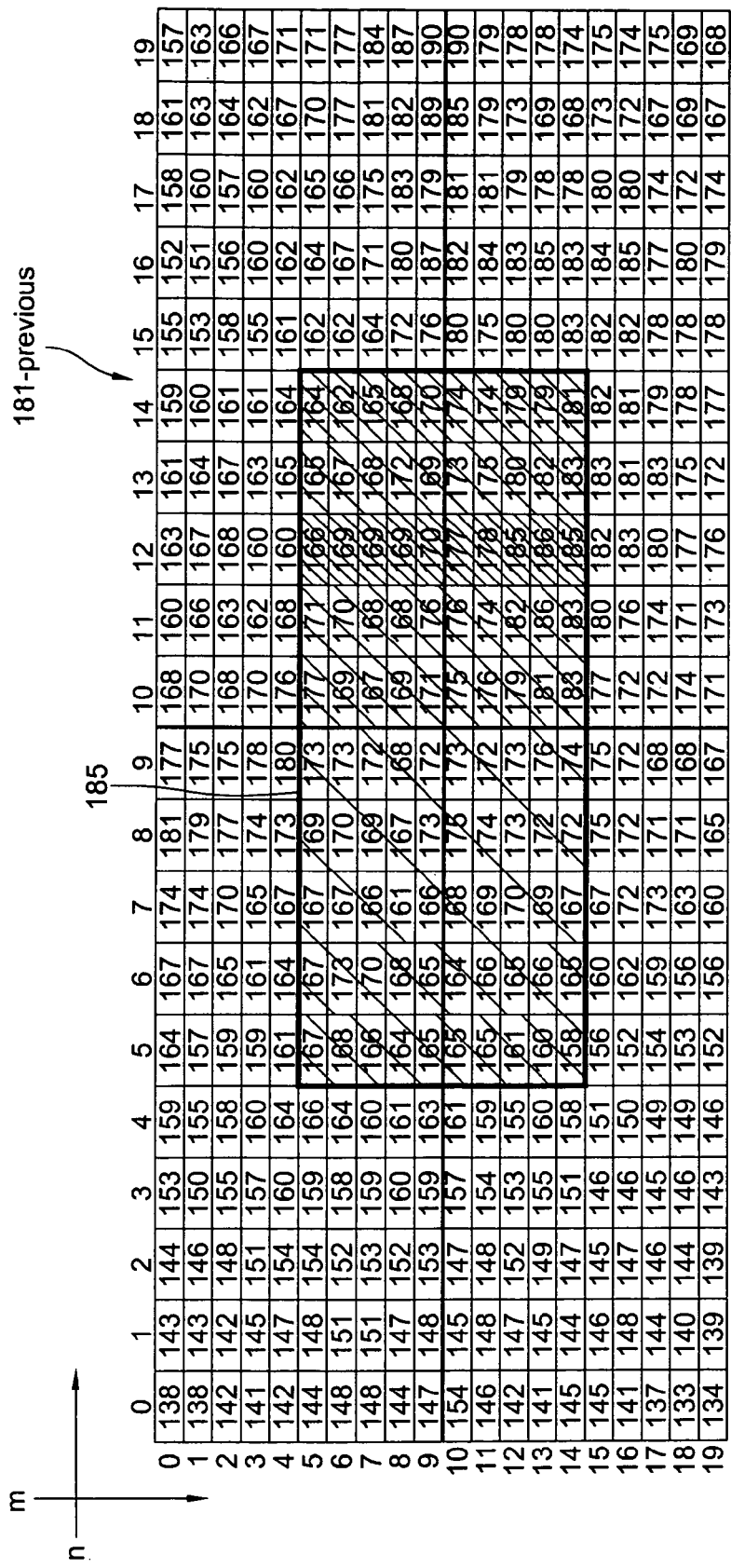
FIG. 13 is a diagrammatic view in accordance with the present invention showing the effects of a summation component acting upon a representative signal of a position sensor in matrix form indicative of a previous location of the handheld printer, the summation acting upon a column.

With reference to FIG. 13, a matrix frame 181-previous corresponds to a particular signal of the position sensor that indicates a previous location of the printer and a center 185, a subset matrix frame, is found in the same fashion as the center 85 of FIG. 8B. The center is then deemed a to-be-looked-for "target" in a later or current frame, not yet shown. In the example, the center has been made a 10×10 matrix having pixels identified by bounding pixels, from FIG. 8B, numbered 105 (found at the m×n grid location (5, 5)), 114 (found at the m×n grid location (5, 14)), 285 (found at the m×n grid location (14, 5)), and 294 (found at the m×n grid location (14, 14)). In FIG. 13, the bounding pixels, as well as all pixels, are now illustrated with actual grayscale values in each of the pixels of the m×n (e.g., 20×20) grid locations, as opposed to simply labeling one of 400 pixel numbers from indices 0 to 399 as in FIGS. 8A and 8B. For instance, the pixel at grid location (0, 0) is now labeled with a grayscale value of 138, whereas the pixel at grid location (19, 19) remains labeled with a grayscale value of 168. In turn, the grayscale values are obtained from the intensities observed by the position sensor from reflections from the media, during use. Also, the center 185 or target has its pixels shown with actual grayscale values therein. In row 5, for instance, the grayscale values of the pixels include: 167, 167, 167, 169, 173, 177, 171, 166, 165 and 164, as the columns are traversed in order from 5 to 14. In row 14, as another example, the grayscale values include 158, 165, 167, 172, 174, 183, 183, 185, 183 and 181, as the columns are traversed in order from 5 to 14.

From here, the two-dimensions of the target are reduced into a one-dimensional form. Namely, the matrix form 187 having a single 1×10 form. To accomplish this, a variety of techniques can be used. In a representative embodiment, it is accomplished by a summation component for either an entirety of the rows or the columns of the target. In this example, it is the columns that are summed to arrive at the matrix form 187. Particularly, the summation value at grid location (1, 0) of matrix form 187 is 1639. It is obtained by summing each of the individual grayscale values of the pixels in column 5 of the target. Thus, 1639=167+168+166+164+ 165+165+165+161+160+158. As another example, the summation value at grid location (1, 9) of matrix form 187 is 1716. It is obtained by summing each of the individual grayscale values of the pixels in column 14 of the target. Thus, 1716=164+162+165+168+170+174+174+179+179+181. The other summation values at grid locations (1, 1), (1, 2), (1, 3), (1, 4), (1, 5), (1, 6), (1, 7) and (1, 8) are obtained by summing the grayscale values of each of columns 6, 7, 8, 9, 10, 11, 12 and 13 of the target, respectively. From here, it is this smaller one-dimensional matrix form 187 that a presence will be searched for in a later or current frame to indicate movement of the printer. It is also where certain computational advantage over the prior art is achieved.

Before then, however, skilled artisans will also observe that another two reductions of the matrix frame 181-previous have now occurred. That is, identifying a target, e.g., center 185, transformed the original matrix frame of pixels of data into a smaller or reduced target by half. Namely, the original matrix frame had a two-dimensional size of 20×20, whereas the target only possessed a size of 10×10, e.g., the first reduction. From there, the target itself was reduced into a one-dimensional form of 1×10, e.g., the second reduction. The invention, however, is not limited as to requiring both reductions or requiring one reduction in favor of another. Thus, a 20×20 matrix form could have been reduced to a single dimension 1×20 in the same fashion as the target was reduced, for example. Conversely, the skipping of the second reduction into a one-dimensional form would facilitate a searching of a smaller or reduced matrix form, e.g., 10×10, in a second or current matrix form that achieves computational advantage over scouring a 20×20 matrix form for a previous frame in a 20×20 matrix form for a current frame.

In functionality, it is again the target reducer, component 45 (FIG. 4) that accomplishes this reduction of the matrix frame 181-previous. Storage and accessibility of same is also provided for in relation to a reduced target memory 52.

With reference to FIG. 14, a matrix frame 181-current now corresponds to a particular signal of the position sensor that indicates a current location of the printer received later in time than the signal embodying the matrix frame 181-previous. The matrix frame 181-current is likewise illustrated with actual grayscale values in each of the pixels of the m×n (e.g., 20×20) grid locations, as opposed to simply labeling one of 400 pixel numbers from indices 0 to 399 as in FIGS. 8A and 8B. For instance, the pixel at grid location (0, 0) is now labeled with a grayscale value of 136, whereas the pixel at grid location (19, 19) remains labeled with a grayscale value of 168. In turn, the grayscale values are obtained from the intensities observed by the position sensor from reflections from the media, during use. To now find a presence of the previous frame in the current frame, a first preferred step includes transforming or reducing the form of the matrix frame 181-current into a reduced matrix form 191 to facilitate computation. For this, an m×n matrix is converted of 20×20 form is converted into an 11×20 form. Of course, other sizes reductions are embraced herein.

To actually arrive at the reduced matrix form 191, another plurality of summation functions occur. For example, a portion 193 of column 1 ranging from row 1 to row 10 includes grayscale values of 138, 137, 141, 142, 140, 145, 148, 148, 146, and 147. By adding theses, a summation value of 1432 is obtained and is placed in the 11×20 reduced matrix form 191 at grid location (1, 1) where the word SUM is located (in later FIGS. 15A-15D, the actual 1432 value is shown). To arrive at the other summation values, the same process as FIG. 10 occurs, but only for columns until an entirety of the twenty-column matrix is filled.

In functionality, it is again the frame reducer, component 43 (FIG. 4) that accomplishes this reduction of the matrix frame 181-current. Storage and accessibility of same is also provided for in relation to a reduced frame memory 54.

Figure 15B:
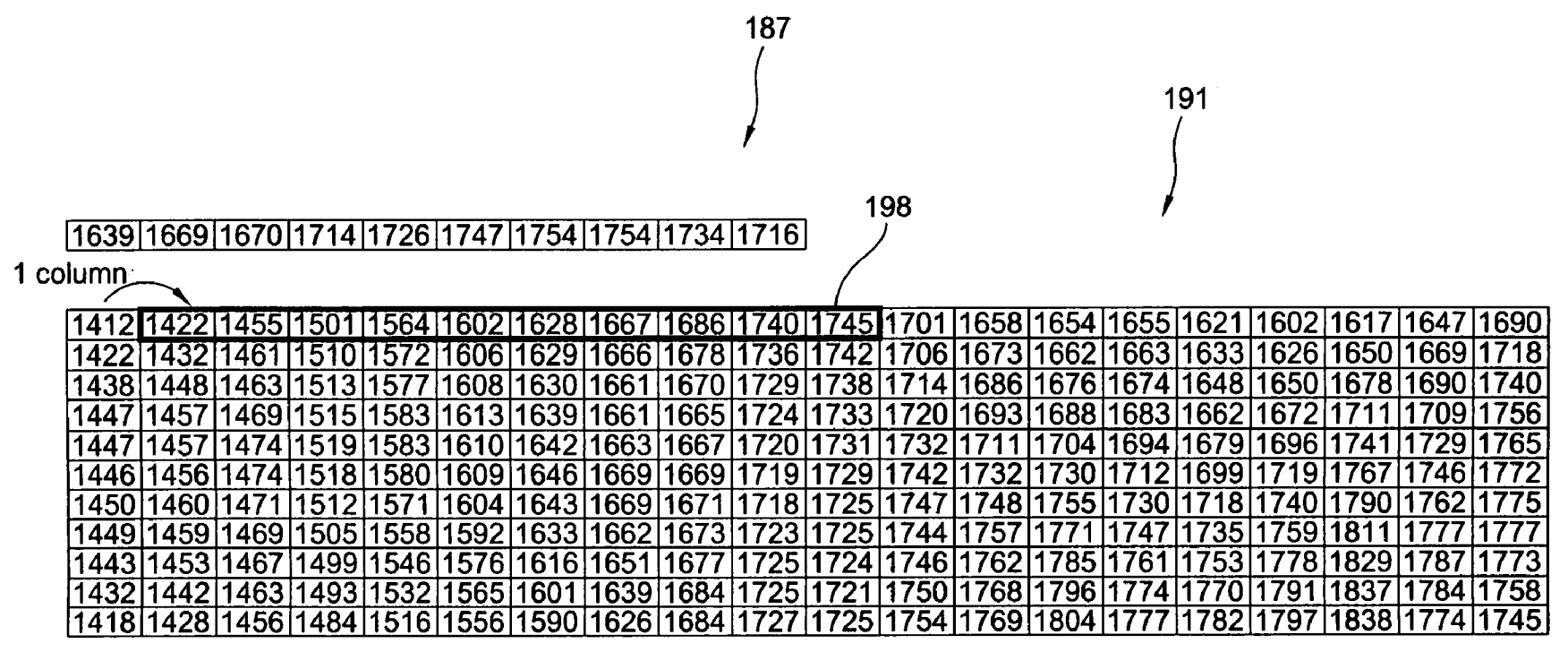
Figure 15C:
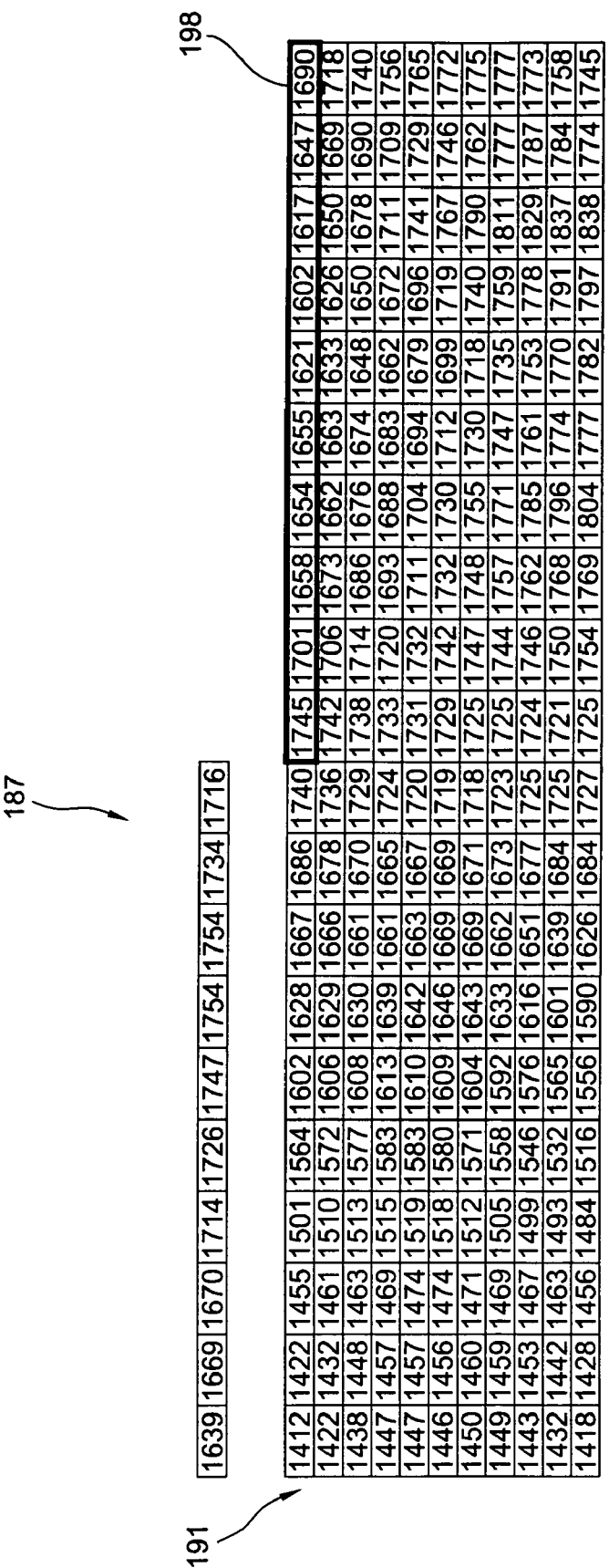
Figure 15D:
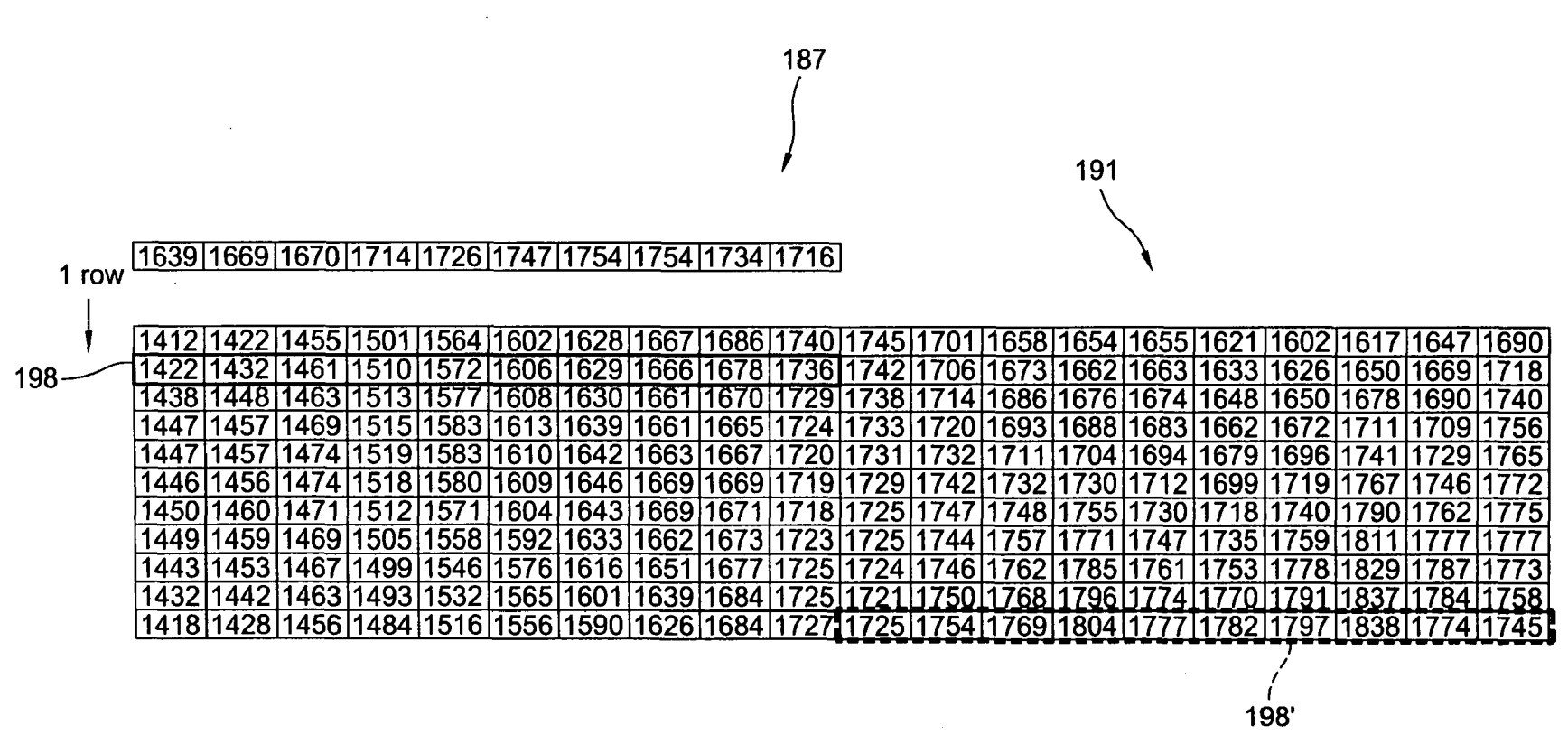

With reference to FIGS. 15A-15D, the searching of the previous frame in the current frame consists of finding the one-dimensional reduced matrix form 187 in the reduced matrix form 191. In that the reduced matrix form embodies a 1×10 form, a box 198 of the same size is illustratively maneuvered through the reduced matrix form until a match, or closest best option, with the reduced matrix form 187 is found. In practice, the box 198 begins at the left hand, upper corner of the reduced matrix form and progresses one column to the right at a time (FIG. 15B) until the end, or upper right hand corner of the matrix is reached (FIG. 15C). It then begins again at the left side of the matrix, but one row down or incremented from before (FIG. 15D) and progresses iteratively in this fashion to the end, e.g., the bottom right hand corner, box 198' in dashed line format. Of course, other traversing or maneuvering patterns are possible and skilled artisans will readily recognize them. Also, a box 198 itself is not actually formed or moved through the matrix form, but is shown to illustrate the concept of a controller performing calculations between the reduced matrix form and the values within the box 198.

For comparison calculations, skilled artisans will observe the grayscale values in box 198 in FIG. 15A correspond to 1412, 1422, 1455, 1501, 1564, 1602, 1628, 1667, 1686 and 1740 in its 1×10 form, while those in box 198 in FIG. 15B correspond to 1422, 1455, 1501, 1564, 1602, 1628, 1667, 1686, 1740 and 1745. In comparison to the grayscale values in the reduced matrix form 187 at the same grid locations of the 1×10 form, the box 198 will either give a better comparison or match result relative to FIG. 15A or FIG. 15B (this same is true of the other figures too, but only these two are used for comparison).

Figure 16:
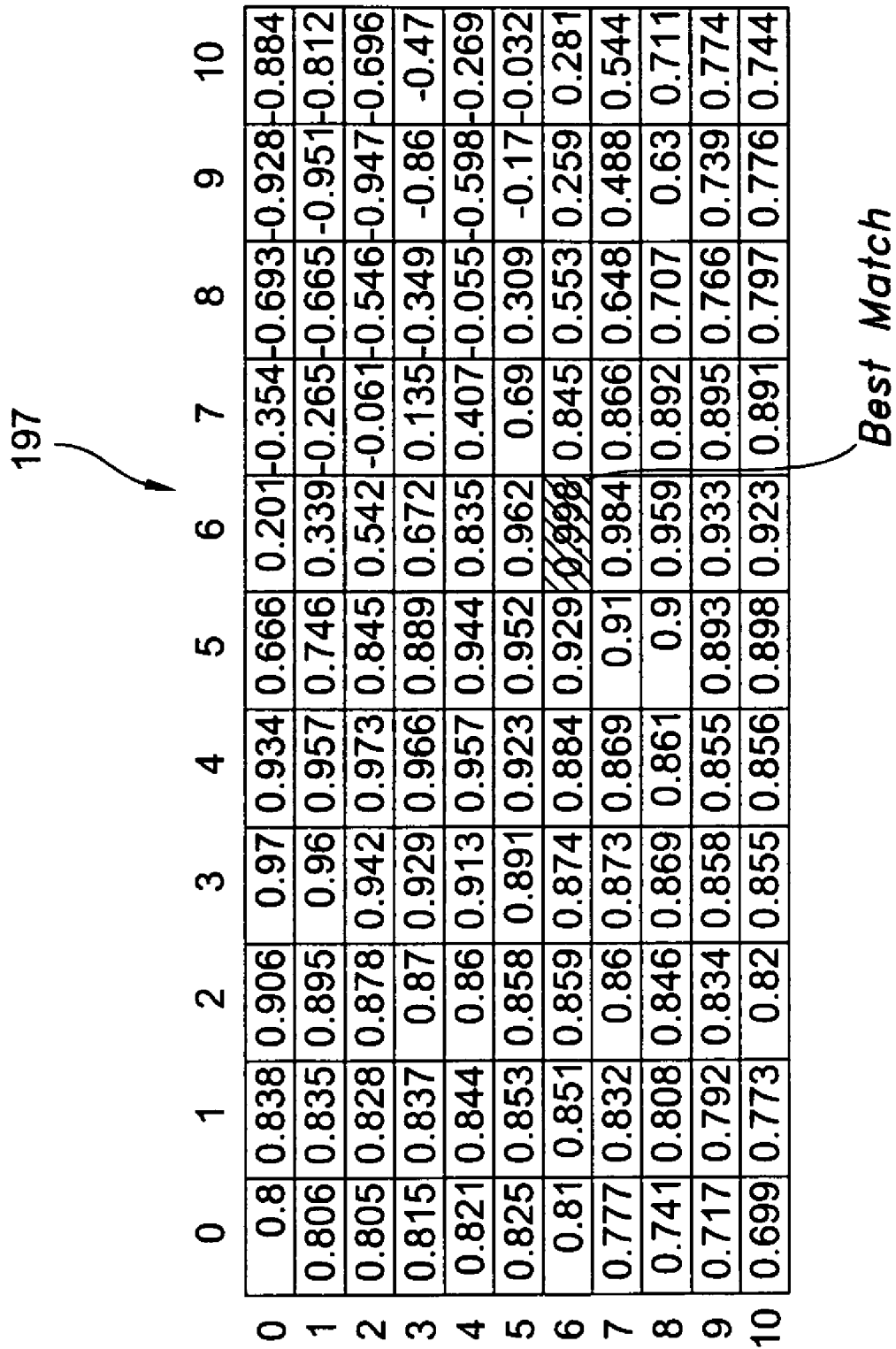
FIG. 16 is a diagrammatic view in accordance with the present invention showing a correlation matrix between previous and current locations for preceding FIGS. 14-15D.

With reference to FIG. 16, a correlation matrix 197 is the ultimate result of which version of grayscale values in box 198 has the exact or closest best match to the grayscale values of the reduced matrix form 187. In that traversing the box 198 through the reduced matrix form 191, in the fashion described, yields 121 possible calculations or comparisons, the form of the correlation matrix is an 11×11 form. By way of one or more distortion criteria or matching functions, previously shown, values are populated in the correlation matrix. Namely, at grid location (0, 0) corresponding to the searching of FIG. 15A, a correlation value of 0.8 is obtained. At grid location (0, 1) corresponding to the searching of FIG. 15B, a correlation value of 0.838 is obtained. At grid location (0, 10) corresponding to the searching of FIG. 11C, a correlation value of −0.884 is obtained. At grid location (1, 0) corresponding to the searching of FIG. 15D, a correlation value of 0.806 is obtained. Thus, the correlation value at grid location (0, 1) for FIG. 15B represents a better match (e.g., higher score) of the grayscale values in box 198 to the reduced matrix form 187 than does the correlation value at grid location (0, 0) for FIG. 15A. However, the entire correlation matrix 197 is populated and the best possible match is seen as correlation value 0.998 located at grid location (6, 6). As before, it is highly unlikely that an exact match, having a correlation value of 1.0, will be found. It is also possible that two or more grid locations may have close values such that one needs to be picked or selected over the other. With this in mind, skilled artisans can use knowledge of the past to help predict the future as seen earlier.

Figure 17:
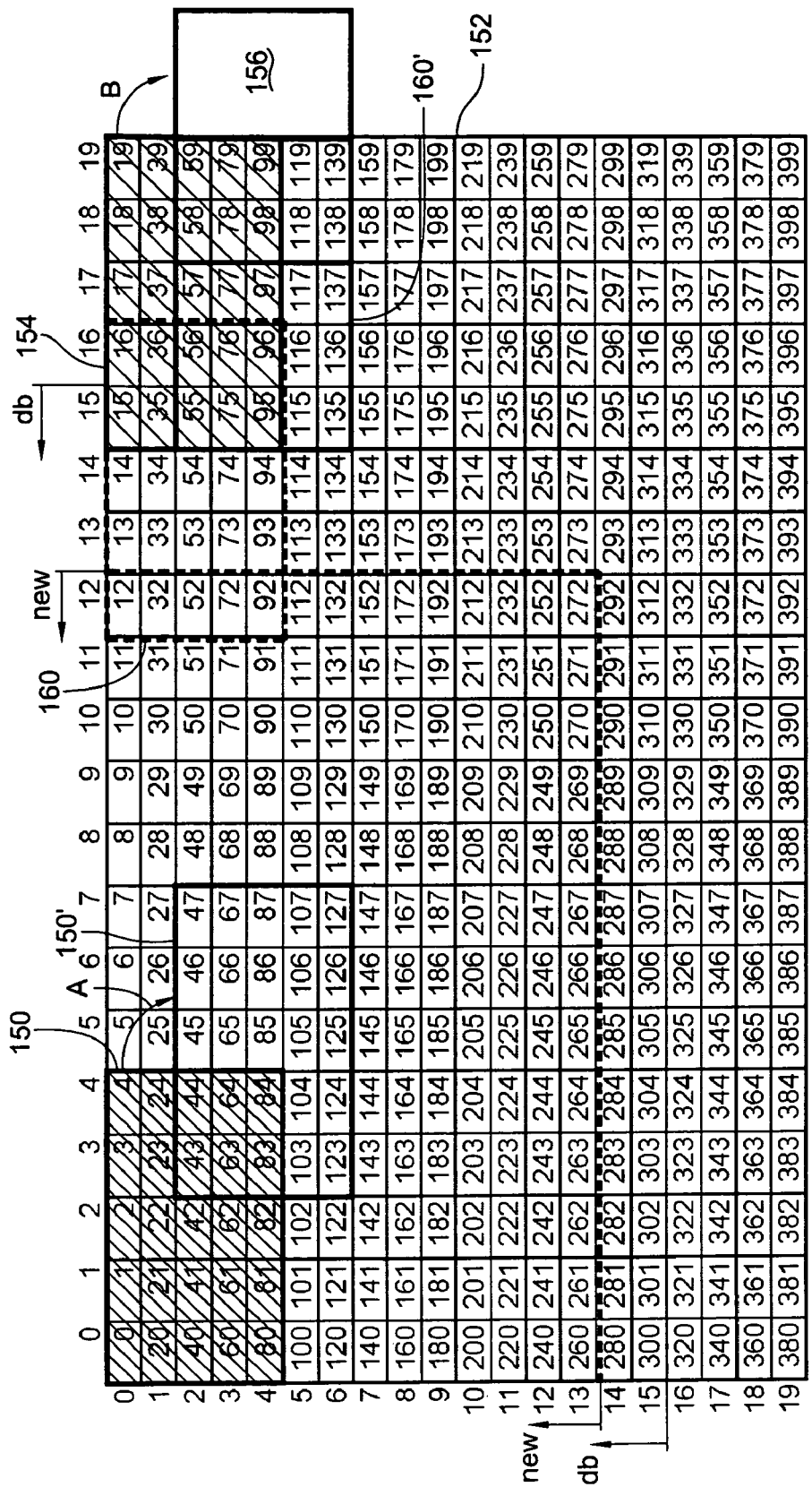
FIG. 17 is a diagrammatic view in accordance with the present invention showing the effects of anticipating movement of a target frame of pixels based on prior movement of the handheld printer.

With reference to FIG. 17, skilled artisans will appreciate that there may be times when tracking a printer movement history becomes problematic. For example, consider a target 150 (5×5 form) being searched for in a matrix frame 152 (20×20 form). To the extent a user has a history of moving the printer three columns to the right and two rows down (arrow A), a moved target would then be found at 150' (also known as "target pairs," e.g., target 150 from the previous and target 150 from the current). If the starting target were not reference numeral 150 in the upper left hand corner of the matrix frame 152, but reference numeral 154 in the upper right hand corner of the matrix frame 152, a movement of three columns to the right and two rows down (arrow B) would yield a partial null set 156. Thus, contemplation of another target or target pairs is in order. Also, redefining a boundary in which target pairs is calculated is possible. For this, simply tracking the target 150 (or its reduced one-dimensional counterpart) in the matrix frame 152, according to known past history, implicates the stopping of searching the matrix frame when considering past movement. Thus, the last possible position of the pair (e.g., the previous target 150 and then the current target 150') along row 0 is when the index of the target's pair reaches column 12, which is three (column movement) less the number of columns in the default boundary (dashed line 160) area. For succeeding rows, the index of the target's pair is only until the row 13, which is 2 (row movement) less the number of rows in the default boundary ("db" arrow area). This new boundary condition ("new" arrow area) is determined by the target pair limiter-selector 49 (FIG. 4) so that the comparator 51 will know which set of values are to be compared with the target.

In other words, the target pair limiter-selector 49 decides what part of the current frame will be used for comparison with the marked target. All possible target-sized values in the current frame are determined, traversed and compared with the target within the comparator 51 through the previously mentioned distortion criterion or matching functions such as cross correlation, mean absolute difference, mean square difference, pixel difference classification, integral proportions, or a combination of such methods. From there, the result of comparing the reduced target (previous) and one of the possible target-sized values in the reduced (current) frame will be stored in the comparison results memory 56. Over time, this process is repeated up to the number of all the possible target-sized values within the boundary set by the target pair limiter-selector 49. When that number is reached, the highlighter 53 will determine the minimum value in the comparison results memory 56.

Figure 18A:
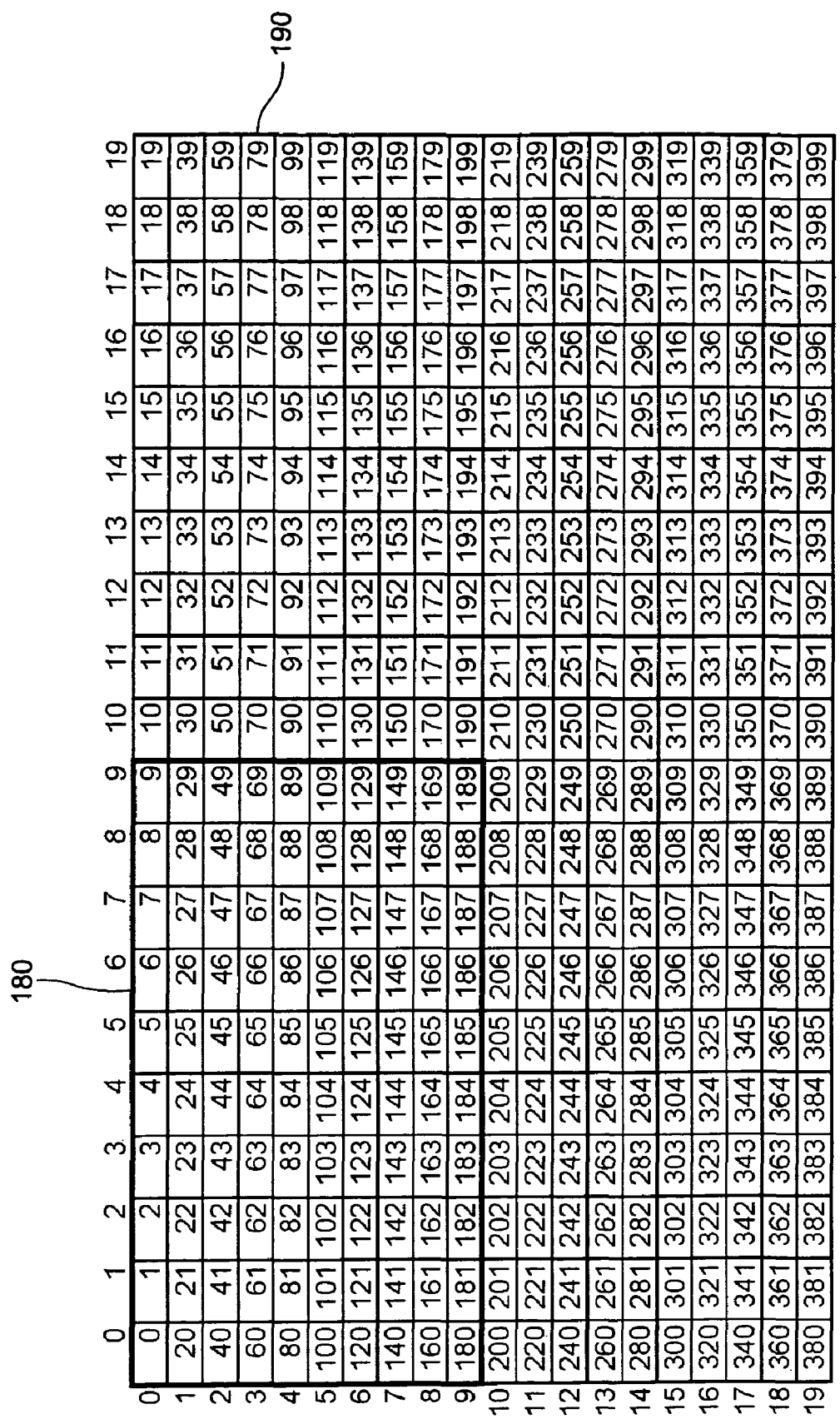
Figure 18B:
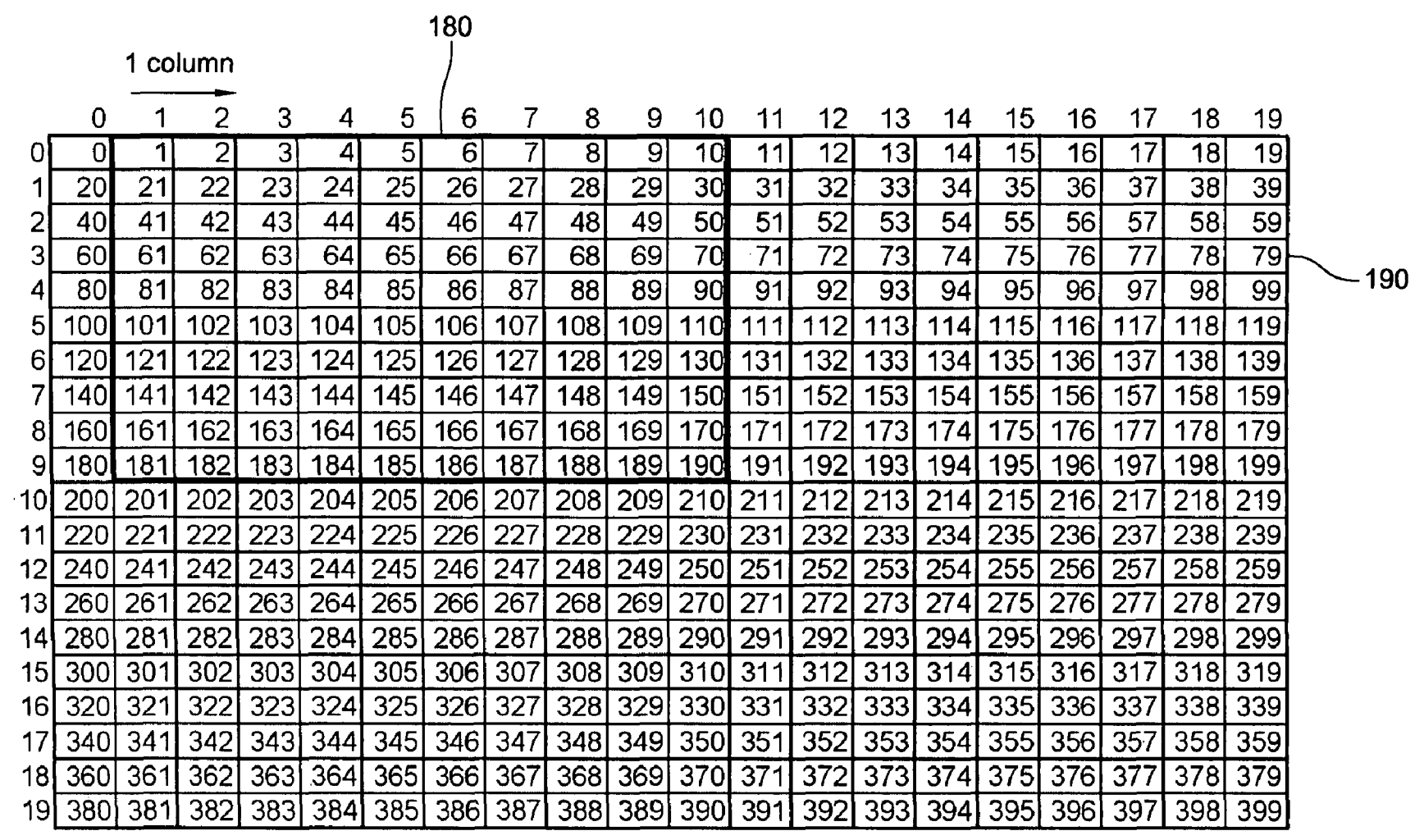
Figure 18C:
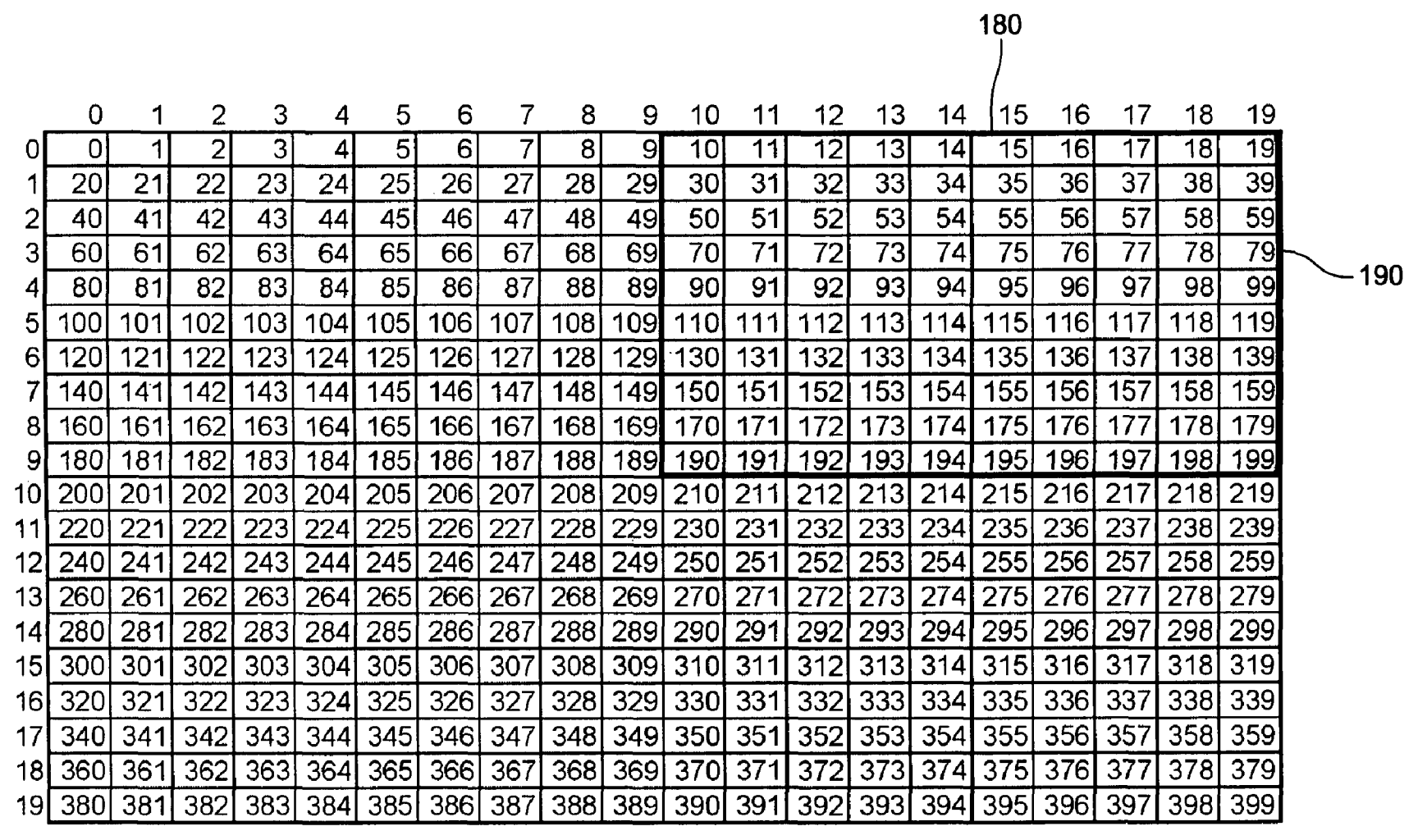
Figure 18D:
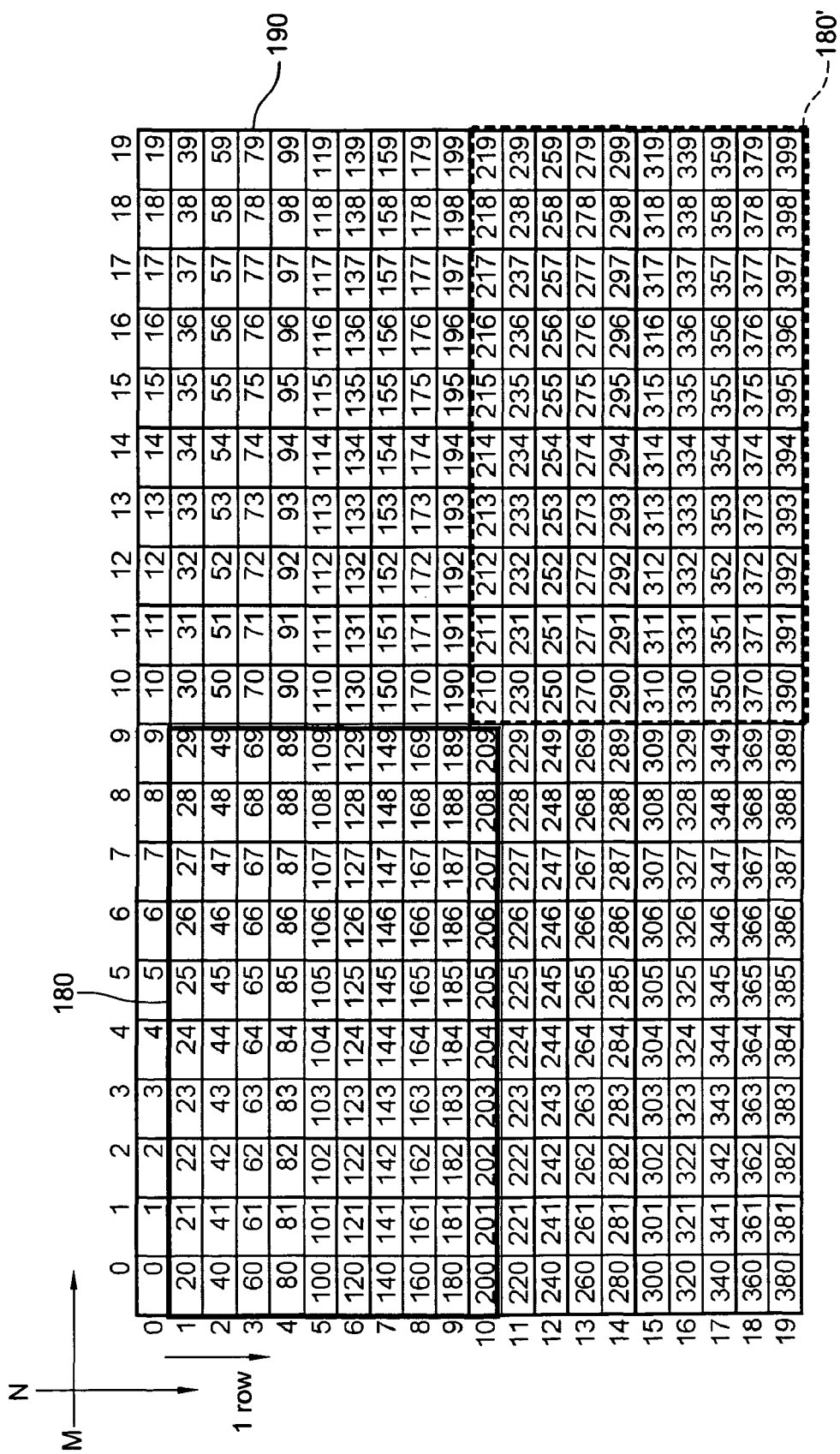
Figure 20:
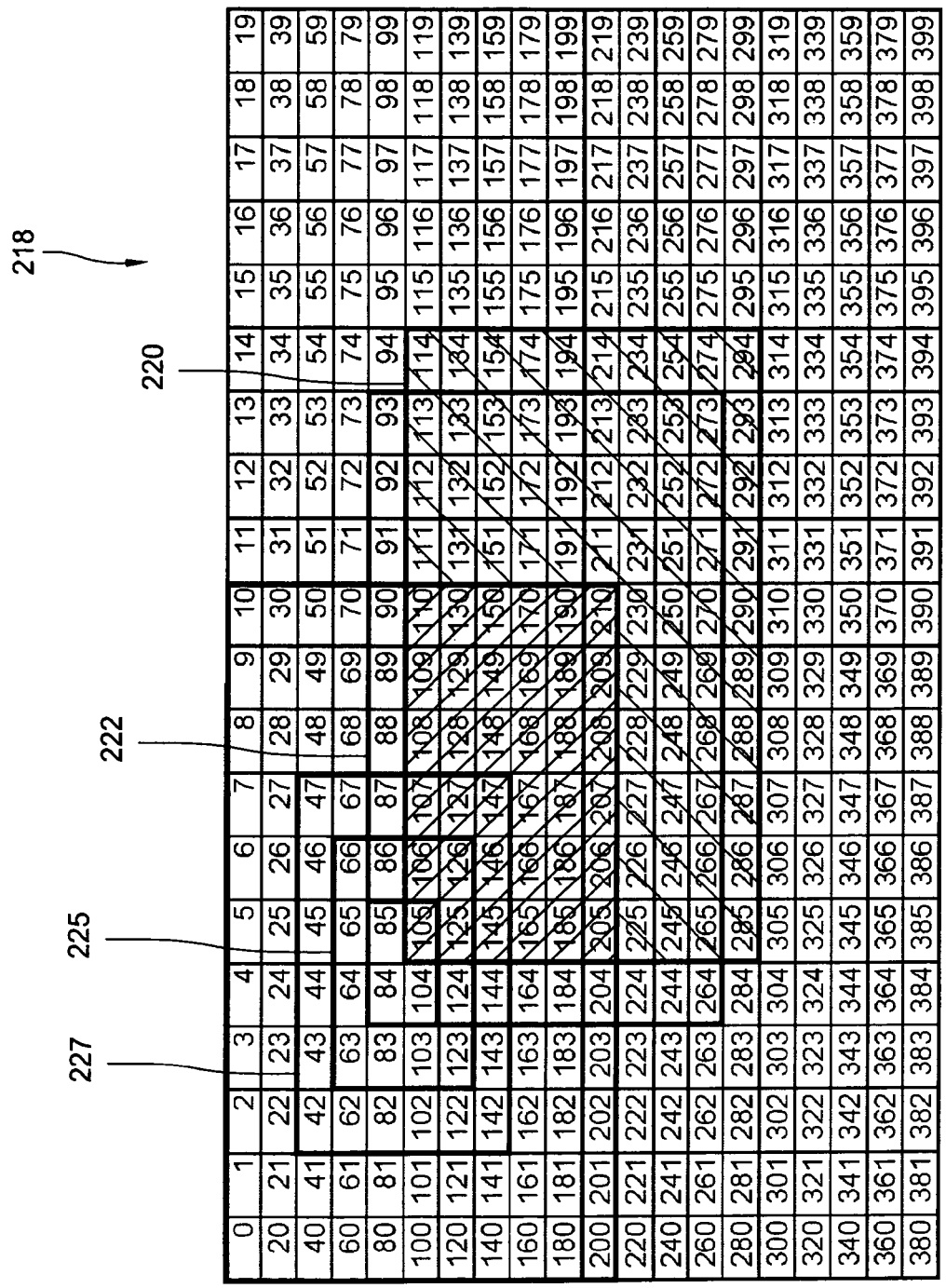
Figure 23:
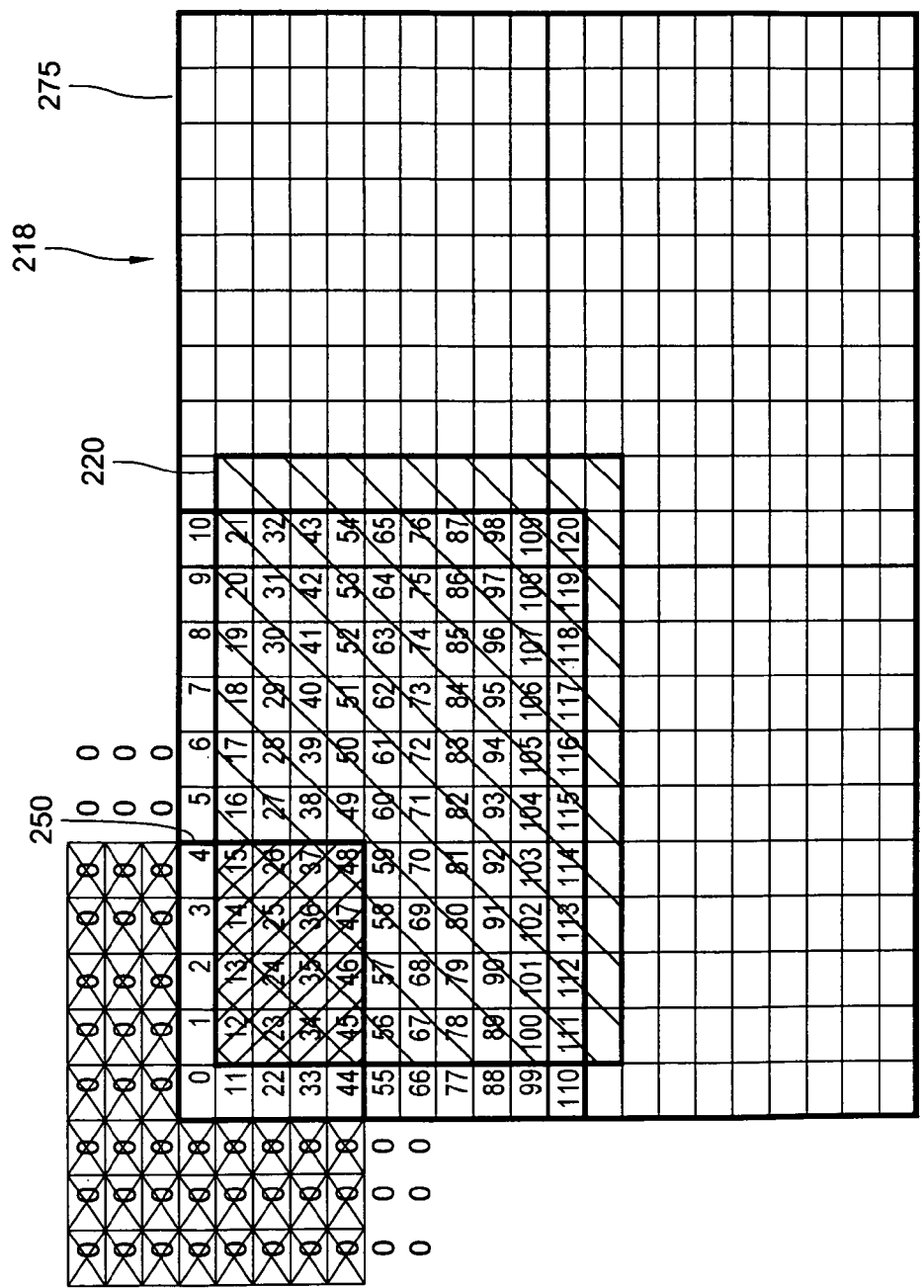
Figure 24:
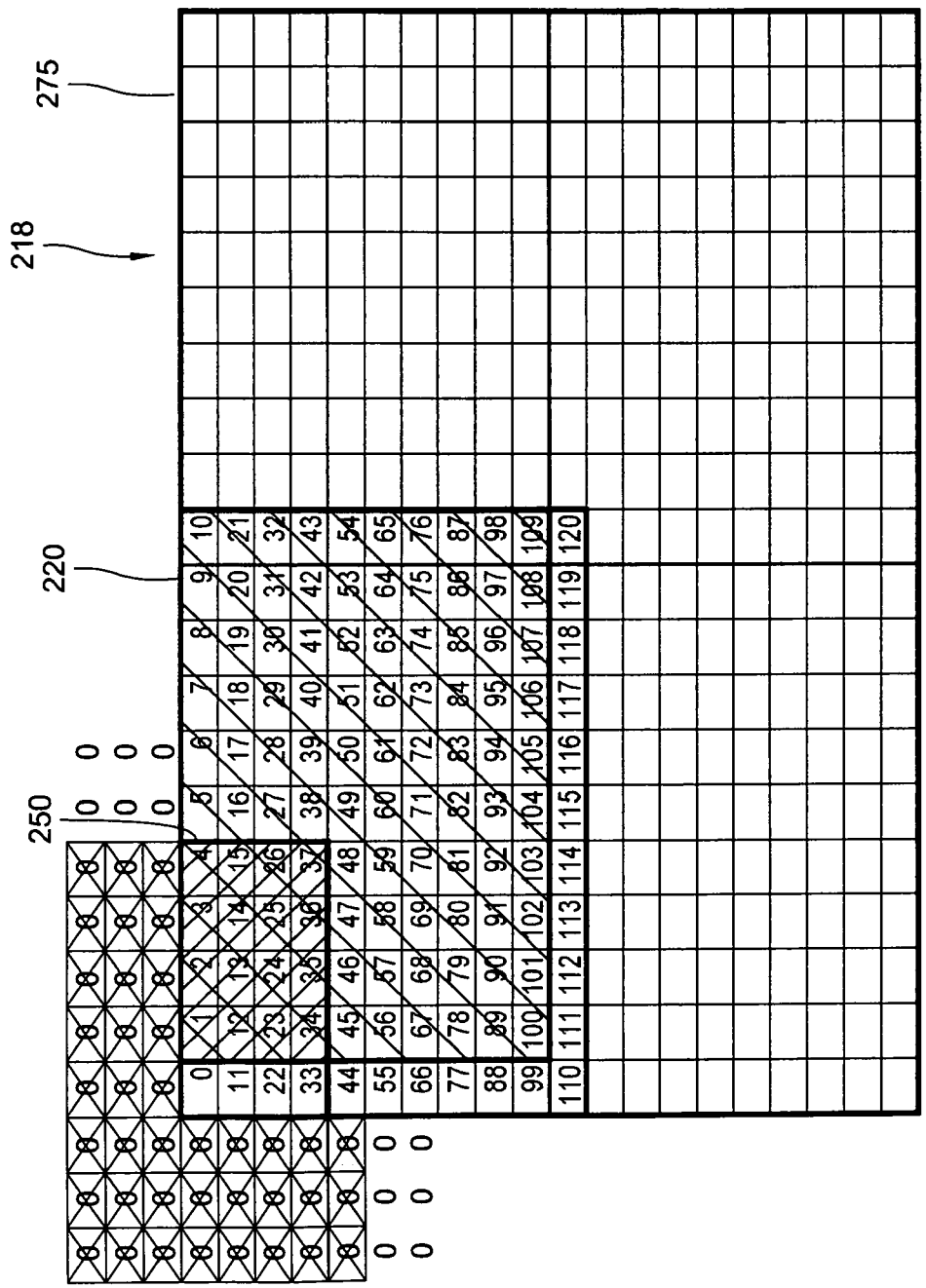
Figure 25:
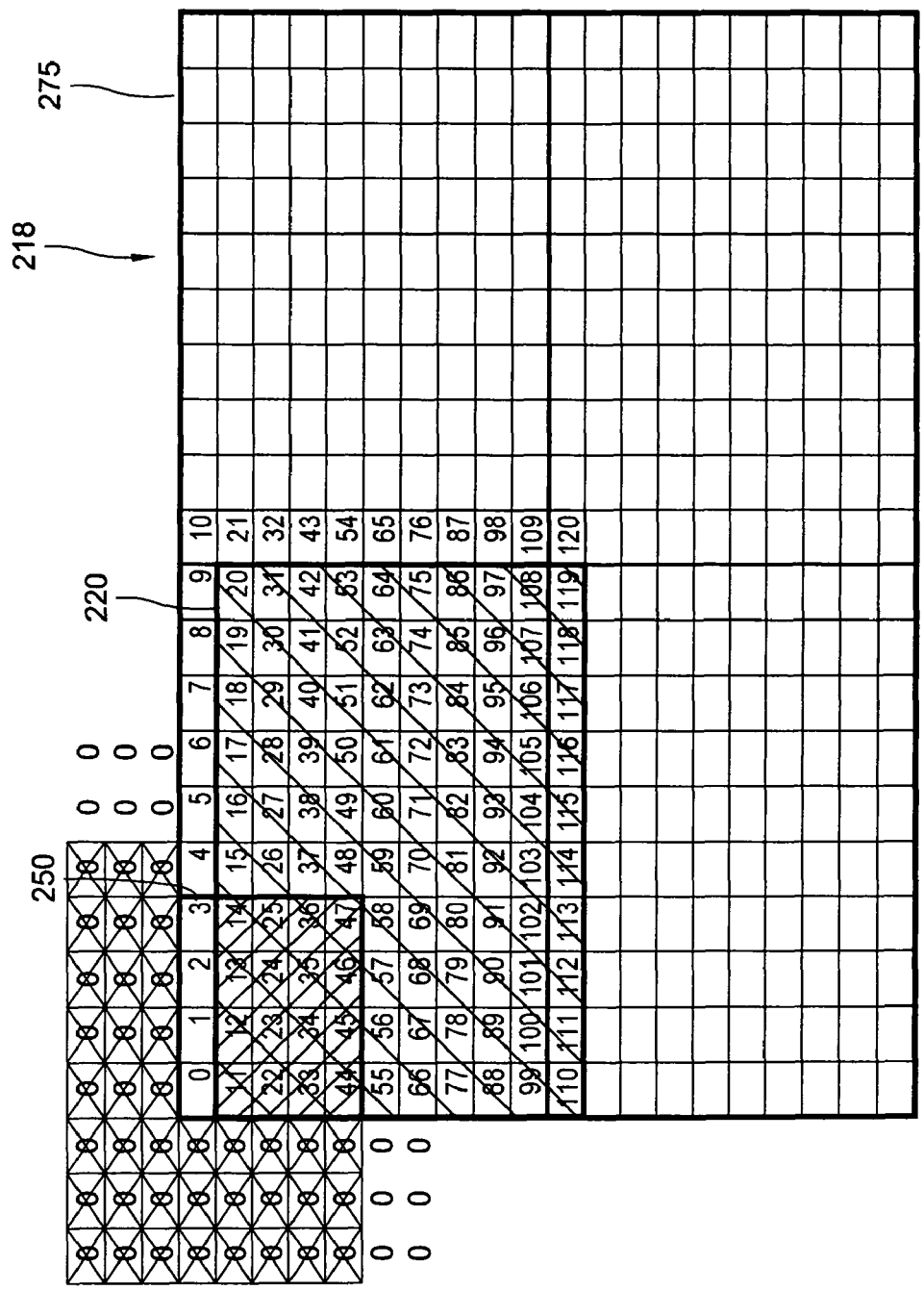
Figure 26:
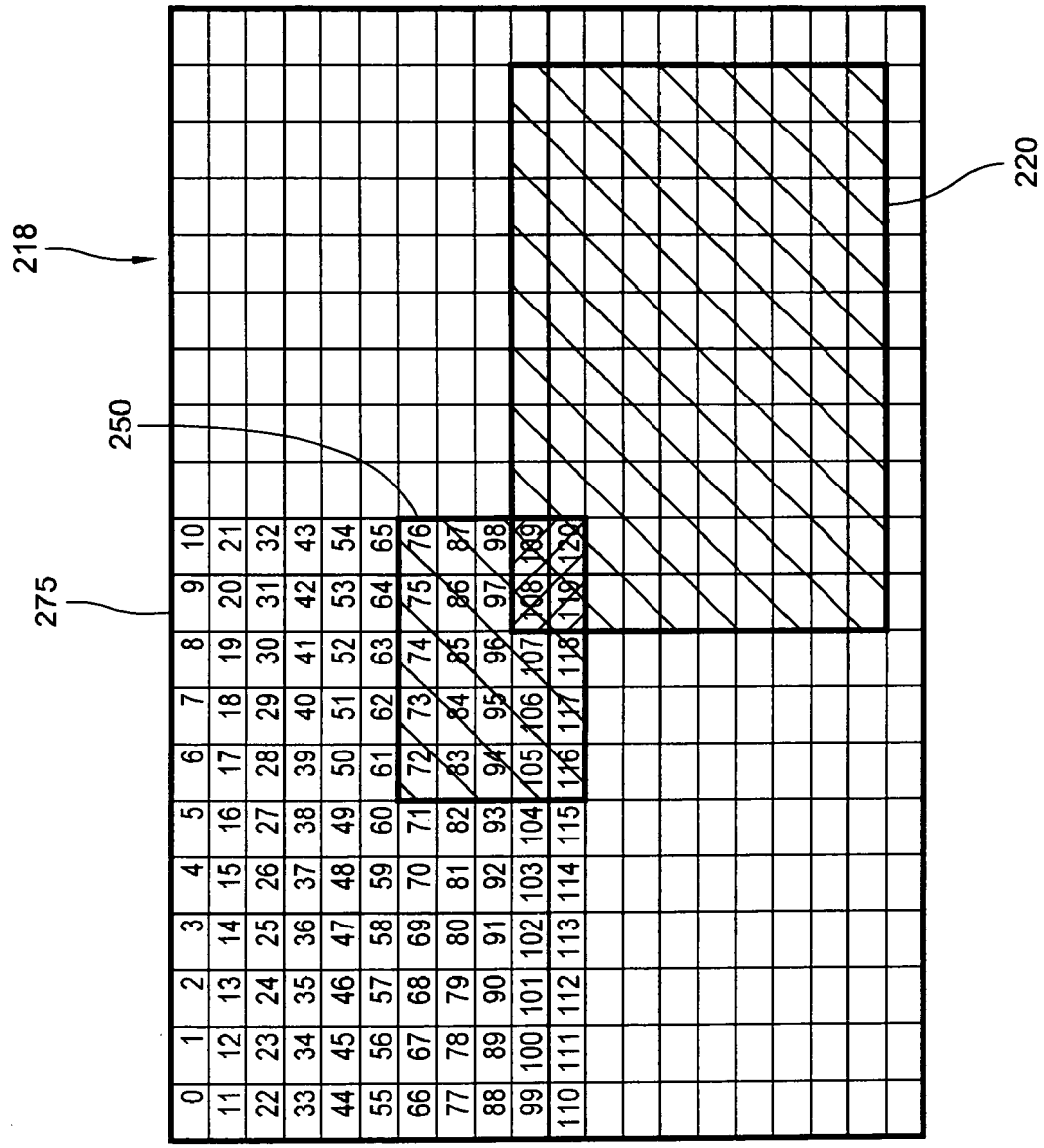
Figure 27:
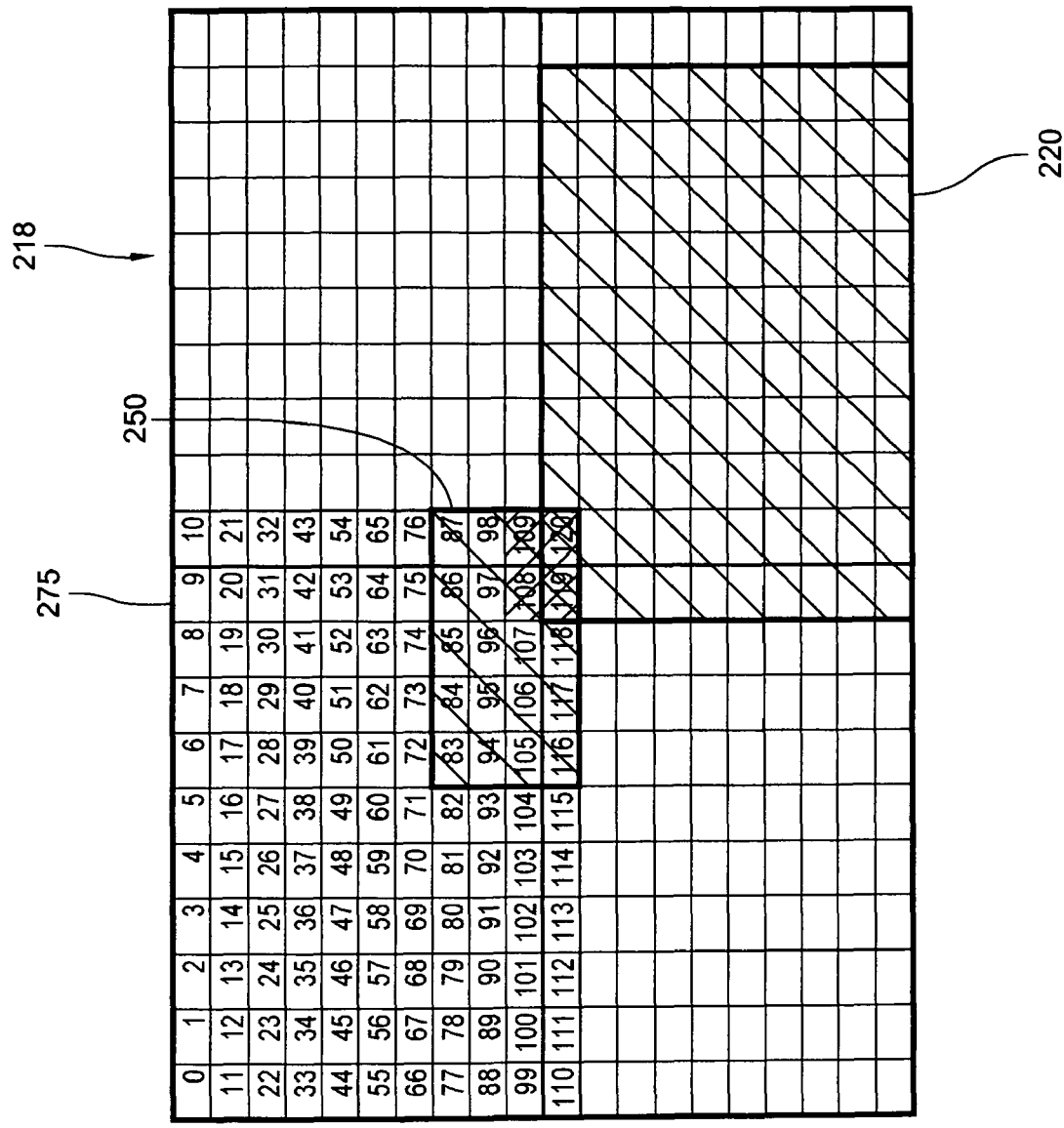
Figure 28:
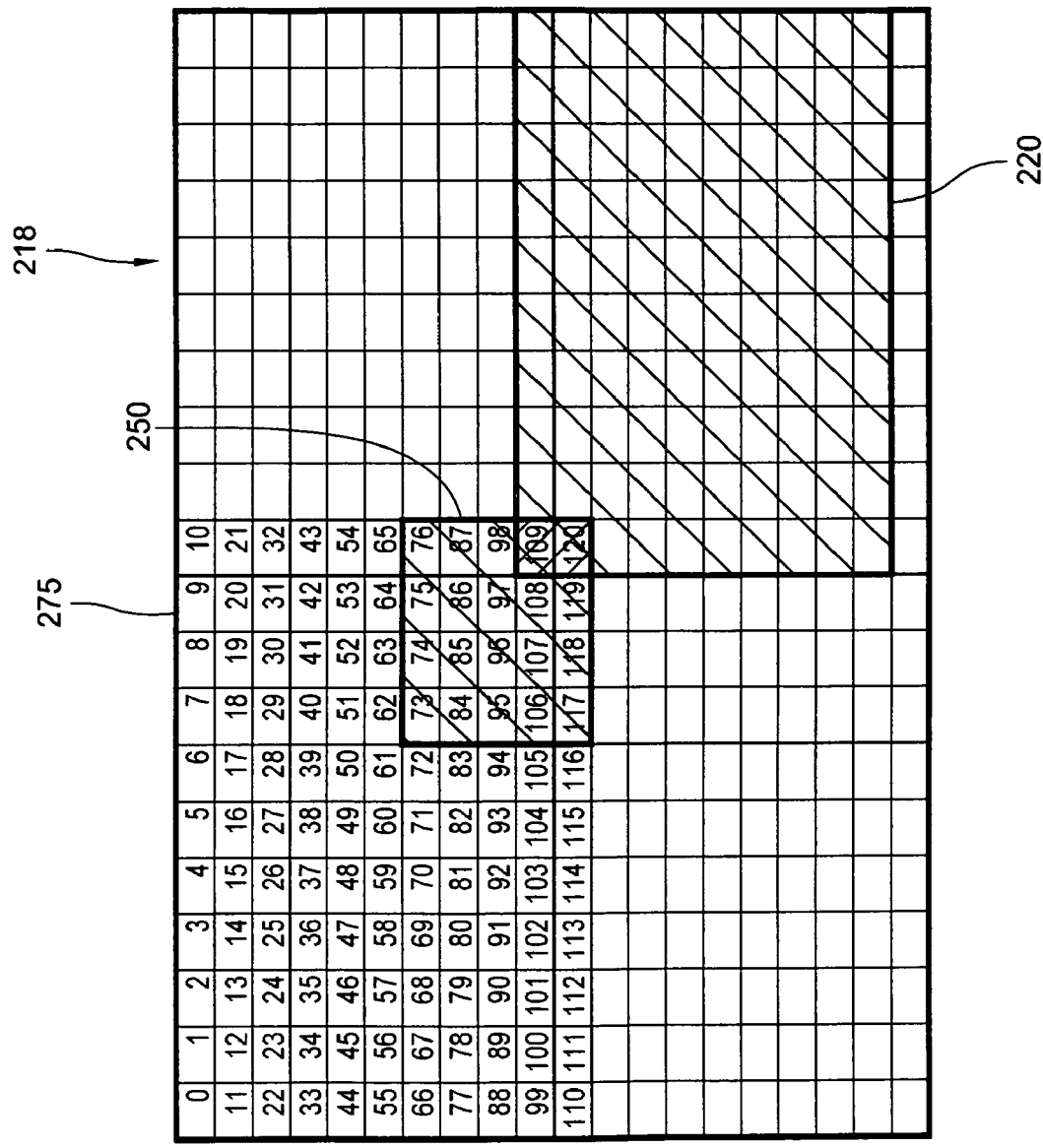
Figure 29:
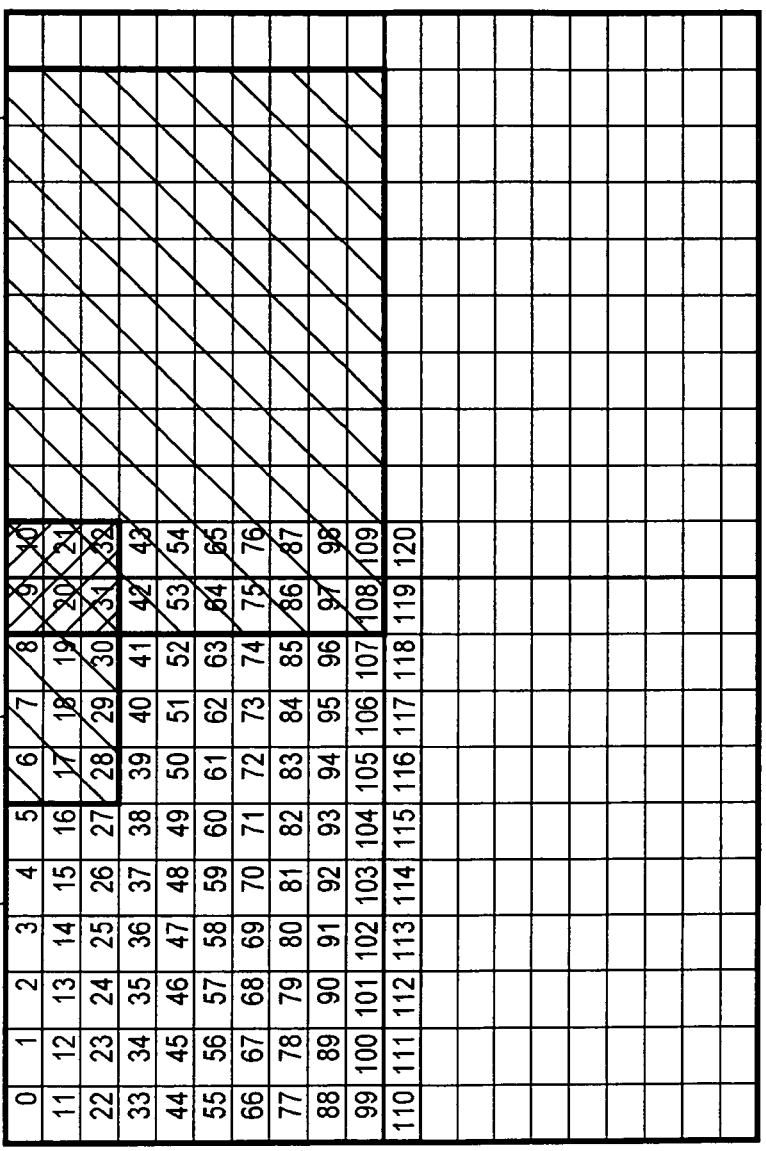
Figure 30:
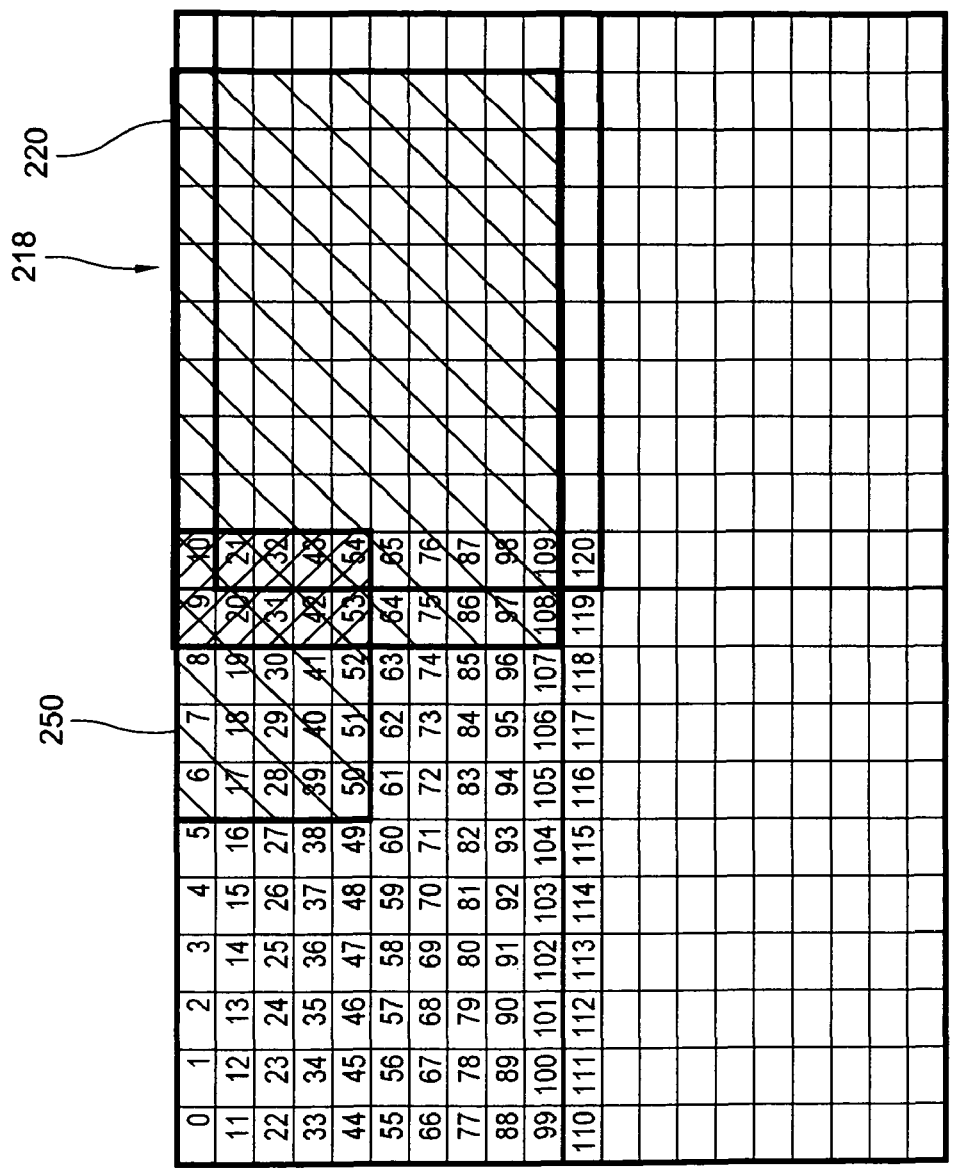

With reference to FIGS. 18A-18D, advantage of the invention by reducing the relative size of the current and previous frames for searching purposes will be illustrated. Namely, consider that the target marker-selector 47 (FIG. 4) chooses the center 85 (FIGS. 8B and 9) of the previous frame as the default target 180 (e.g. a 10×10 form). In the normal comparison with the current frame 190 (e.g., a 20×20 form), all possible target-sized values (e.g., 10×10 forms) in the current frame are searched. By beginning at the upper left hand indexes of the data in the current frame 190 (FIG. 18A), traversal occurs by one column increments at a time (FIG. 18B) until an end of the row is reached (FIG. 18C). From there, FIG. 18D shows the increment of one row and traversal continues in this manner for the target 180 in the current frame 190 until all rows and columns are contemplated, such as when the target is shown as 180' (dashed box). If you consider a matrix form of N×N (rows×columns), there will be $(N+1)^2$ indexes to be traversed. This, however, is more computationally extensive than by reducing a relative size of both the target and the current frame, especially considering the navigation of the instant invention prefers to only search and make computations in those portions of the current frame where the target is most likely found, e.g., possible search area, based on predicting future movement of the printer based on the past history of movement.

With reference to FIGS. 19-30, a representative process for defining the possible search area is described. As previously mentioned, the searching of the previous frame for a presence in the current frame occurs by looping or traversing the previous frame through an entirety of the current frame, and such also occurs, preferably, with a reduced version of a relative size of both the previous and current frames. FIG. 19, however, is used to simply illustrate that looping the target through the current frame results in 121 comparison results overall and finishes at index 210 (overlap of the gray portions of the matrix frame 155). For FIG. 20, consider the current frame as reference element 218 having a 20×20 matrix form. The previous frame, on the other hand, is selected as reference element 220 and exists in the center of the current frame. It has a 10×10 form and is bounded by pixels at indices 105, 114, 285 and 294. For past movement, assume a course of up one row and left one column occurred such that the target is expected at element 222 having bounding pixels at indices 84, 93, 264 and 273. However, searching solely at element 222 does not guarantee the finding of the actual location of the target because it does not take into consideration potential abrupt changes in a user's maneuvering of the printer. To the extent computations are conducted simply based on borders of targets, this then limits the searching to four indices, e.g., 2×2 indices occurring at 85, 85, 104, and 105 by which to find the target. Again, no guarantees of finding the target are given for lack of considering abrupt user maneuvering.

To remedy this, there is a possible search area (PSA) tolerance value that increases the PSA in which the target can be found. Naturally, the tolerance value could be large or small depending upon computational preference. Sampling frequencies, basic assumptions and other criteria would be typical information used in setting or selecting its precise value. As a representative example, consider a PSA tolerance value=1, whereby the possible search area is increased by one row and column in all directions, such that adding 1 column to the left, 1 column to the right, 1 row on top, and 1 row at the bottom increases the PSA to 4×4, element 225. For this, there is then sixteen correlation coefficients (e.g., from the correlation matrix) to be searched, as opposed to 121 coefficients. On the other hand, if the PSA tolerance value were to equal two, there would then be thirty six correlation coefficients as seen by element 227.

Figure 21:
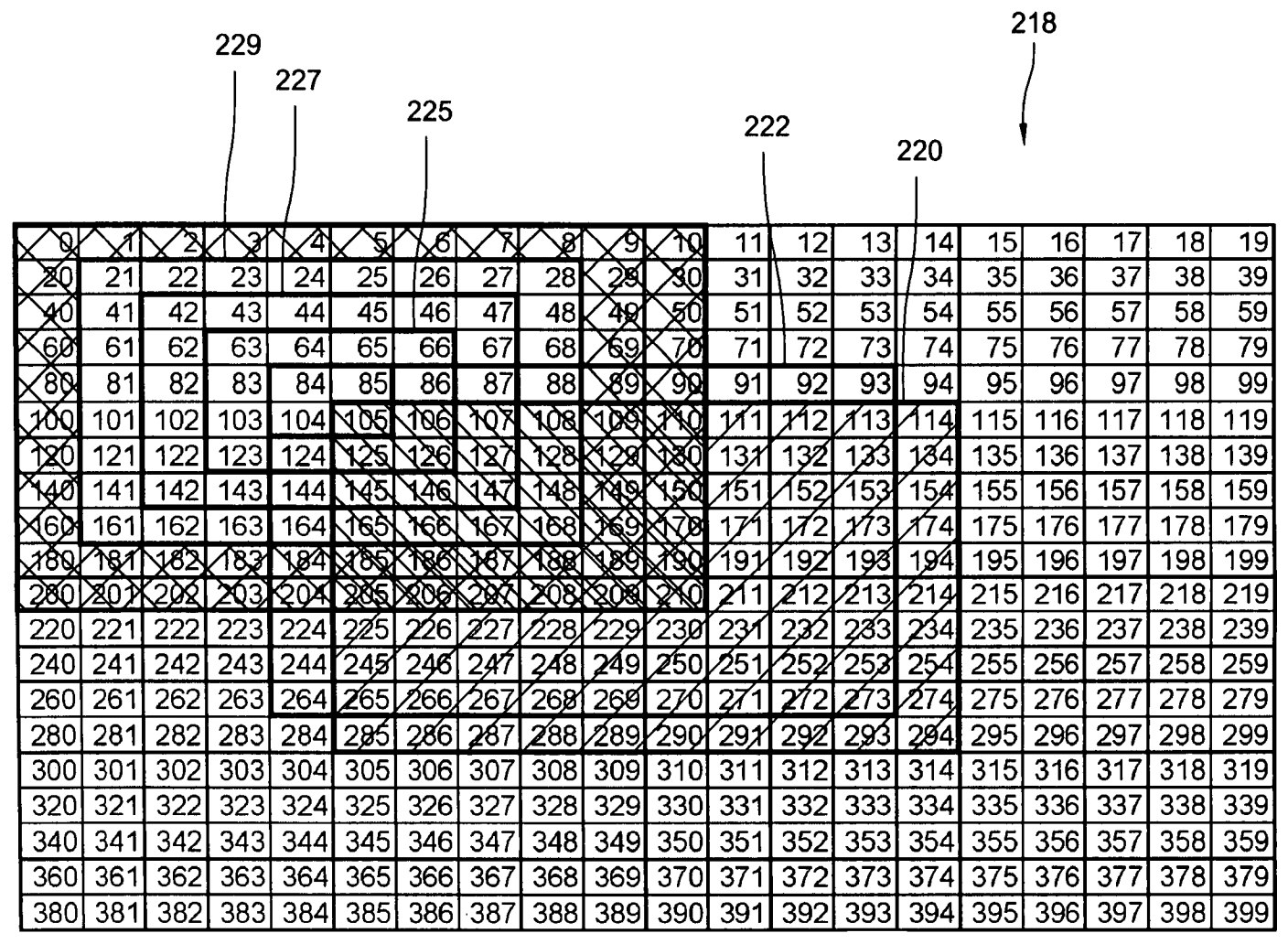

In FIG. 21, the PSA tolerance value is shown as three as evidenced by element 229. In turn, the computation of the target's movement can be obtained faster by about a half rate when compared to an entire frame search, and still is found to consider the abrupt movement of the target up to a magnitude of (4, ±4) based from the expected movement of (−1, −1) (e.g., one row and column movement in the up and left directions, as opposed to a (+) stylized movement in the down and right direction) plus the tolerance (±3, ±3).

In the remaining FIGS. 23-30, still other situations are shown where the PSA tolerance value equals three, but with other caveats. In general, however, the PSA is shown as a bounding rectangle, element 250, and includes labeled indices or pixel locations avoiding X's therein. Also, that which corresponds to the bounding rectangle 220 shows the previous location of the target in the previous frame. The thick borderline 275 inside the frame 218 is the expected location of the target in these frames (i.e. the current frame). Of course, skilled artisans will be able to comprehend other scenarios and all are embraced herein.

As a result, the below table summarizes certain improvements of the invention:

Wherein, Target size: 10×10
Frame size: 20×20
Target movement: for example, −1 (column), −1 (row) per frame, where target selected is the center of the Previous Frame 5.

TABLE

| Target search method | PSA Tolerance Value | No. of comparison results |
| --- | --- | --- |
| Entire frame (correlation matrix) search | 0 | 121 (11 × 11) |
| Based on previous movement only | 0 | 4 (2 × 2) |

TABLE-continued

| Target search method | PSA Tolerance Value | No. of comparison results |
| --- | --- | --- |
| Based on previous movement plus PSA tolerance value | 1 | 16 (4 × 4) |
| Based on previous movement plus PSA tolerance value | 2 | 36 (6 × 6) |
| Based on previous movement plus PSA tolerance value | 3 | 64 (8 × 8) |

Figure 22:
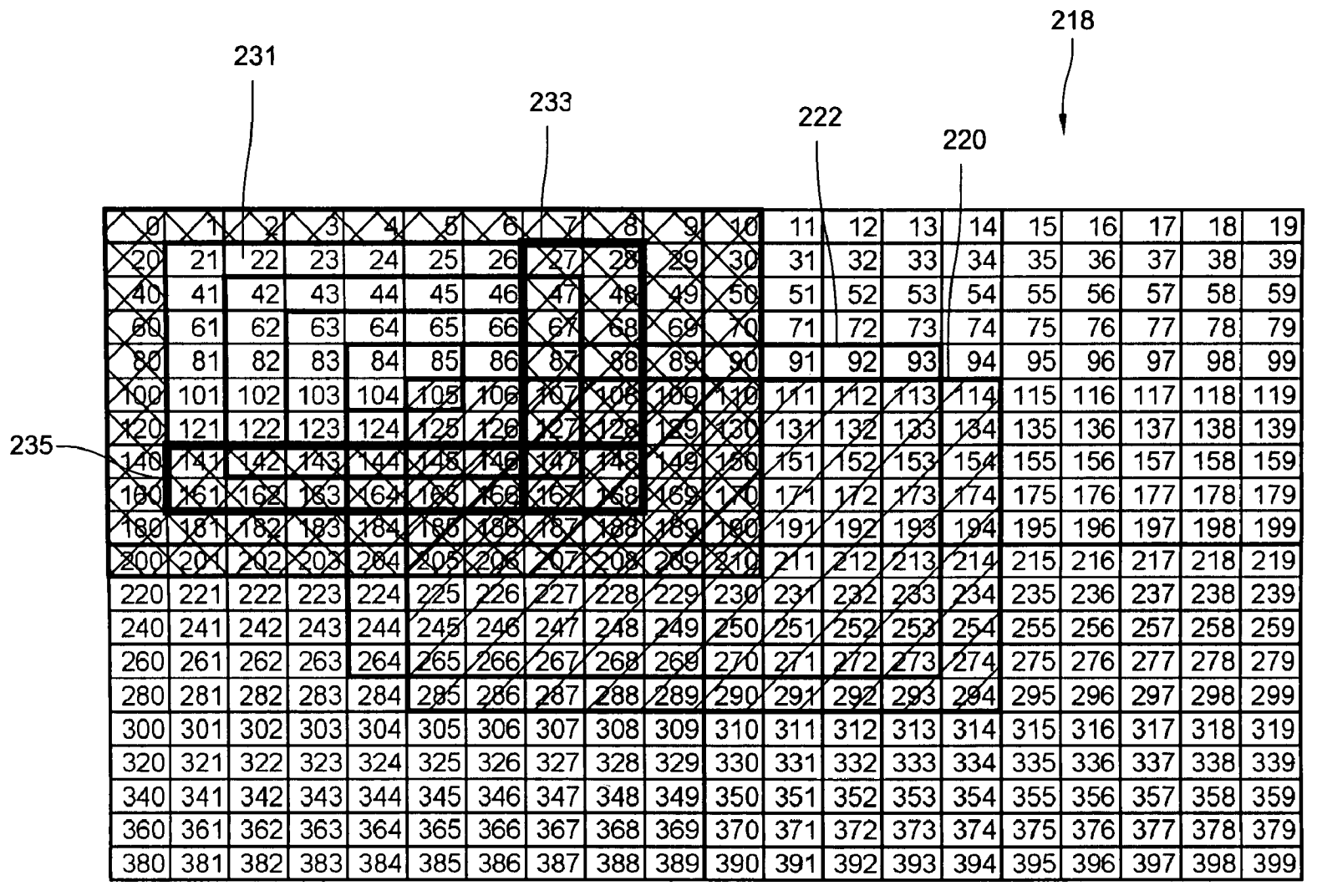

Aside from the aforementioned method of determining the PSA where the tolerance value is determined based on the maximum possible movement of the target, there are several other approaches on minimizing the area to search for the target. For example, the PSA before was increased in all directions (all sides) regardless the direction of the target's movement of one row up and one column left. In other embodiments, it is expected to only increase the PSA on sides thereof anticipating target movement. It also contemplates an addition of at least 1 row or column in an opposite side of movement based on a change of direction of the printer, since after the deceleration just before switching the direction of motion, it will come to a state where the target has stopped moving in preparation for a movement to the other direction. The minimum addition to the opposite direction is a method used just in case the sampling rate could not catch up and the no-movement state was not captured. This can be increased up to a value less than the set PA tolerance. With reference to FIG. 22, this is seen by providing a tolerance value of the PSA asymmetrically. In this example, to anticipate the changes in direction of the target's movement, the element 231 has two less rows and columns, such as at elements 233 and 235, in comparison to element 229 in FIG. 21.

Another way to accomplish this is by setting a threshold for the value of the peak comparison result before increasing the PSA of the target's next location. For example, using correlation, e.g., correlation matrix (FIG. 12 or 16), if a given threshold is set at a correlation value of 0.98 and a maximum possible correlation result between a reduced previous frame within a reduced current frame is found to be less than the threshold, such as at 0.95, it can be assumed that the real target could still be outside the possible search area computed. Thus, the PSA could be made ever expanding, such as by adding rows and/or columns and computing correlation values for the additions only.

Other expanding of the PSA can be accomplished as follows. For instance, a minimum PSA tolerance value could be set, such as to one. In the event, a best match is not found between a previous and current frame, an increase of the tolerance value could then occur to two, for example, and so on. Stopping the increase could then occur when the maximum correlation value, e.g., the correlation matrix (of the increased tolerance values) is less than the existing or previous maximum correlation value.

In any embodiment, certain advantages of the invention over the prior art are readily apparent. For example, the invention at hand provides enhanced computation processing for navigating a handheld printer, ultimately improving print quality regardless of user manipulation. It also adds a simple architecture for performing same. Position signal validity checking and PSA, including tolerance values, or not, are other noteworthy features.

Finally, one of ordinary skill in the art will recognize that additional embodiments are also possible without departing from the teachings of the present invention. This detailed description, and particularly the specific details of the exemplary embodiments disclosed herein, is given primarily for clarity of understanding, and no unnecessary limitations are to be imported, for modifications will become obvious to those skilled in the art upon reading this disclosure and may be made without departing from the spirit or scope of the invention. Relatively apparent modifications, of course, include combining the various features of one or more figures with the features of one or more of other figures.

What is claimed:

1. A handheld printer to be manipulated back and forth by an operator over a media during use to print an image on the media, comprising:
    a hand maneuverable housing for the operator;
    an inkjet printhead on or in the housing to print the image;
    a controller communicating with the printhead to cause printing or not;
    a position sensor for directing light at the media and communicating with the controller to provide a location of the printhead during use, an output of the position sensor providing information indicating a current location of the housing and over time a previous location of the housing;
    a reducer for altering a relative size of the output of the position sensor into a reduced current location and a reduced previous location, wherein the reducer twice alters the relative size of the previous location to obtain the reduced previous location but only once alters the relative size of the current location to obtain the reduced current version; and
    a comparator to compare the reduced current location to the reduced previous location and find the reduced previous location in the reduced current location, wherein the controller ascertains a relative location of the printhead to the image upon finding the reduced previous location in the reduced current location.

2. The handheld printer of claim 1, wherein the reducer or comparator are part of the controller.

3. The handheld printer of claim 1, wherein the reducer further includes a target reducer and a frame reducer.

4. The handheld printer of claim 1, wherein the output of the position sensor provides a plurality of pixels in a matrix frame of two-dimensional form corresponding to gray scale values imaged by the position sensor, wherein the twice altering of the relative size of the previous location includes a first altering that eliminates edge data pixels from the matrix frame by selecting centermost data pixels from the matrix frame and a second altering that reduces the centermost data pixels from the two-dimensional form into a one dimensional form, and wherein the once altering of the relative size of the current location includes maintaining the reduced previous location as another two-dimensional form.

5. The handheld printer of claim 1, wherein the output of the position sensor provides a plurality of pixels in a matrix frame of rows and column, further including a summation component for summing pixel values of either a full or partial row or column of the matrix frame to accomplish the altering the relative size of the output of the position sensor.

6. The handheld printer of claim 1, further including an intake checker as part of the controller or not to ascertain whether the output of the position sensor represents a valid or invalid signal corresponding to the housing being relatively close or far from the media, respectively.

7. The handheld printer of claim 1, further including a limiter that focuses the comparator for comparing and finding the reduced previous location in the reduced current location.

8. The handheld printer of claim 1, further including a selector for determining which portion of the output of the position sensor will be altered in relative size by the reducer.

9. The handheld printer of claim 1, further including a navigation output calculator that utilizes and keeps track of a previous movement history of the housing.

10. A handheld printer to be manipulated back and forth by an operator over a media during use to print an image on the media, comprising:
    a hand maneuverable housing for the operator;
    an inkjet printhead on or in the housing to print the image;
    a controller communicating with the printhead to cause printing or not;
    a position sensor communicating with the controller to provide an output of values indicative of a current location and over time a previous location of the printhead, wherein the controller correlates the location of the printhead to the image, the controller further including,
    a reducer for altering a relative size of the output of values of the position sensor into a reduced current location and a reduced previous location, wherein the reducer twice alters the relative size of the previous location such that a first altering eliminates data pixels from an edge of the output of values of the position sensor and a second altering reduces remaining pixels of the output values of the position sensor into a combined representation of the remaining pixels and the reducer only once alters the relative size of the current location; and
    a comparator to compare the reduced current location to the reduced previous location and find the reduced previous location in the reduced current location, wherein the controller ascertains a relative location of the printhead to the image upon finding the reduced previous location in the reduced current location according to examination of a correlation between the output of values.

11. The handheld printer of claim 10, wherein the controller creates a correlation matrix for the output of values that is tracked to ascertain movement history of the housing.

12. The handheld printer of claim 10, wherein the reducer further includes a reducer component for each of the output of values indicative of the current location and the previous location.

13. The handheld printer of claim 10, wherein the controller further includes a selector for determining which portion of the output of values of the position sensor will be altered in relative size by the reducer.

14. The handheld printer of claim 10, wherein the controller further includes a selector to determine a possible search area for finding the reduced previous location in the reduced current location according to examination of the correlation between the output of values.

15. In a handheld printer having a housing to be manipulated back and forth by an operator over a media during use to print an image on the media, a method of navigating the housing, comprising:
    providing a position sensor on or in the housing;
    receiving an output signal of the position sensor indicative of a location of the housing;
    ascertaining whether the output signal of the position sensor represents the housing being relatively close or far from the media;
    after the ascertaining, sorting the output signal into a plurality of values indicative of both a current and previous location of the housing;

after the sorting, reducing a relative size of the plurality of values for either the current or previous location of the housing, or both; and after the reducing, examining the plurality of values for the current location of the housing for a presence of the plurality of values for the previous location of the housing.

16. The method of claim 15, wherein the reducing the relative size includes arranging the plurality of values into a matrix form having rows and columns, further including summing either a full or partial row or column of the matrix form.

17. The method of claim 15, tracking a prior movement history of the housing.

18. The method of claim 17, further including using the prior movement history of the housing for the step of the examining the plurality of values for the current location of the housing for the presence of the plurality of values for the previous location of the housing.

* * * * *